US012088990B2

(12) United States Patent
Wang et al.

(10) Patent No.: US 12,088,990 B2
(45) Date of Patent: Sep. 10, 2024

(54) ACOUSTIC OUTPUT APPARATUS AND CONNECTION ASSEMBLY

(71) Applicant: SHENZHEN SHOKZ CO., LTD., Guangdong (CN)

(72) Inventors: Yonggen Wang, Shenzhen (CN); Zhiqing Liu, Shenzhen (CN); Zhen Wang, Shenzhen (CN); Xinnan Mao, Shenzhen (CN); Yueqiang Wang, Shenzhen (CN); Zhongqi Wu, Shenzhen (CN); Fen You, Shenzhen (CN); Yongjian Li, Shenzhen (CN); Haofeng Zhang, Shenzhen (CN); Shuailin Xie, Shenzhen (CN); Chaowu Li, Shenzhen (CN); Qingyu Zeng, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 163 days.

(21) Appl. No.: 17/814,511

(22) Filed: Jul. 23, 2022

(65) Prior Publication Data

US 2022/0400327 A1 Dec. 15, 2022

Related U.S. Application Data

(63) Continuation of application No. PCT/CN2021/090453, filed on Apr. 28, 2021.

(30) Foreign Application Priority Data

Apr. 30, 2020 (CN) ........................ 202020720219.X
Apr. 30, 2020 (CN) ........................ 202020720246.7

(Continued)

(51) Int. Cl.
*H04R 1/10* (2006.01)

(52) U.S. Cl.
CPC .................................... *H04R 1/105* (2013.01)

(58) Field of Classification Search
CPC .... H04R 1/105; H04R 1/1066; H04R 1/1058; H04R 5/0335; H04R 2201/10

(Continued)

(56) References Cited

U.S. PATENT DOCUMENTS

2021/0067879 A1 3/2021 Li et al.

FOREIGN PATENT DOCUMENTS

CN 107454492 A 12/2017
CN 107484054 * 12/2017

(Continued)

OTHER PUBLICATIONS

International Search Report in PCT/CN2021/090453 mailed on Jul. 16, 2021, 7 pages.

(Continued)

*Primary Examiner* — Norman Yu
(74) *Attorney, Agent, or Firm* — METIS IP LLC

(57) ABSTRACT

The present disclosure relates to an apparatus. The apparatus may comprise two ear-hook assemblies configured to be hung outside of two ears of a user respectively, and a rear-hook assembly in a curved shape configured to connect the two ear-hook assemblies and wrap around a rear side of the head of the user. The rear-hook assembly may include an elastic metal filament, wires, and an elastic covering body covering the elastic metal filament and the wires.

20 Claims, 45 Drawing Sheets

(30) Foreign Application Priority Data

| | | |
|---|---|---|
| Jun. 15, 2020 | (CN) | 202010546381.9 |
| Jun. 15, 2020 | (CN) | 202021105280.X |
| Jun. 15, 2020 | (CN) | 202021118294.5 |
| Aug. 12, 2020 | (CN) | 202021693327.9 |

(58) Field of Classification Search
USPC .................................................... 381/74, 381
See application file for complete search history.

(56) References Cited

FOREIGN PATENT DOCUMENTS

| | | | |
|---|---|---|---|
| CN | 107484054 | A | 12/2017 |
| CN | 107493532 | A | 12/2017 |
| CN | 211702353 | U | 10/2020 |
| CN | 211880590 | U | 11/2020 |
| CN | 212463478 | U | 2/2021 |
| CN | 212463479 | U | 2/2021 |

OTHER PUBLICATIONS

Written Opinion in PCT/CN2021/090453 mailed on Jul. 16, 2021, 7 pages.

* cited by examiner

ACOUSTIC OUTPUT APPARATUS AND CONNECTION ASSEMBLY

CROSS REFERENCE TO RELATED APPLICATIONS

This application is a Continuation of International Patent Application No. PCT/CN2021/090453, filed on Apr. 28, 2021, which claims priority of Chinese Patent Application No. 202020720246.7, filed on Apr. 30, 2020, Chinese Patent Application No. 202020720219.X, filed on Apr. 30, 2020, Chinese Patent Application No. 202010546381.9, filed on Jun. 15, 2020, Chinese Patent Application No. 202021118294.5, filed on Jun. 15, 2020, Chinese Patent Application No. 202021105280.X, filed on Jun. 15, 2020, and Chinese Patent Application No. 202021693327.9, filed on Aug. 12, 2020, the entire contents of which are incorporated herein by reference.

TECHNICAL FIELD

The present disclosure relates to the field of communication technologies, in particular, relates to acoustic output apparatus and connection assemblies.

BACKGROUND

Acoustic output apparatus (such as a headphone) have been widely used in the daily lives of people. The acoustic output apparatus may be used with cell phones, computers, and other electronic devices to provide a user with an auditory feast. In-ear earphones and headphones may be adapted to different external ear canals or head sizes by replacing earbuds with different models or adjusting effective headband sizes. Ear-hook earphones usually cannot possibly adapt to different head sizes due to the inability to adjust lengths of rear-hook structures. At the same time, the rear-hook structures of the ear-hook earphones not only need to realize the structural connections but also need to connect electrical components in the earphones to realize circuit connections, which usually have complicated structures. In particular, since bone conduction earphones need to convert electrical signals into mechanical vibrations and transmit the mechanical vibrations via the human skull, bone vagus, inner ear lymphatic fluid, spiral apparatus, auditory nerve, and cortical auditory center of the brain to achieve transmissions of sound waves, the requirements of the rear-hook structures may be high. The ear-hook structures of the earphones need to be close to the skull to transmit the sound waves to the auditory nerve directly via the bone.

Therefore, it is desired to provide acoustic output apparatus and connection assemblies to adapt to different head sizes. A compact structure that is achieved based on the electrical connection among the electrical components may also improve the stability of the internal structure and the production efficiency of the rear-hook assembly.

SUMMARY

The embodiments of the present disclosure provide a device comprising two ear-hook assemblies configured to be hung outside of two ears of a user respectively, and a rear-hook assembly in a curved shape configured to connect the two ear-hook assemblies and wrap around a rear side of the head of the user. The rear-hook assembly may include an elastic metal filament, wires, and an elastic covering body covering the elastic metal filament and the wires.

Another aspect of the present disclosure provides a connection assembly. The connection assembly may comprise a base body, a plurality of lines, and a covering body. The base body may be in a bending shape along a length direction of the base body, and the plurality of lines may be conformally arranged on the base body at intervals on a reference section perpendicular to the length direction of the base body. The plurality of lines further may extend from a first end of the base body to a second end along the length direction of the base body. The covering body may be wrapped around a periphery of the plurality of lines and the base body. The plurality of lines may be configured to realize an electrical connection between electrical devices respectively mounted on the first end and the second end of the base body.

Another aspect of the present disclosure provides an acoustic output device. The acoustic output device may comprise a loudspeaker assembly and an ear-hook assembly including a connection member and an ear-hook housing connected to the connection member. The ear-hook housing may form an accommodating space for accommodating a battery assembly or a control circuit assembly. The connection member may include a first elastic covering layer, a second elastic covering layer, and an elastic metal filament. One end of the elastic metal filament may be connected with the ear-hook housing, and the other end of the elastic metal filament may be configured to connect the loudspeaker assembly. At least one through-groove may be formed on one side of the first elastic covering layer. The at least one through-groove may extend along an extending direction of the first elastic covering layer. The at least one through-groove may be configured to place the elastic metal filament. The second elastic covering layer may cover the side of the first elastic covering layer and form a wiring channel with the first elastic covering layer, and the wiring channel may be configured to place wires connecting the loudspeaker assembly and the battery assembly or the control circuit assembly.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further illustrated in terms of exemplary embodiments. These exemplary embodiments are described in detail with reference to the drawings. These embodiments are not limited, in these embodiments, and the same number denotes the same structure.

FIG. 10(*b*) is a schematic diagram illustrating a cross-sectional structure of a reinforcing structure arranged on an ear-hook housing according to some embodiments of the present disclosure;

FIG. 11(*b*) is a schematic diagram illustrating a top view structure of a reinforcing structure arranged on an ear-hook housing according to some embodiments of the present disclosure;

FIG. 11(*c*) is a schematic diagram illustrating a top view structure of a reinforcing structure arranged on an ear-hook housing according to some embodiments of the present disclosure;

FIG. 11(*d*) is a schematic diagram illustrating a top view structure of a reinforcing structure arranged on an ear-hook housing according to some embodiments of the present disclosure;

FIG. 35(*b*) is a structural schematic diagram illustrating an orthographic projection of a second group of conformal lines on a base body according to some embodiments of the present disclosure;

DETAILED DESCRIPTION

Figure 1:
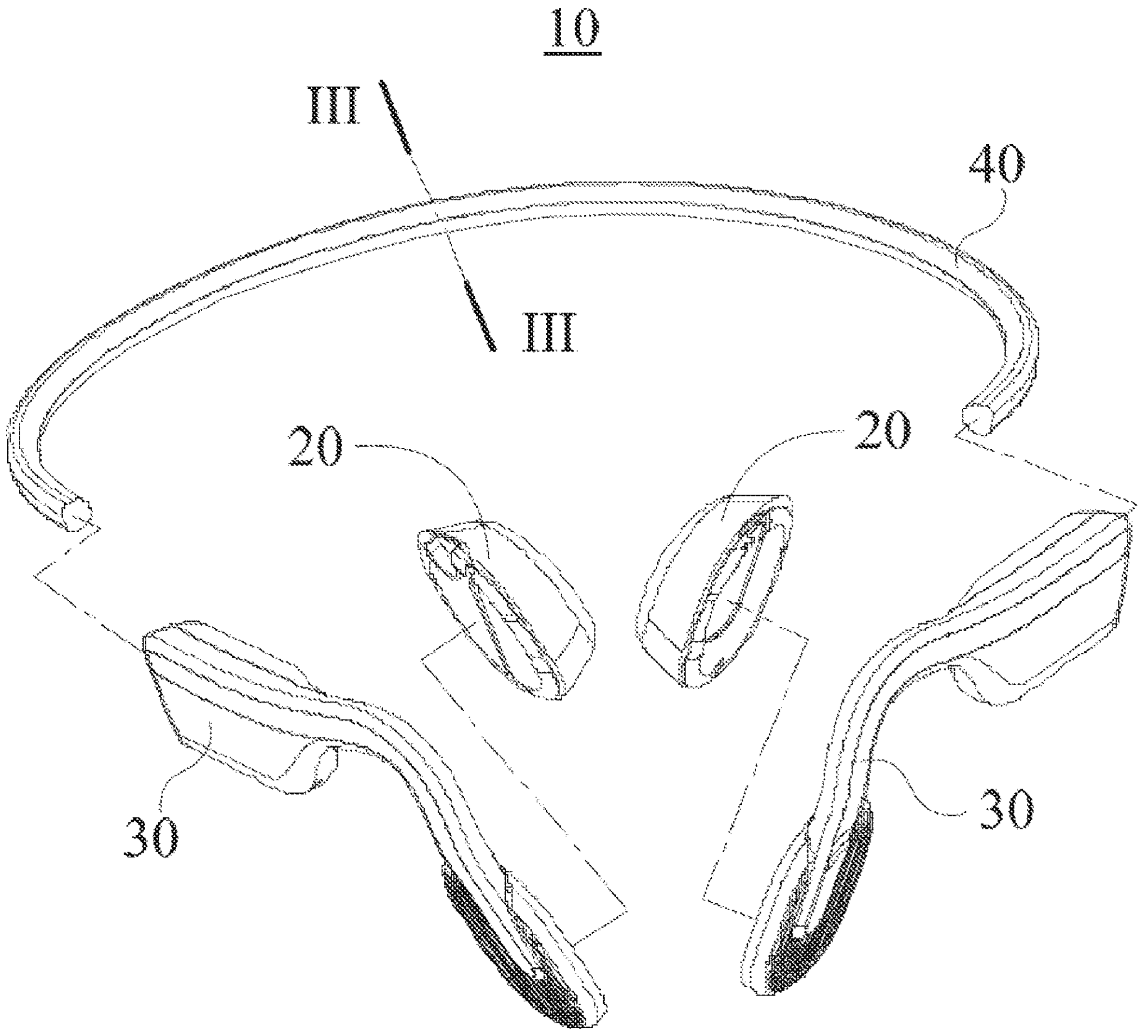
FIG. 1 is a schematic diagram illustrating a disassembled structure of an exemplary apparatus according to some embodiments of the present disclosure.

In order to illustrate technical solutions of the embodiments of the present disclosure more clearly, the following briefly illustrates drawings in the illustration of the embodiments. Drawings in the following illustration are merely some examples or embodiments of the present disclosure. For those skilled in the art, the present disclosure may be applied to other similar scenarios in accordance with the drawings without creative works. Unless obviously obtained from the context or the context illustrates otherwise, the same numeral in the drawings refers to the same structure or operation.

It should be understood that “system”, “apparatus”, “unit”, and/or “module” used herein are a method for distinguishing different components, elements, members, parts, or assemblies of different levels. However, if other words may achieve the same purpose, the words may be replaced by other expressions.

As used in the disclosure and the appended claims, the singular forms “a,” “an,” and “the” include plural referents unless the content clearly dictates otherwise. In general, the terms “comprising” and “including” only prompt steps and elements that are explicitly identified, and these steps and elements do not constitute an exclusive list. Methods or apparatus may also include other steps or elements.

Flowcharts are used in the present disclosure to illustrate the operations performed by the system according to some embodiments of the present disclosure. It should be understood that the front or rear operations may not be necessarily performed exactly in order. On the contrary, each step may be performed in reverse or simultaneously. At the same time, other operations may also be added to the procedures, or a certain step or several steps may be removed from the procedures.

The apparatus described in the embodiments of the present disclosure may be applied to acoustic output apparatus including hearing aids, listening bracelets, headphones, speakers, smart glasses, head-mounted display apparatus, or other apparatus with acoustic output capabilities. The acoustic output apparatus may be fixedly closed to an ear of a user by hanging or clamping. When the acoustic output apparatus is worn by the user, the acoustic output apparatus may be located on at least one side of the head of the user, which is close to but not blocking the ear of the user. In some embodiments, an outer surface of the acoustic output apparatus may be arranged with a hook, and the shape of the hook may match the shape of the ear, so that the acoustic output apparatus may be worn independently on the ear of the user via the hook. The acoustic output apparatus that is worn or used independently may be in communication with a signal source (e.g., a computer, a cell phone, or other mobile devices) via wired or wireless (e.g., Bluetooth) communication. The acoustic output apparatus may be worn on the head of the user (e.g., a non-in-ear and open earphone worn by ways of glasses, headband, or other manners). At the same time, an acoustic driver may be close to but not blocking the ear canal, thereby allowing the ears of the user to remain open. The user may hear the sound outputs from the acoustic output apparatus while acquiring the sound of the external environment. For example, the acoustic output apparatus may be arranged around or partially around the circumference of the ear of the user, and the sound may be transmitted via air conduction or bone conduction.

Some embodiments of the present disclosure may take a bone conduction ear-hook earphone as an example for illustrative purposes.

FIG. 1 is a schematic diagram illustrating a disassembled structure of an exemplary apparatus according to some embodiments of the present disclosure.

In some embodiments, an apparatus 10 may be an acoustic output apparatus. The acoustic output apparatus may be hooked and arranged on the head or ear of the user, or the like. When the apparatus 10 is hooked and arranged on the head of the user, the weight of the apparatus 10 may be mainly borne by the head of the user. When the apparatus 10 is hooked and arranged on the ear of the user, the weight of the apparatus 10 may be mainly borne by the ear of the user. For example, when the apparatus 10 is an ear-hook earphone, the weight of the apparatus 10 may be mainly borne by the ear of the user. In some embodiments, for the ear-hook earphones, the apparatus 10 may be specifically an air conduction earphone or a bone conduction earphone. In some embodiments, the apparatus 10 may also be a pendant or accessory worn on the ear of the user.

As shown in FIG. 1, the apparatus 10 may include two core modules 20, two ear-hook assemblies 30, and a rear-hook assembly (a connection assembly) 40.

In some embodiments, the core module 20 may be used to make contact with the skin of the user, thereby enabling the transmission of sound. In some embodiments, when a user wears the apparatus 10, the two core modules 20 may be located on left and right sides of the head of the user, respectively. Under a cooperation between the two ear hook assemblies 30 and the rear-hook assembly 40, the two core modules 20 may be in contact with the skin of the user by clamping the head of the user. In some embodiments, the core module 20 may include a core housing 21 and a core 22, wherein an opening may be arranged on one end of the core housing 21 and the core 22 may be accommodated in the core housing 21.

In some embodiments, a count of the core modules 20 may be two. Both the core modules 20 may generate sound to facilitate the apparatus 10 to achieve stereo sound effects, thereby improving the user experience of the apparatus 10. In some embodiments, in some application scenarios that the stereo sound requirements are not particularly high, such as hearing assistance for a hearing patient, live teleprompting for a presenter, or the like, the apparatus 10 may also be configured with only one core module 20.

In some embodiments, the two ear-hook assemblies 30 may be in a curved shape so that the two ear-hook assemblies 30 may be hooked and arranged on the outside of each of the ears of the user. The rear-hook assembly 40 may also be in a curved shape to connect the two ear-hook assemblies and to wrap around the back side of the head of the user, thereby facilitating the requirements for the user to wear the apparatus 10. In some embodiments, one end of the two ear-hook assemblies 30 may be connected to a corresponding core module 20, respectively. Two ends of the rear-hook assembly 40 may be connected to the other ends of each of the two ear-hook assemblies 30 away from the core module 20.

In some embodiments, the rear-hook assembly 40 may include an elastic metal filament, a wire, and an elastic cover body (not shown in FIG. 1) that covers the elastic metal filament and the wire. In some embodiments, the elastic metal filament may be in a curved shape in a length direction of the elastic metal filament so that the rear-hook assembly 40 may be wrapped around the rear side of the head of the user. The elastic metal filament may mainly play a supporting role for the rear-hook assembly 40 to maintain the basic structural form. When the user wears the apparatus 10, the rear-hook assembly 40 may cooperate with the two core modules 20 and the two ear-hook assemblies 30 to provide the clamping force, thereby increasing the stability and reliability of wearing. In some embodiments, a material of the elastic metal filament may include spring steel, titanium alloy, titanium nickel alloy, chromium molybdenum steel, or the like, or any combination thereof.

In some embodiments, the cover body may cover the periphery of the elastic metal filament and a conductor to protect the elastic metal filament and the conductor from the outside world, thereby increasing the service life of the rear-hook assembly 40. In some embodiments, a material of the cover body may include polycarbonate, polyamide, silica gel, rubber, or the like, or any combination thereof, to improve the wearing comfort of the rear-hook assembly 40.

In some embodiments, the apparatus 10 may also include a control circuit assembly and a battery assembly (not shown in FIG. 1). The control circuit assembly may be used to control the core modules 20 to generate sound (primarily by converting electrical signals into mechanical vibrations), and the battery assembly may be used to provide electrical power to the apparatus 10 (e.g., the two core modules 20). In some embodiments, the control circuit assembly and the battery assembly may be arranged in the same ear-hook assembly 30 or may be arranged in two separate ear-hook assemblies 30, and the specific structure may be described in detail in the following contents. In some embodiments, the control circuit assembly and the battery assembly may be connected to the two core modules 20 via the conductor (not shown in FIG. 1), respectively. In some embodiments, the apparatus 10 described in the present disclosure may also include microphones, sound transmitters such as sound pickup devices, Bluetooth, NFC (Near Field Communication), or other communication components, which may also be connected to the control circuit assembly and the battery assembly via wires to achieve the corresponding functions. In some embodiments, the conductor may be a wire primarily for achieving an electrical connection among each of a plurality of electronic components of the apparatus 10. When the electrical connection among a plurality of circuits is required, a plurality of strands of the conductor may be arranged accordingly. That is, the conductors may be simply understood as the plurality of strands of wire.

In some embodiments, since the apparatus 10 also includes two core modules 20, the control circuit assembly, the battery assembly, or other electrical components, and the electrical components are evenly arranged in the two ear-hook assemblies 30, that is, the electrical components may be evenly distributed at two ends of the rear-hook assembly 40, the circuit design of the electrical components may usually require the rear-hook assembly 40. That is, the rear-hook assembly 40 may undertake part of the wiring of the apparatus 10.

Figure 2:
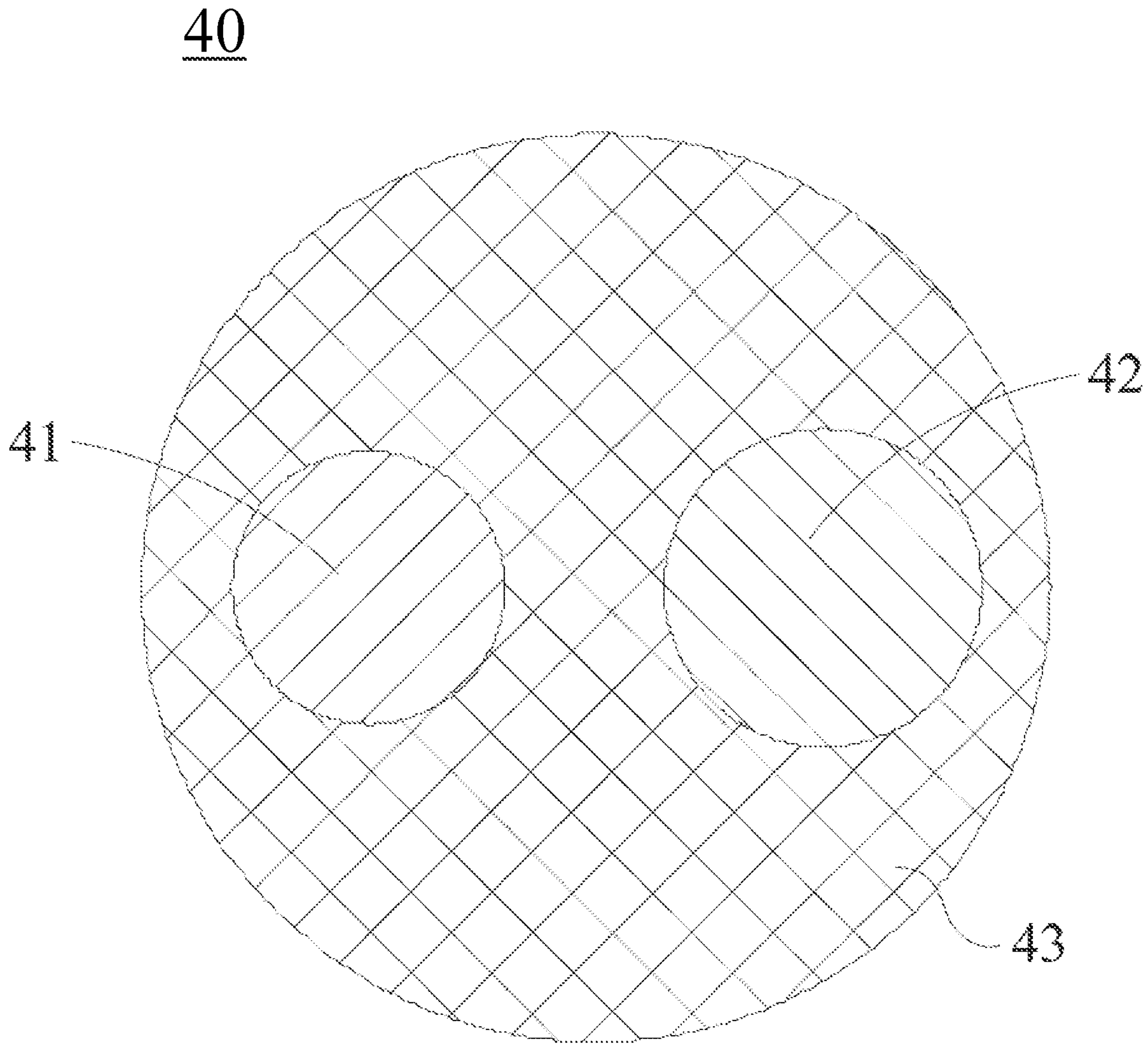
FIG. 2 is a schematic diagram illustrating a cross-sectional structure of an exemplary rear-hook assembly according to some embodiments of the present disclosure.

FIG. 2 is a schematic diagram illustrating a cross-sectional structure of an exemplary rear-hook assembly according to some embodiments of the present disclosure.

As shown in FIG. 2, the rear-hook assembly 40 may include an elastic metal filament 41, a wire 42, and an elastic cover body 43 that covers the elastic metal filament 41 and the wire 42.

In some embodiments, a material of the elastic metal filament 41 may include spring steel, titanium alloy, titanium nickel alloy, chromium molybdenum steel, or the like, or any combination thereof. A material of the elastic cover body 43 may include polycarbonate, polyamide, silica gel, rubber, or the like, or any combination thereof, to balance the wearing comfort and the stiffness of the structure of the rear-hook assembly 40.

In some embodiments, the elastic cover body 43 and the wire 42 may be an integrally structural piece formed by extruding. The elastic cover body 43 may further form a threaded channel (not marked in FIG. 2). The elastic metal filament 41 may be inserted in the threaded channel. In some embodiments, the threaded channel may be formed during the extrusion formation. In some embodiments, since the elastic metal filament 41 is inserted in the elastic cover body 43 via the threaded channel, a region where the elastic metal filament 41 is located in FIG. 2 may be simply considered as a threaded channel in the elastic cover body 43.

In some embodiments, a diameter of the threaded channel in a natural state may be less than a diameter of the elastic metal filament 41, so that the elastic metal filament 41 may maintain fixed with the elastic cover body 43 after inserting the elastic cover body 43. Therefore, "sagging" of the rear-hook assembly 40 due to an excessively large gap between the elastic cover body 43 and the elastic metal filament 41 may be avoided. In some embodiments, the compactness of the rear-hook assembly 40 may be increased if the rear-hook assembly 40 is pressed by the user.

In some embodiments, a count of the wires 42 may be at least two strands. In some embodiments, each strand of the wire 42 may include a metal wire and an insulation layer (not shown in FIG. 2) covering the metal wire. The insulation layer may be configured to achieve electrical insulation between the metal wires.

It should be noted that since the control circuit assembly and the battery assembly may be disposed in two ear hook assemblies 30, and the ear-hook assemblies 30 may correspond to the left ear-hook and the right ear-hook of the apparatus 10, respectively, so that a main control circuit board and the battery assembly may be connected through the wire 42 built into the rear-hook assembly 40. The core module 20 (e.g., the core 22) corresponding to the ear-hook assembly 30 in FIG. 1 (on the left) may be connected to the control circuit assembly and the battery assembly corresponding to the ear-hook assembly 30 in FIG. 1 (on the right) through the wire 42 built into the rear-hook assembly 40, and the core module 20 (e.g., the core 22) corresponding to the ear-hook assembly 30 in FIG. 1 (on the right) may be further connected to the control circuit assembly and the battery assembly corresponding to the ear-hook assembly 30 in FIG. 1 (on the right) through the wire 42 built into the rear-hook assembly 40. Therefore, the wires 42 may be configured to connect the three circuits.

Based on the above detailed description, the rear-hook assembly 40 of the present disclosure may be manufactured according to the following process.

In operation 110, an extrusion molding device and a wire may be provided.

In some embodiments, raw materials for molding the elastic cover body 43 may be added into the extrusion molding device. In some embodiments, during the extrusion molding, operations on the raw materials of the elastic cover body 43 may include a molten plasticization, an extrusion from a die (or a handpiece), shaping, cooling, traction, etc. In some embodiments, the count of wires 42 may be at least two strands to facilitate the connection among each of the plurality of electronic components in the apparatus 10. In some embodiments, each strand 42 may include a metal wire and an insulation layer covering the metal wire to facilitate an electrical insulation between the metal wires.

In operation 120, the wire 42 may be placed in the extrusion molding device, so that a corresponding first semi-manufactured product may be obtained from the raw materials of the elastic cover body 43 and the wire during the extrusion molding.

In some embodiments, the extrusion molding device may be configured to lead the wire 42 to cause the elastic cover body 43 to cover the wire 42 during the extrusion molding. In some embodiments, a mold core may be arranged on the handpiece of the extrusion molding device to form the above threaded channel inside the elastic cover body 43 during the extrusion molding, simultaneously. In some embodiments, the first semi-manufactured product may be an integrally structural piece of the elastic cover body 43 and the wire 42, and the inside of the elastic cover body 43 may include the threaded channel extending along an axial direction of the elastic cover body 43.

In operation 130, according to use requirements of the rear-hook assembly, the first semi-manufactured product may be further cut into a second semi-manufactured product having a corresponding length.

In some embodiments, an actual length of the second semi-manufactured product may be slightly greater than a use length for the rear-hook assembly. That is, the second semi-manufactured product may include an amount of margin to facilitate one or more subsequent processes.

In operation 140, the elastic metal filament 41 may be disposed in the threaded channel of the second semi-manufactured product to obtain the rear-hook assembly 40.

In some embodiments, the rear-hook assembly produced through operation 140 may be only a semi-manufactured product in essence, which requires subsequent processes of the rear-hook assembly 40. In some embodiments, after operation 140, the rear-hook assembly 40 may be formed in a bending structure including a certain shape to adapt to the rear side of the head of the user. In some embodiments, two ends of the rear-hook assembly 40 may be treated accordingly to be fixedly connected with the ear-hook assembly 30, thereby achieving a circuit connection between the circuit board assembly, the battery assembly, or other electrical components.

Through the above manner, since the manufacturing processes of the rear-hook assembly 40 involve the extrusion molding process, the second semi-manufactured product (e.g., the integrally structural piece of the elastic cover body 43 and the wire 42) with a long length may be manufactured. The inside of the elastic cover body 43 may include the threaded channel extending along the axial direction of the elastic cover layer 43, simultaneously. The semi-manufactured product may be cut into a plurality of small sections with the corresponding length for performing the subsequent processes (e.g., the elastic metal filament may be disposed in the threaded channel, etc.), which may effectively improve the production efficiency of the rear-hook assembly, thereby improving the production capacity and benefits.

Figure 3:
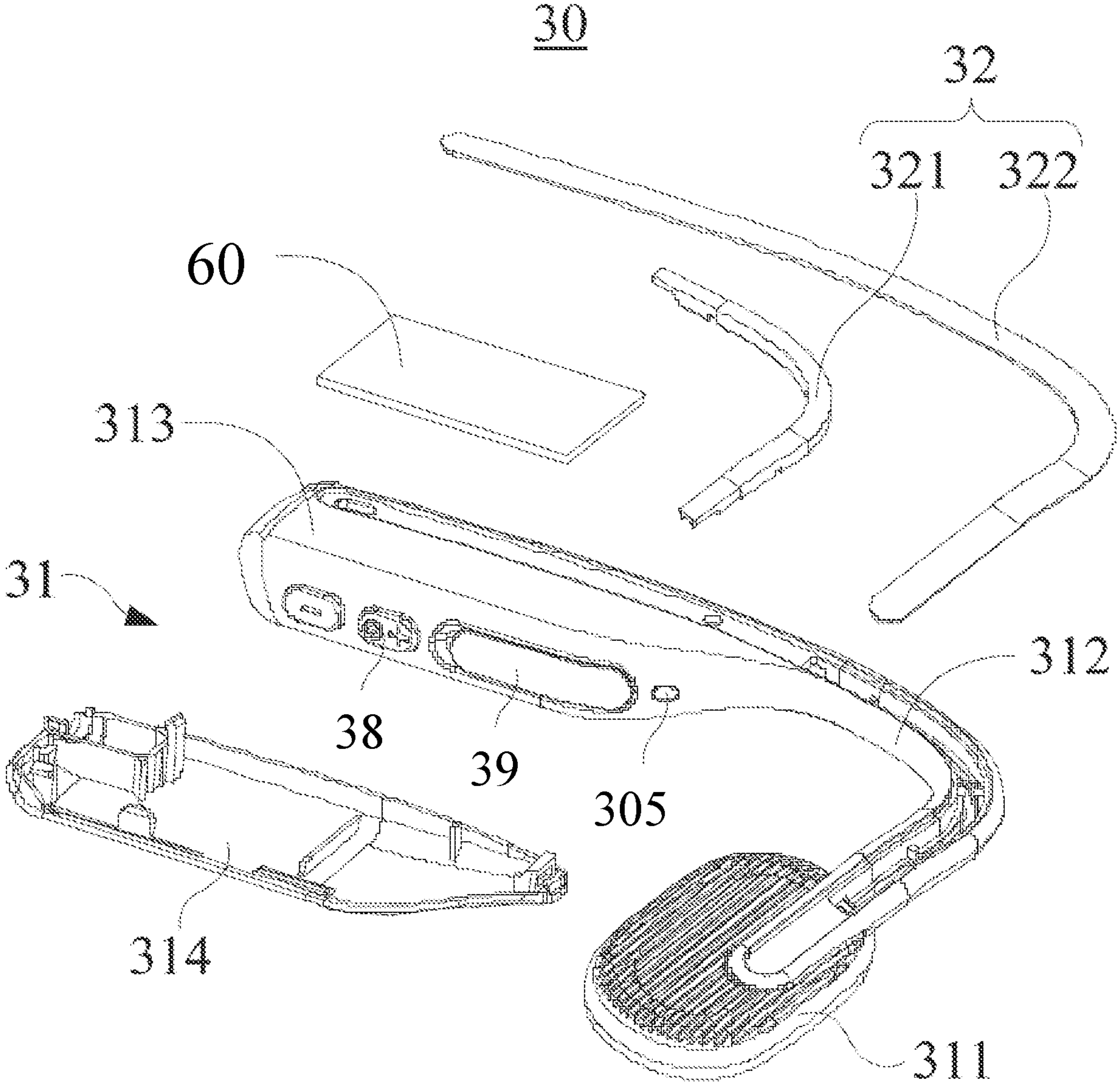
FIG. 3 is a schematic diagram illustrating a disassembled structure of an exemplary ear-hook assembly according to some embodiments of the present disclosure.
Figure 4:
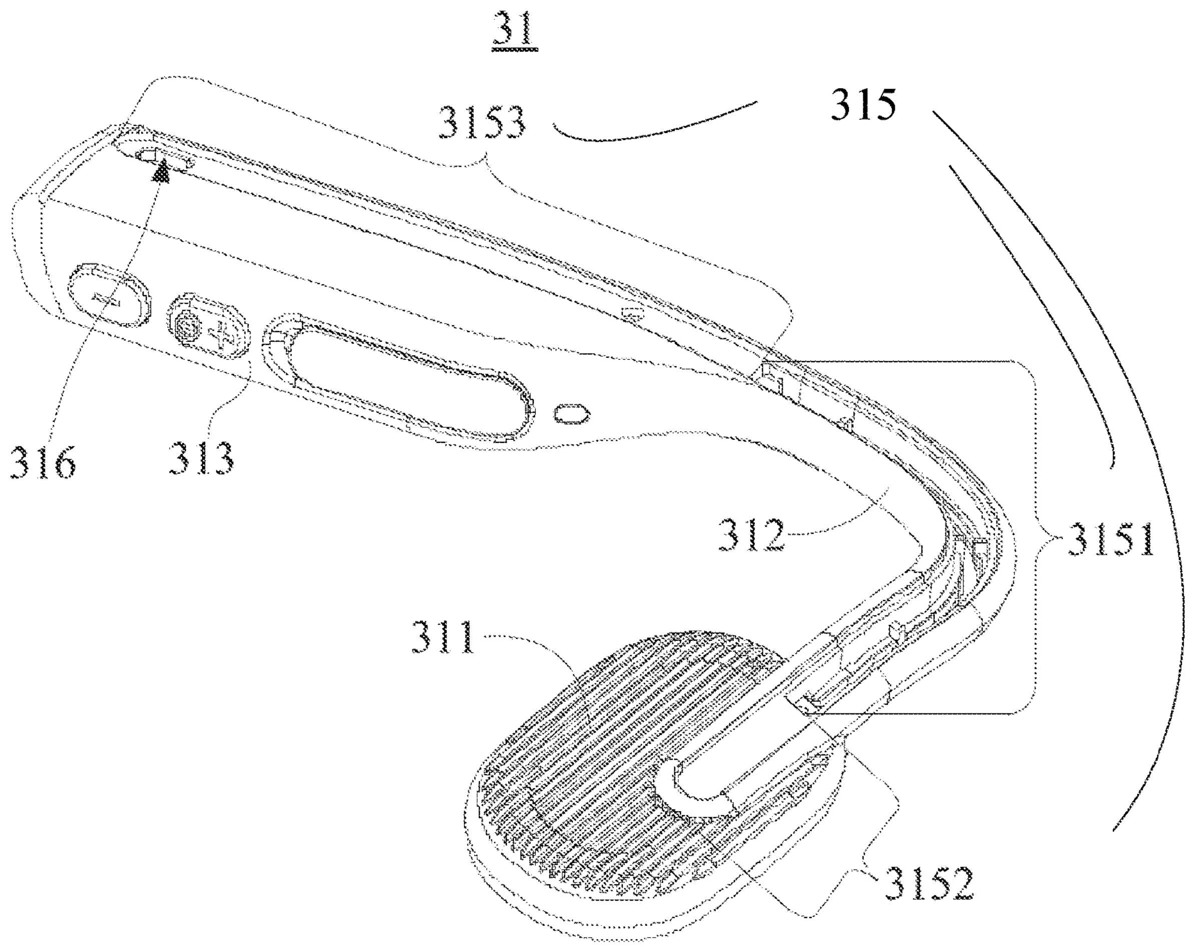
FIG. 4 is a structural schematic diagram illustrating an exemplary ear-hook housing according to some embodiments of the present disclosure.

FIG. 3 is a schematic diagram illustrating a disassembled structure of an exemplary ear-hook assembly according to some embodiments of the present disclosure. FIG. 4 is a structural schematic diagram illustrating an exemplary ear-hook housing according to some embodiments of the present disclosure.

As shown in FIG. 3, in some embodiments, the ear-hook assembly 30 may include an ear-hook housing 31 and a decoration member 32. The ear-hook housing 31 and the decoration member 32 may be connected through a glue connection, a clamping connection, a threaded connection, or the like, or any combination thereof. In some embodiments, when a user ears the apparatus 10, the decoration member 32 may be located on one side of the ear-hook housing 31 facing away from the core module 20. For example, the decoration member 32 may be located at an outside of the apparatus 10 to facilitate the decoration member 32 to decorate the ear-hook housing 31, thereby increasing an appearance of the apparatus 10. In some embodiments, the decoration member 32 may be protruded from the ear-hook housing 31. Alternatively, the decoration member 32 may be embedded in the ear-hook housing 31.

As shown in FIG. 3 and FIG. 4, the ear-hook housing 31 may include an earphone fixing portion 311, a bending transition portion 312, and an accommodation bin 313 that are sequentially connected. In some embodiments, the earphone fixing portion 311 may be configured to fix the core module 20. The bending transition portion 312 may be configured to connect the accommodation bin 313 and the earphone fixing portion 311. The bending transition portion 312 may be bent and disposed to be hung outside a human ear.

In some embodiments, one end of the accommodation bin 313 away from the earphone fixing portion 311 may be connected to the rear-hook assembly 40 by a connection such as a glue connection, a clamping connection, a threaded connection, or the like, or any combination thereof, to connect the ear-hook assembly 30 and the rear-hook assembly 40. In some embodiments, one end of the accommodation bin 313 may be arranged with an opening to accommodate the control circuit assembly 60 and/or the battery assembly. In some embodiments, the ear-hook housing 31 may further include a bin cover 314. The bin cover 314 may be disposed on an opening end of the accommodation bin 313. The bin cover 314 and the ear-hook housing 31 may form a chamber structure through cooperation.

In some embodiments, the control circuit assembly 60 or the battery assembly (the control circuit assembly 60 is shown in FIG. 3, and the battery assembly is not shown in FIG. 3) may be arranged in the ear-hook assembly 30. In some embodiments, the control circuit assembly 60 and the battery assembly may be arranged in the same ear-hook assembly 30, or may be arranged in the two ear-hook assemblies 30, respectively. In some embodiments, if the accommodation bin 313 is mainly used to accommodate the control circuit assembly 60, as shown in FIG. 3, the ear-hook assembly 30 may further include a control button 38 and an interface 39. In some embodiments, the control button 38 may be used to achieve functions such as turning on/off the apparatus 10, adjusting a volume, or the like, or any combination thereof. The interface 39 may be used to achieve functions such as data transmission, charge, or the like, or any combination thereof. In some embodiments, the control button 38 and the interface 39 may be arranged on the accommodation bin 313 to be connected to the control circuit assembly 60, thereby shortening a distance of wiring. In some embodiments, the control button 38 and the interface 39 may be partially exposed outside the ear-hook housing 31 to allow the user to perform corresponding operations.

In some embodiments, the interface 39 may include but is not limited to A-type USB interface, B-type USB interface, C-type USB interface, A-type Micro-USB interface, B-type Micro-USB interface, AB-type Micro-USB interface, A-type Mini-USB interface, B-type Mini-USB interface, or the like, or any combination thereof.

In some embodiments, the ear-hook assembly 30 may further include an indicator light 35. The indicator light 35 may be arranged on the accommodation bin 313 to be connected with the control circuit assembly 60, thereby shortening the distance of the wiring. In some embodiments, the indicator light 35 may be partially exposed to the ear-hook housing 31 as shown in FIG. 3. In some embodiments, the indicator light 35 may further include a light source hiding in the ear-hook housing 31 and a light guide member (not shown in FIG. 3 and FIG. 4) partially exposed outside the ear-hook housing 31. Therefore, in some embodiments, the indicator light 35 may be configured to prompt the user in a scenario that the apparatus 10 is charging, the power of the apparatus 10 is insufficient, or the like.

It should be noted that when a user wears the apparatus 10, the apparatus 10 may be hung outside the human ear. For example, the core module 20 may be located on a front side of the human ear. The control circuit assembly 60 or the battery assembly may be located on a rear side of the human ear. For example, the human ear may be a fulcrum to support the apparatus 10. Therefore, most of the weight of the apparatus 10 may be bored by the human ear. It may be uncomfortable for the user after wearing the apparatus 10 for a long time. To this end, a soft material may be selected as a material of the ear-hook housing 31 (especially the bending transition portion 312), so that the wearing comfort of the apparatus 10 may be improved.

In some embodiments, the material of the ear-hook housing 31 may include polycarbonate (PC), polyamide (PA), acrylonitrile-butadiene-styrene copolymer (ABS), polystyrene (PS), high impact polystyrene (HIPS), polypropylene (PP), polyethylene terephthalate (PET), Polyvinyl chloride (PVC), polyurethanes (PU), polyethylene (PE), phenol formaldehyde (PF), urea-formaldehyde (UF), melamine-formaldehyde (MF), silica gel, or the like, or any combination thereof.

In some embodiments, since the material of the ear-hook housing 31 is soft, a stiffness of the ear-hook housing 31 may be insufficient. A structure of the ear-hook housing 31 may not be maintained under an external force. The ear-hook housing 31 may be broken since an insufficient strength. To this end, in some embodiments, an elastic metal filament (not shown in FIG. 3 and FIG. 4) may be arranged in the ear-hook housing 31 (at least the bending transition portion 312) to improve the strength of the ear-hook housing 31, thereby increasing the reliability of the ear-hook housing 31. In some embodiments, a material of the elastic metal filament may include spring steel, titanium alloy, titanium nickel alloy, chromium molybdenum steel, or the like, or any combination thereof. In some embodiments, the ear-hook housing 31 may be a structured piece integrally formed by metal insert injection molding.

Based on the above detailed description, since the core module 20 is arranged at one end of the ear-hook assembly 30 (e.g., one end of the earphone fixing portion 311), the control circuit assembly 60 or the battery assembly may be arranged on the other end of the ear-hook assembly 30 (e.g., the other end of the accommodation bin 313). Therefore, when the core module 20 is connected with the control circuit assembly 60 and the battery assembly through a wire, the wire may at least pass through a region where the bending transition portion 312 is located. In some embodiments, in order to the appearance of the apparatus 10, the wire may not be exposed to the ear-hook housing 31, but passed through the ear-hook housing 31, so that the bending transition portion 312 may at least cover the wire. However, since the material of the wire is soft, it may be difficult for the wire to pass through the ear-hook housing 31.

To this end, in some embodiments, as shown in FIG. 4, a first groove 315 may be arranged on the ear-hook housing 31 (at least on the bending transition portion 312). The first groove 315 may be configured for wiring to reduce the difficulty that the wire passes through the ear-hook housing 31. In some embodiments, the first groove 315 may be arranged on one side of the ear-hook housing 31. In some embodiments, the decoration member 32 may be embedded and fixed in the first groove 315 corresponding to the bending transition portion 312 to form a wiring channel (not shown in FIG. 3). Therefore, the wire may be extended into the accommodation bin 313 through the wiring channel in the core module 20, so that the core module 20 may be connected with the control circuit assembly 60 and the battery assembly 50 through the wire. Therefore, when the wire is passed through the ear-hook housing 31 through the first groove 315, the decoration member 32 may cover the wire to avoid the wire being exposed outside the ear-hook housing 31. In some embodiments, the decoration member 32 may be configured to decorate the ear-hook housing 31, and hide the wire, so that the decoration member 32 may achieve "one piece with dual purposes."

In some embodiments, the decoration member 32 may include, but is not limited to, a sticker, a plastic member, a metal member, or the like. Geometric patterns, cartoon patterns, logo patterns, or the like, may be printed on the decoration member 32. Fluorescent materials, reflective materials, or the like, may be coated on the decoration member 32 to achieve a corresponding decorative effect.

In some embodiments, as shown in FIG. 3, the decoration member 32 may include a decoration bracket 321 and a decoration strip 322. In some embodiments, as shown in FIG. 3 and FIG. 4, the decoration bracket 321 may be bent and arranged corresponding to the bending transition portion 312. Therefore, the decoration bracket 321 and the first groove 315 on the bending transition portion 312 may be fitted to form a wiring channel. In some embodiments, when the decoration bracket 321 is embedded and fixed in the first groove 315 corresponding to the bending transition portion 312, the wire may extend from the core module 20 to the accommodation bin 313 through the wiring channel. In some embodiments, the decoration strip 322 may be embedded in the first groove 315 and fixed to the decoration bracket 312. In some embodiments, the decoration bracket 321 may include a plastic piece. The decoration bracket 321 may be assembled with the ear-hook housing 31 by a glue connection and/or a clamping connection.

Figure 8:
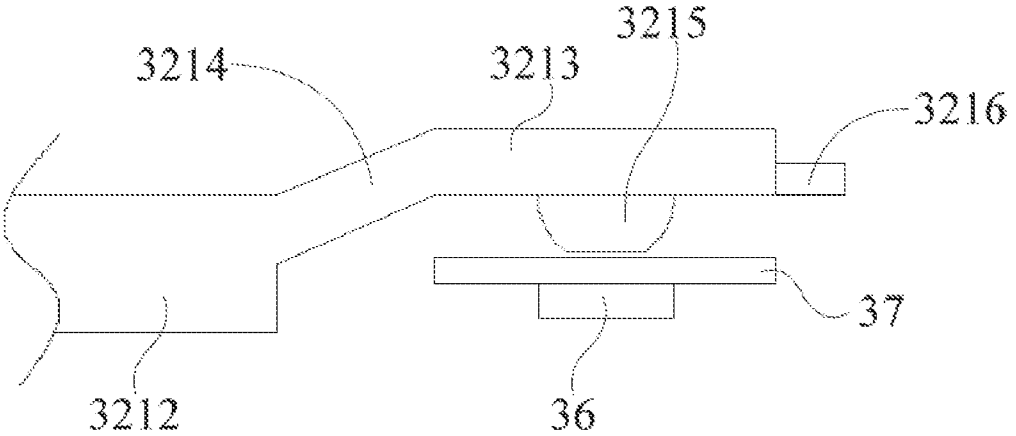
FIG. 8 is a schematic diagram illustrating a principle of a decoration bracket triggering a button according to some embodiments of the present disclosure.

In some embodiments, the decoration strip 322 may include a sticker. The decoration strip 322 may be attached to the decoration bracket 312 by a glue connection. When the user alters the decoration effect of the decoration member 32, the decoration strip 322 may be altered without removing the whole decoration member 32 from the ear-hook housing 31. In some embodiments, as shown in FIG. 8, a second groove 3211 may be arranged on one side of the decoration bracket 321 toward the ear-hook housing 31. Therefore, when the decoration bracket 321 is embedded and fixed to the first groove 315 on the decorative bracket 321, the second groove 3211 and the first groove 315 may cooperate with each other to form a wiring channel.

In some embodiments, a pit 316 may be arranged at a position of a bottom portion of the first groove 315 close to an end portion of the decoration strip 322 so that an end of the decoration strip 322 may be lifted from the first groove 315 by pressing the decoration strip 322 into the pit 316, which facilitates the replacement of the decoration strip 322. In some embodiments, the first groove 315 may further extend to the accommodation bin 313. The pit 316 may be arranged in the accommodation bin 313. In some embodiments, the pit 316 may be located outside a region that the decoration bracket 321 covers the first groove 315. The decoration strip 322 may be fitted and fixed to the decoration bracket 321 and cover the pit 316. At this time, an overall length of the decoration strip 322 may be greater than an overall length of the decoration bracket 321.

In some embodiments, the decoration bracket 321 and the decoration strip 322 may also be a structural member integrally formed. In some embodiments, the material of the decoration bracket 321 may be different from the material of the decoration strip 322. The decoration bracket 321 and the decoration strip 322 may be formed by two-color injection molding such that the decoration bracket 321 may function as a support and the decoration strip 322 may function as a decoration. For example, the overall length of the decoration strip 322 may be greater than or equal to the overall length of the decoration bracket 321.

As shown in FIG. 4, in some embodiments, the first groove 315 may be divided into a first sub-groove section 3151 located on the bending transition portion 312, a second sub-groove 3152 located on the earphone fixing portion 311, and a third sub-groove section 3153 located on the accommodation bin 313. In some embodiments, a depth of the first sub-groove section 3151 may be greater than both a depth of the second sub-groove section 3152 and a depth of the third sub-groove section 3153. Therefore, the first sub-groove section 3151 may be configured to accommodate the decoration bracket 321 and realize the wiring. The second sub-groove section 3152 and the third sub-groove section 3153 may be configured to accommodate the decoration strip 322. In other words, the decoration strip 322 may not only be located in the first sub-groove section 3151, but also extend into the second sub-groove section 3152 and the third sub-slot section 3153. In some embodiments, the pit 316 may be arranged in the third sub-groove section 3153. In some embodiments, the depth of the second sub-groove section 3152 may be equal to the depth of the third sub-groove section 3153. After the decoration bracket 321 is embedded and fixed to the first sub-groove section 3151, a surface of the decoration bracket 321 facing away from the ear-hook housing 31 may be substantially flat to a groove bottom of the second sub-groove section 3152 and a groove bottom of the third sub-groove section 3153, so that the decoration strip 322 may be flatly attached to the earphone fixing portion 311, the decoration bracket 321, and the accommodation bin 313.

In some embodiments, a bonding strength between the decoration strip 322 and the decoration bracket 321 may be less than a fixing strength between the decoration bracket 321 and the bending transition portion 312. In some embodiments, when the decoration strip 322 is glued to the decoration bracket 321, the bonding strength may refer to a glue strength between the decoration strip 322 and the decoration bracket 321. At this time, a size of the bonding strength may depend on a roughness of a glued surface of the decoration bracket 321, a roughness of a glued surface of the decoration strip 322, and/or an amount (and/or a viscosity) of a glue between the decoration strip 322 and the decoration bracket 321. In some embodiments, when the decoration bracket 321 is clamped with the bending transition portion 312, the fixing strength may refer to a clamping strength between the decoration bracket 321 and the bending transition portion 312. At this time, the fixing strength may depend on a fit clearance between the decoration bracket 321 and the bending transition portion 312, and/or a depth of the clamping between the decoration bracket 321 and the bending transition portion 312. Therefore, in some embodiments, when the decoration bracket 321 and the ear-hook housing 31 are assembled by a clamping connection, two ends of the decoration strip 322 may be further glued with the accommodation bin 313 and the earphone fixing portion 311, respectively, to further fix the decoration bracket 321. When the decoration bracket 321 is replaced to change the decoration effect of the decoration member 32, the decoration bracket 321 may not be brought by the excessive bonding strength between the decoration bracket 321 and the decoration strip 322.

Figure 5:
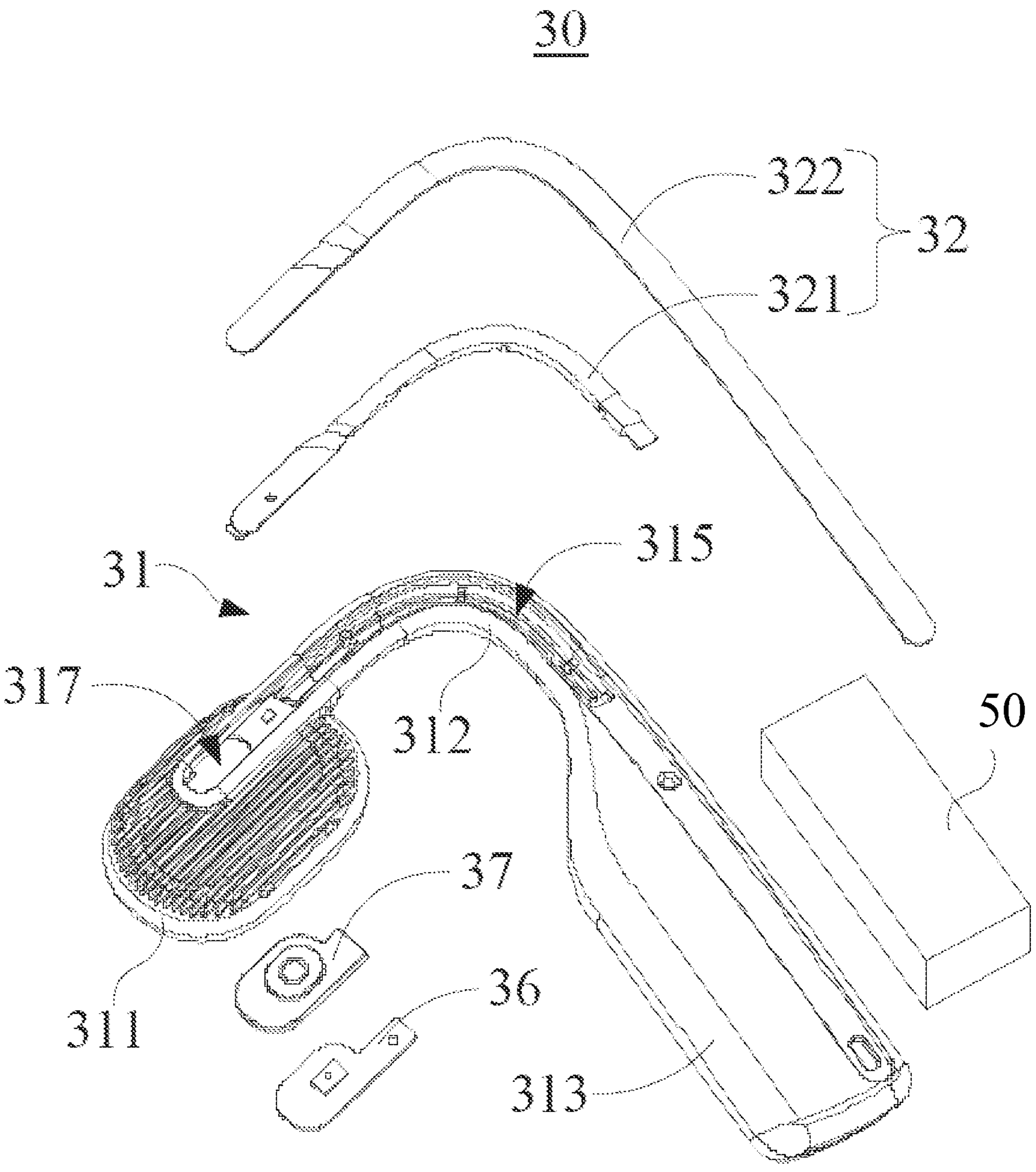
FIG. 5 is a schematic diagram illustrating a disassembled structure of an ear-hook assembly according to some embodiments of the present disclosure.

FIG. 5 is a schematic diagram illustrating a disassembled structure of an ear-hook assembly according to some embodiments of the present disclosure.

In some embodiments, as shown in FIG. 5, the ear-hook assembly 30 may further include a button 36. A button adaptation hole 317 may be arranged on the ear-hook housing 31. The decoration bracket 321 may be fixed on one side of the ear-hook housing 31. The button 36 may be arranged on the other side of the ear-hook housing 31 facing away from the decoration bracket 321, and exposed through the button adaptation hole 317. In some embodiments, the decoration bracket 321 may further extend in a form of a cantilever above the button 36 exposed through the button adaptation hole 317. The button 36 may be triggered when pressed by an external force. In some embodiments, the button 36 may be used to replace the above control button 38 to simplify the structure of the apparatus 10. Alternatively, the button 36 may coexist with the above control button 38. The button 36 may be configured to play/pause the apparatus 10, wake up by artificial intelligence (AI), or the like, so as to expand an interaction of the apparatus 10. In some embodiments, the button adaptation hole 317 may be arranged on the earphone fixing portion 311. The button 36 may be pressed on the earphone fixing portion 311 by the user.

In some embodiments, the ear-hook assembly 30 may further include a sealing member 37. The sealing member 37 may be arranged between the button 36 and the earphone fixing portion 311. In some embodiments, a material of the sealing member 37 may include silica gel, rubber, or the like, or any combination thereof. Therefore, a waterproof performance of the earphone fixing portion 311 at a region where the button 36 is located may be increased. A pressing touch of the button 36 may also be improved.

In some embodiments, when the core module 20 is arranged at one end of the ear-hook assembly 30 (e.g., one end where the earphone fixing portion 311 is located) and the battery assembly 50 is arranged on the other end of the ear-hook assembly 30 (e.g., the other end where the accommodation bin 313 is located), the wire may at least pass through the region where the bending transition section 312 is located so that the core module 20 may be connected with the battery assembly 50 through the wire. To this end, in some embodiments, as shown in FIG. 4, the first groove 315 may be arranged on at least one side of the earphone fixing portion 311 and the bending transition portion 312 close to the decoration bracket 321. The first groove 315 may be configured for wiring to reduce the difficulty of arrangement of the wire in the ear-hook housing 31. In some embodiments, one end of the first groove 315 may be in communication with the button adaptation hole 317. When the decoration bracket 321 is embedded and fixed to the first groove 315, the decoration bracket 321 may also cover the button adaptation hole 317 for triggering the button 36. Through the above manner, the decoration member 32 may be configured to decorate the ear-hook housing 31, shield the wire, shield the button 36, and trigger the button 36, so that the decoration member 32 may achieve "one piece with four functions."

It should be understood that, if the accommodation bin 313 shown in FIG. 3 is mainly used to accommodate the control circuit assembly 60, the accommodation bin 313 shown in FIG. 5 may be mainly used to accommodate the battery assembly 50. In some embodiments, if the ear-hook assembly 30 shown in FIG. 3 corresponds to the ear-hook on the left of the apparatus 10, then. the ear-hook assembly 30 shown in FIG. 5 may correspond to the ear-hook on the right of the apparatus 10. On the contrary, if the ear-hook assembly 30 shown in FIG. 3 corresponds to the ear-hook on the right of the apparatus 10, then the ear-hook assembly 30 shown in FIG. 5 may correspond to the ear-hook on the left of the apparatus 10. In other words, the control circuit assembly 60 and the battery assembly 50 may be arranged in the two ear-hook assemblies 30, respectively, which may not only increase the capacity of the battery assembly 50, but also improve the endurance of the apparatus 10. The weight of the apparatus 10 may also be balanced to improve the wearing comfort of the apparatus 10. In some embodiments, the control circuit assembly 60 and the battery assembly 50 may be connected via wires built in the rear-hook assembly 40. More details about the structure may be described in detail in the following contents.

Figure 6:
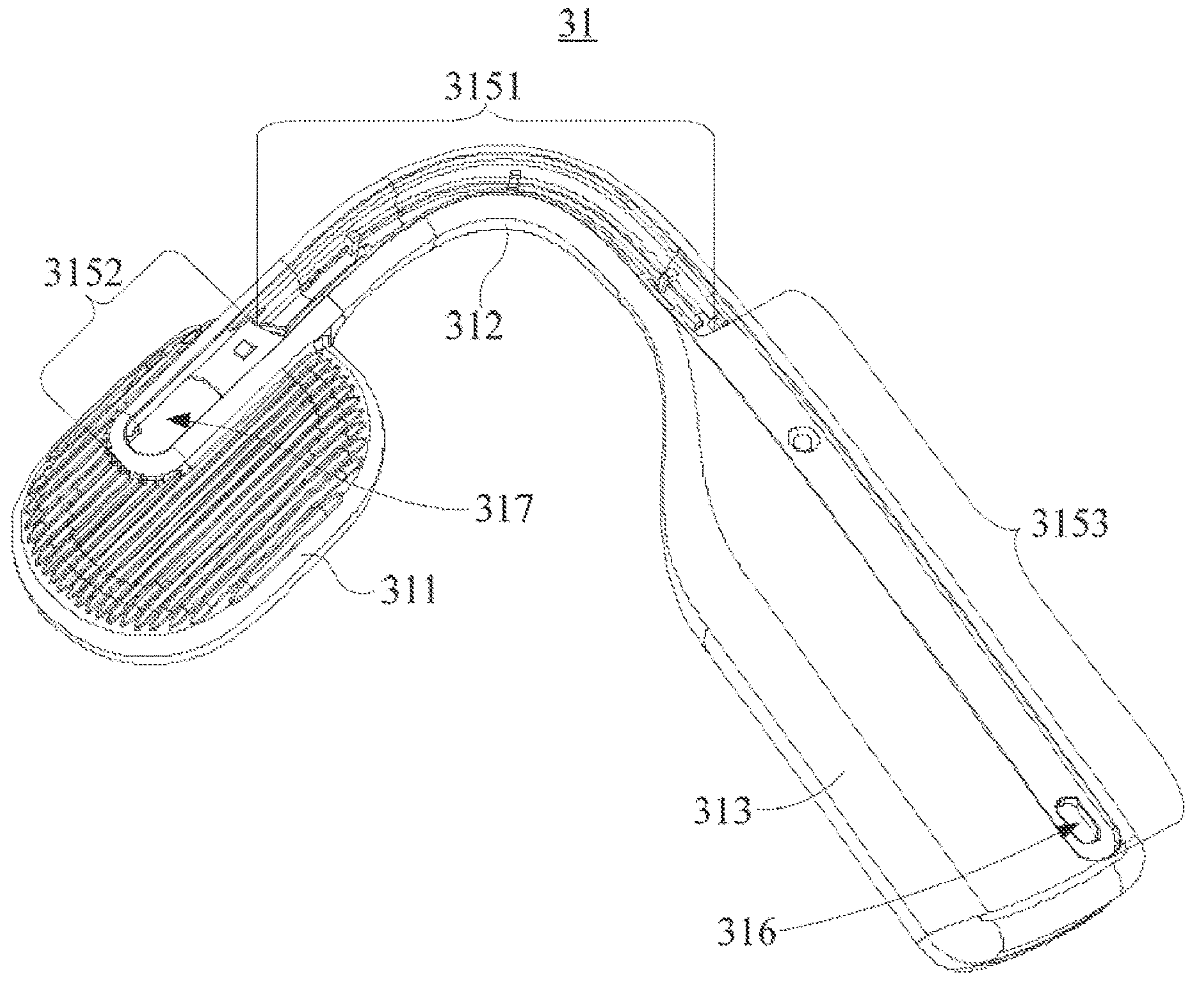
FIG. 6 is a structural schematic diagram illustrating an ear-hook housing according to some embodiments of the present disclosure.

As shown in FIG. 6, in some embodiments, the first groove 315 may be divided into the first sub-groove section 3151 located on the bending transition portion 312 and the second sub-groove section 3152 located on the earphone fixing portion 311. In some embodiments, the depth of the first sub-groove section 3151 may be greater than the depth of the second sub-groove section 3152, so that the first sub-groove section 3151 may be configured for wiring, and the second sub-groove section 3152 and the first sub-groove section 3151 may be configured to accommodate the decoration bracket 321. For example, the button adaptation hole 317 may be arranged in the second sub-groove section 3152. That is, projections of the button adaptation hole 317 and the second sub-groove section 3152 on the earphone fixing portion 311 may be at least partially overlapped. In some embodiments, the first groove 315 may also be divided into the third sub-groove section 3153 located on the accommodation bin 313. The third sub-groove section 3153 may be also configured with the pit 316. In some embodiments, the depth of the second sub-groove section 3152 may be greater than the depth of the third sub-groove section 3153, so that the third sub-groove section 3153 may be configured to accommodate the decoration strip 322. In other words, the decoration strip 322 may not only be located in the first sub-groove section 3151 and the second sub-groove section 3152, but also extend into the third sub-groove section 3153. For example, after the decoration bracket 321 is embedded and fixed to the first sub-groove section 3151, a surface of the decoration bracket 321 facing away from the ear-hook housing 31 may be substantially flat to the groove bottom of the third sub-groove section 3153. Therefore, the decoration strip 322 may be flatly attached to the earphone fixing portion 311, the decoration bracket 321, and the accommodation bin 313. The decoration bracket 321 may form a cantilever at a position of the second sub-groove section 3152 corresponding to the button adaptation hole 317.

Figure 7:
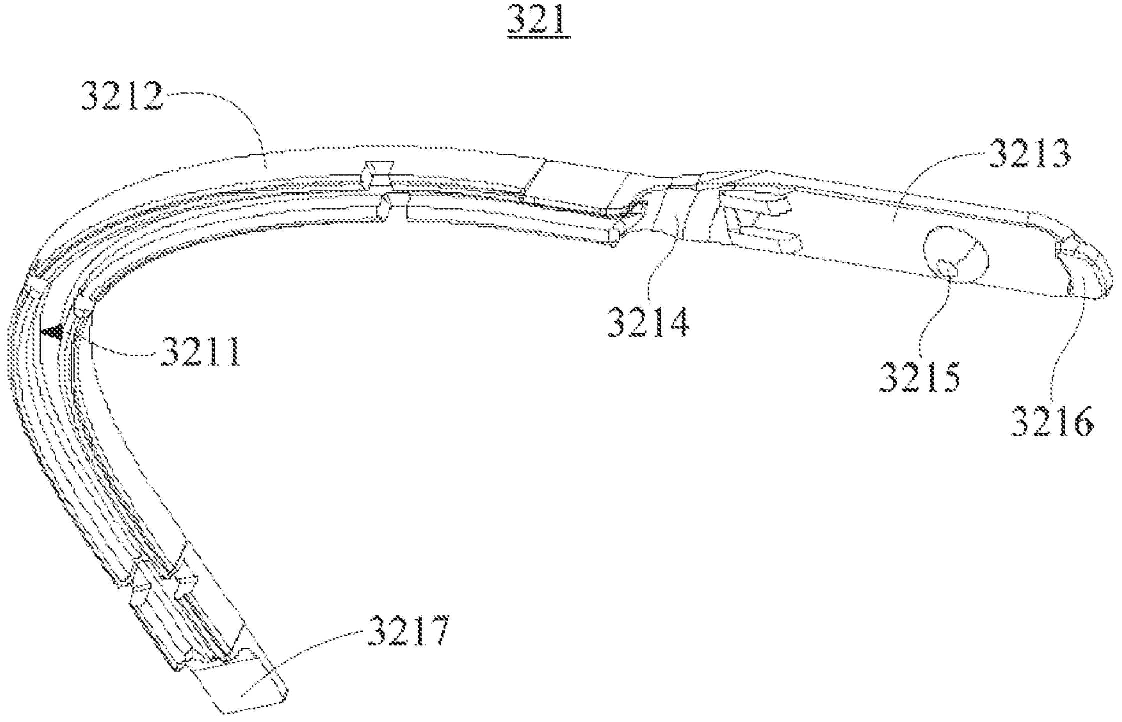
FIG. 7 is a schematic diagram illustrating a decoration bracket close to a side of an ear-hook housing according to some embodiments of the present disclosure.

FIG. 7 is a schematic diagram illustrating a decoration bracket close to a side of an ear-hook housing according to some embodiments of the present disclosure. FIG. 8 is a schematic diagram illustrating a principle of a decoration bracket triggering a button according to some embodiments of the present disclosure.

As shown in FIG. 7 and FIG. 8, in some embodiments, the decoration bracket 321 may include a fixing portion 3212 corresponding to the first sub-groove section 3151 and a pressing portion 3213 corresponding to the second sub-groove section 3152. In some embodiments, a thickness of the fixing portion 3212 may be greater than a thickness of the pressing portion 3213, so that the fixing portion 3212 may be configured to assemble the decoration bracket 321 and the ear-hook housing 31. The pressing portion 3213 may be configured to trigger the button 36. In some embodiments, when the second groove 3211 is arranged on one side of the decoration bracket 321 toward the ear-hook housing 31, the second groove 3211 may be arranged on the fixing portion 3212.

In some embodiments, the decoration bracket 321 may include a connection portion 3214 connected between the fixing portion 3212 and the pressing portion 3213. In some embodiments, the connection portion 3214 may be bent and extended toward a side away from the ear-hook housing 31 relative to the fixing portion 3212. The pressing portion 3213 may be bent and extended toward a side close to the ear-hook housing 31 relative to the fixing portion 3212. At this time, the connection portion 3214 may cause the pressing portion 3213 to be suspended relative to the fixing portion 3212. There may be a certain distance between the pressing portion 3213 and the fixing portion 3212. In some embodiments, the distance may be greater than or equal to a trigger stroke of the button 36. Therefore, a problem that when one end of the decoration bracket 321 (e.g., one end of the pressing portion 3213) is pressed by the user, the other end of the decorative bracket 321 is lifted may be effectively improved.

In some embodiments, one side of the pressing portion 3213 close to the ear-hook housing 31 may also be configured with a button protrusion 3215. Therefore, when the pressing portion 3213 is pressed by an external force, the button protrusion 3215 may trigger the button 36. In some embodiments, projections of the button protrusion 3215 and the button 36 may be at least partially overlapped on the earphone fixing portion 311. A valid area of the button protrusion 3215 in contact with the button 36 may be less than a valid area of the pressing portion 3213 in contact with the button 36. Therefore, a trigger difficulty of the button 36 may be reduced. For example, when the sealing component 37 is arranged between the earphone fixing unit 311 and the button 36, the sealing component 37 may be deformed first before the button 36 is triggered. Based on a relationship equation $F \propto \varepsilon \times S$, in a case where a same external force F is applied by the user, if a valid area S of a region of the sealing component 37 deformed is smaller, a deformation $\varepsilon$ generated by the sealing component 37 may be greater, which may more easily trigger the button 36. In some embodiments, the button protrusion 3215 may reduce the valid area compared to the pressing portion 3213.

In some embodiments, a blocking portion 3216 may be arranged on an end portion of the decoration bracket 321 close to the earphone fixing portion 311. In some embodiments, the blocking portion 3216 may be configured to form a block on an inner surface of the fixing portion 311 facing away from the decoration bracket 321 to prevent the end portion of the decoration bracket 321 from being lifted from the first groove 315, for example, under an external force. As shown in FIG. 8, in some embodiments, the blocking portion 3216 may be arranged at one end of the pressing portion 3213 away from the fixing portion 3212. At this time, due to a blocking effect between the blocking portion 3216 and the earphone fixing portion 311, after the decoration bracket 321 is deformed under the external force to trigger the button 36, the decoration bracket 321 may not be lifted due to an excessive elastic recovery.

Referring to FIG. 3 or FIG. 7, a clinch portion 3217 may be arranged on one end of the decoration bracket 321 close to the accommodation bin 313 (e.g., the other end of the decoration bracket 321 away from the pressing portion 3213). In some embodiments, a thickness of the clinch portion 3217 may be less than the thickness of the fixing portion 3212. Therefore, the clinch portion 3217 may be configured for structural avoidance with the reinforcing structure of the ear-hook housing 31 (e.g., located between the bending transition portion 312 and the accommodation bin 313).

Figure 9:
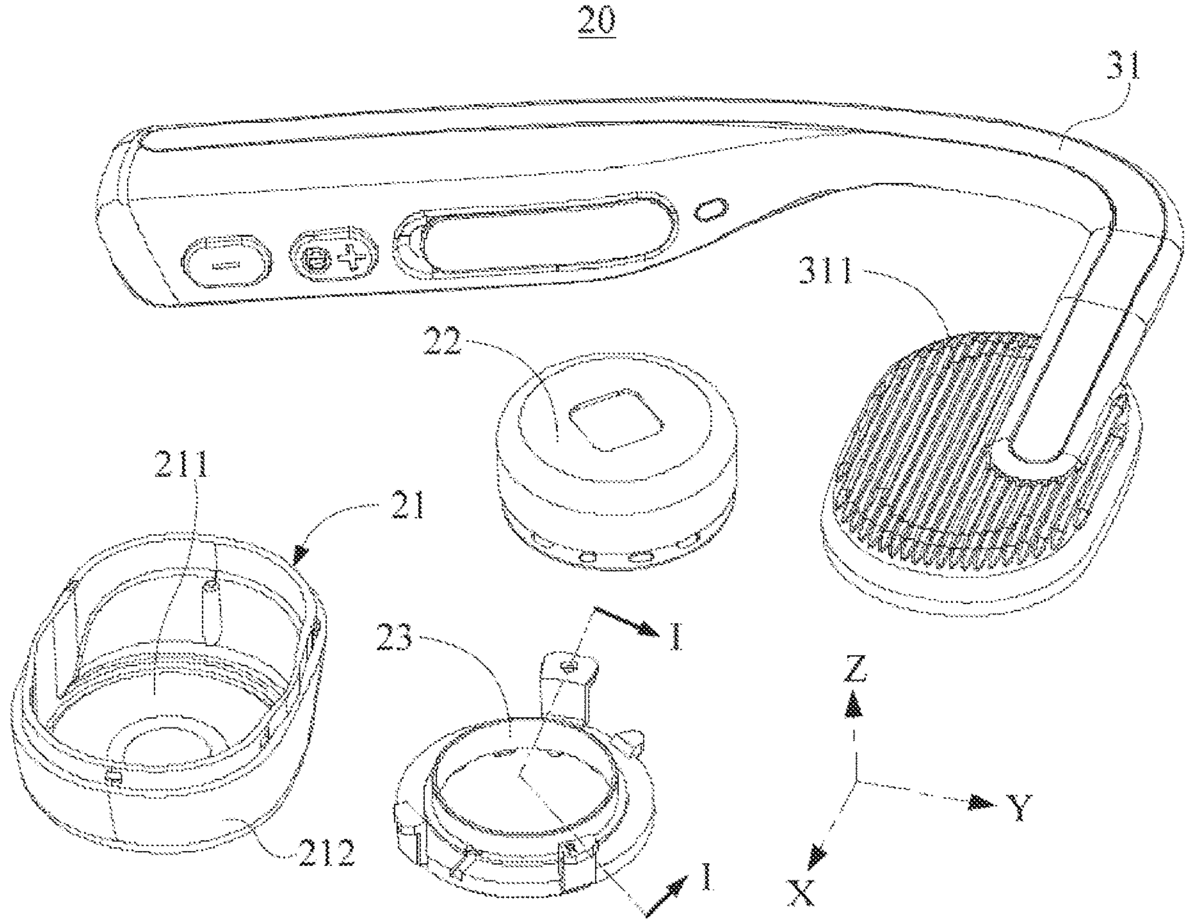
FIG. 9 is a schematic diagram illustrating a disassembled structure of an exemplary core module according to some embodiments of the present disclosure.

FIG. 9 is a schematic diagram illustrating a disassembled structure of an exemplary core module according to some embodiments of the present disclosure.

As shown in FIG. 9, the core module 20 may include a core housing 21 and a core 22. In some embodiments, one end of the core housing 21 may include an opening. The ear-hook housing 31 (e.g., the earphone fixing portion 311) may be arranged on an opening end of the core housing 21 (e.g., the end of the core housing 21 with the opening) to form a chamber structure for accommodating the core 22. In some embodiments, the ear-hook housing 31 may be equivalent to a cover of the core housing 21. Compared to an insertion assembly of the ear-hook structure and the core structure, a cover assembly of the ear-hook housing 31 and the core housing 21 according to some embodiments of the present disclosure may improve a stress problem of an insertion position of the ear-hook structure and the core structure, thereby increasing the reliability of the apparatus 10.

It should be noted that the ear-hook housing 31 schematically described in FIG. 9 is merely for illustration of a relative position relationship between the ear-hook housing and the core housing, which may further implicitly indicate a possible assembly between the ear-hook housing and the core housing.

In some embodiments, the core 22 may be directly or indirectly fixed to the core housing 21, so that the core 22 may generate vibrations under an excitation of the electrical signal. The core housing 21 may be driven to vibrate with the vibrations. When the user wears the apparatus 10, the skin contact region of the core housing 21 may be in contact with the skin of the user, so that the vibrations may be transmitted to the cochlear nerve through the human skull. Furthermore, the user may hear the sound played by the apparatus 10. In some embodiments, the core module 20 may further include a core bracket 23. The core bracket 23 may be configured to fix the core 22 in the core housing 21.

For a bone conduction earphone, the flatter the frequency response curve, the better the sound quality of the bone conduction earphone. The larger the stiffness, the less the structure deformation generated under a force, and a resonance with a higher frequency may be generated. Therefore, in order to obtain a better quality of the sound, the stiffness of the core housing 21 may be as large as possible. In some embodiments, a material of the core housing 21 may include a mixture of at least one material such as polycarbonate, polyamide, acrylonitrile-butadiene-styrene copolymer, or the like, and glass fibers and/or carbon fibers. In some embodiments, the material of the core housing 21 may include a mixture of the carbon fibers and polycarbonate in a certain proportion, a mixture of the glass fibers and polycarbonate in another proportion, or a mixture of the glass fibers and the polyamide in yet another proportion. In some embodiments, the material of the core housing 21 may include a mixture of the carbon fibers, the glass fibers, and polycarbonate in a certain proportion. In some embodiments, after different proportions of the carbon fibers and/or glass fibers are added, elastic moduli of the materials may be different, which may also result in different rigidities of the core housing 21. For example, 20% to 50% of glass fibers may be added to polycarbonate. An elastic modulus of the material may be 6 to 8 GPa.

Based on the detailed description, the ear-hook housing 31 (e.g., the earphone fixing portion 311) may be a portion of the core module 20 to form a chamber structure for accommodating the core 22. In some embodiments, in order to improve the wearing comfort of the apparatus 10, the ear-hook housing 31 may be made of a soft material so that the stiffness of the ear-hook housing 31 may be reduced. In some embodiments, the ear-hook housing 31 may be made of a soft material (e.g., a material having a small elastic modulus, such as polycarbonate, polyamide, etc., the elastic modulus may be within a range of 2 to 3 GPa). The core housing 21 may be made of a hard material (e.g., a material having a large elastic modulus, such as polycarbonate including 20% to 50% of glass fibers, etc., the elastic modulus of the material may be within a range of 6 to 8 GPa). Therefore, when the ear-hook housing 31 covers the core housing 21 to form the chamber structure for accommodating the core 22, since the stiffness of the ear hook housing 31 (e.g., the earphone fixing portion 311) is less than the stiffness of the core housing 21, the bone conduction earphone may easily leak the sound, which may further affect the favorability of the user. Further, after the ear-hook housing 31 is connected with the core housing 21, since the stiffness of the ear-hook housing 31 is different from the stiffness of the core housing 21, the structure may easily generate resonance in a relatively low frequency.

In some embodiments, a resonant frequency of a structure may be related to the stiffness of the structure. Under a same mass, the larger the stiffness of the structure, the higher the resonant frequency. In some embodiments, the stiffness K of the structure may be related to a material (e.g., an elastic modulus), a structure form, etc., of the structure. In some embodiments, the greater the elastic modulus E of the material, the greater the stiffness K of the structure. The greater the thickness t of the structure, the greater the stiffness K of the structure. The less the area S of the structure, the greater the stiffness K of the structure. At this time, the above relationship may be simply described using the relationship equation $K \propto (E \cdot t)/S$. Therefore, increasing the elastic modulus E of the material, increasing the thickness t of the material, reducing the area S of the structure, or the like, or any combination thereof, may increase the stiffness K of the structure, which may further increase the resonance frequency of the structure.

In some embodiments, when the elastic modulus of the core housing 21 is greater than the elastic modulus of the ear-hook housing 31, the earphone fixing portion 311 may be configured with a reinforcing structure. In some embodiments, the reinforcing structure 318 may be configured to cause a ratio of the difference between the stiffness K1 of the skin contact region of the core housing 21 and the stiffness K2 of the earphone fixing portion 311 and the stiffness K1 of the skin contact region of the core housing 21 to be less than or equal to a preset ratio threshold. For example, the preset ratio threshold may be 10%. That is, $(K1-K2)/K1 \leq 10\%$, or $K2/K1 \geq 90\%$. Therefore, the core housing 21 may have a sufficiently large stiffness to cause the resonant frequency of the core housing 21 to be located at a region with a frequency as high as possible. The difference between the stiffness of the earphone fixing portion 311 and the stiffness of the core housing 21 may be reduced to increase the resonant frequency of the structure and reduce the sound leakage.

Figure 10A:
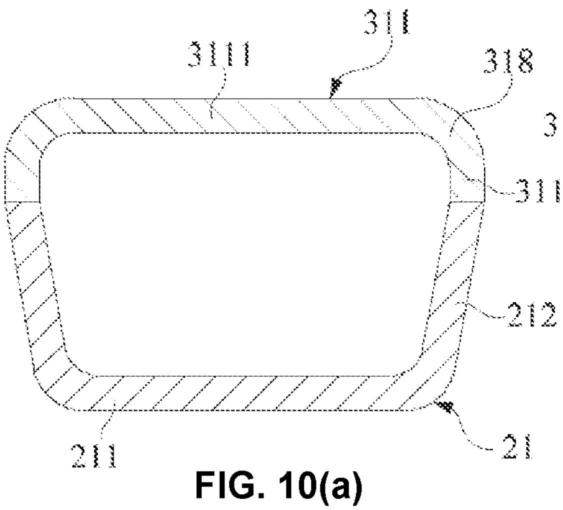
FIG. 10(*a*) is a schematic diagram illustrating a cross-sectional structure of a reinforcing structure arranged on an ear-hook housing according to some embodiments of the present disclosure.
Figure 10B:
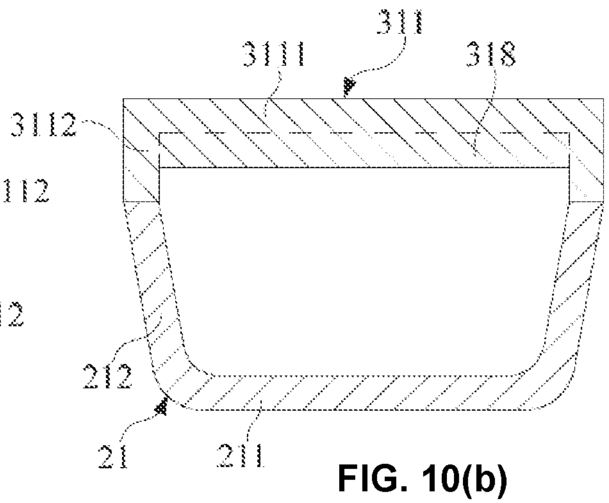
Figure 11A:
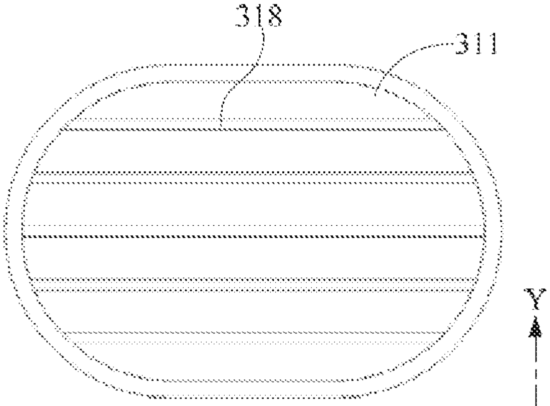
FIG. 11(*a*) is a schematic diagram illustrating a top view structure of a reinforcing structure arranged on an ear-hook housing according to some embodiments of the present disclosure.
Figure 11B:
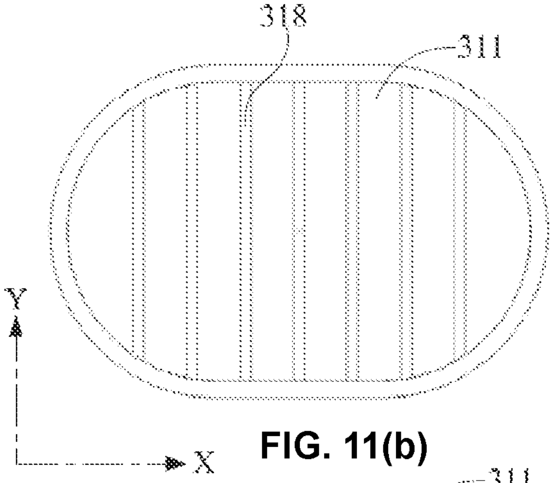
Figure 11C:
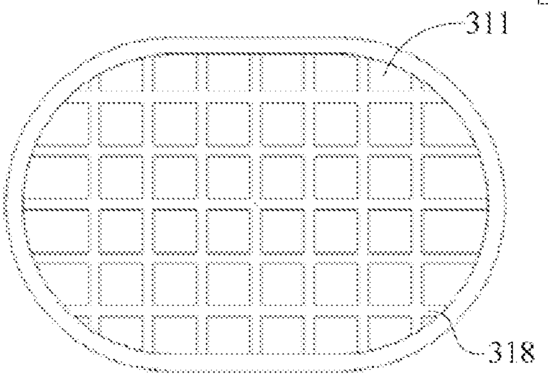
Figure 11D:
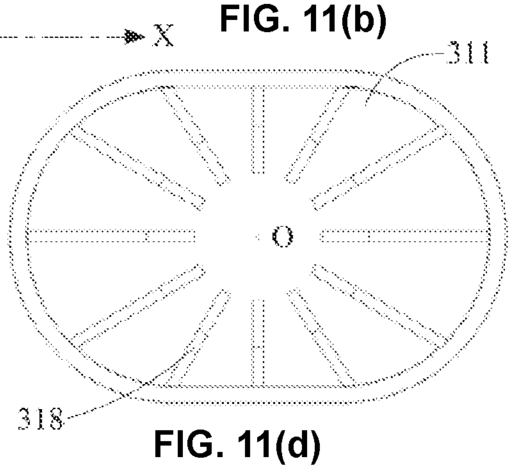

FIG. 10(*a*) is a schematic diagram illustrating a cross-sectional structure of a reinforcing structure arranged on an ear-hook housing according to some embodiments of the present disclosure. FIG. 10(*b*) is a schematic diagram illustrating a cross-sectional structure of a reinforcing structure arranged on an ear-hook housing according to some embodiments of the present disclosure.

As shown in FIG. 10(*a*) and FIG. 10(*b*), the core housing 21 may include a bottom wall 211 and an annular peripheral wall 212. In some embodiments, the bottom wall 211 may be the skin contact region of the core housing 21. One end of the annular peripheral wall 212 may be integrally connected with the bottom wall 211. In other words, the bottom wall 211 may be configured to be in contact with the skin of the user. In some embodiments, the earphone fixing portion 311 may include a fixing body 3111 connected with the bending transition portion 312 and an annular flange 3112 integrally connected with the fixing body 3111 and extending toward the core housing 21. In some embodiments, the annular flange 3112 and the other end of the annular peripheral wall 212 away from the bottom wall 211 may be connected with each other. The annular flange 3112 and the other end of the annular peripheral wall 212 may be connected by a glue connection or a combination of the glue connection and a clamping connection.

In some embodiments, a shape of the bottom wall 211 may include a triangle, a trapezoid, a rectangle, a square, a circle, an ellipse, an oval-like shape (similar to the shape of the earphone fixing portion 311 shown in FIG. 11), or the like, or any combination thereof. In some embodiments, the annular peripheral wall 212 may be perpendicular to the bottom wall 211. That is, an area of the opening end of the core housing 21 may be equal to an area of the bottom wall 211. The annular peripheral wall 212 may be inclined outward relative to the bottom wall 211 (e.g., an inclination angle is less than or equal to 30 degrees). That is, the area of the opening end of the core housing 21 may be greater than the area of the bottom wall 211.

Merely by way of example, the bottom wall 211 may be an oval-like shape, and the annular peripheral wall 212 may be inclined 10 degrees outward relative to the bottom wall 211. Therefore, under the premise of ensuring a certain wearing comfort (because the bottom wall 211 as the skin contact region of the core housing 21 is in contact with the skin of the user, the region may not be too small), the area of the bottom wall 211 may be reduced. The resonance frequency of the core housing 21 may be increased.

As shown in FIG. 10(*a*), the reinforcing structure 318 may include an arcuate structure arranged between the fixing body 3111 and the annular flange 3112. That is, the reinforcing structure 318 may be performed by a fillet process. In some embodiments, for the earphone fixing portion 311, the structure of the earphone fixing portion 311 may include the fixing body 3111 and the reinforcing structure 318 with the arcuate structure. In some embodiments, since a size of the annular flange 3112 in a thickness direction of the earphone fixing portion 311 is small, the annular flange 3112 may be integrated with the above arcuate structure. Therefore, the above arcuate structure may be configured to reduce the valid area of the earphone fixing portion 311 and increase the stiffness of the earphone fixing portion 311, thereby reducing the difference between the stiffness of the earphone fixing portion 311 and the stiffness of the core housing 21. It should be noted that the size of the arcuate structure may be reasonably designed according to stiffness requirements of the earphone fixing portion 311, which may not be limited herein.

As shown in FIG. 10(*b*), the reinforcing structure 318 may be a thickened layer integrally configured with the fixing body 3111. That is, the reinforcing structure 318 may be performed by a thickening process. In some embodiments, a material of the thickened layer may be the same as the material of the ear-hook housing 31. For example, the material of the thickened layer may further include polycarbonate, polyamide, an acrylonitrile-butadiene-styrene copolymer, or the like, or any combination thereof. In some embodiments, the reinforcing structure 318 may be located on one side of the fixing body 3111 close to the core housing 21. Alternatively, the reinforcing structure 318 may be located on the other side of the core housing 21 facing away from the fixing body 3111. In some embodiments, the reinforcing structure 318 may also be located on two sides of the fixing body 3111. In some embodiments, the earphone fixing portion 311 may include the fixing body 3111 and the reinforcing structure 318 configured with the thickened layer. In some embodiments, since the size of the annular flange 3112 in the thickness direction of the earphone fixing portion 311 is small, the annular flange 3112 may be integrated with the above thickened structure. Therefore, the above thickened structure may be configured to reduce the valid area of the earphone fixing portion 311 and increase the stiffness of the earphone fixing portion 311, thereby reducing the difference between the stiffness of the earphone fixing portion 311 and the stiffness of the core housing 21. It should be noted that the size of the thickened layer may be reasonably designed according to the stiffness requirements of the earphone fixing portion 311, which may not be limited herein.

In some embodiments, the reinforcing structure 318 may include a metal piece. In some embodiments, the material of the metal member may include aluminum alloys, magnesium alloys, titanium alloys, nickel alloys, chromium molybdenum steel, stainless steel, or the like, or any combination thereof. At this time, the reinforcing structure 318 and the earphone fixing portion 311 may be a structure piece formed by metal insert injection molding. Therefore, the metal member may effectively increase the stiffness of the earphone fixing portion 311, thereby reducing the difference between the stiffness of the earphone fixing portion 311 and the core housing 21. It should be noted that parameters such as a material, a size, etc., of the metal member may be reasonably designed according to the stiffness requirements of the earphone fixing portion 311, which may not be limited herein.

FIG. 11(*a*) is a schematic diagram illustrating a top view structure of a reinforcing structure arranged on an ear-hook housing according to some embodiments of the present disclosure. FIG. 11(*b*) is a schematic diagram illustrating a top view structure of a reinforcing structure arranged on an ear-hook housing according to some embodiments of the present disclosure.

In some embodiments, as shown in FIG. 11(*a*), FIG. 11(*b*), FIG. 11(*c*), and FIG. 11(*d*), the reinforcing structure 318 may include a reinforcing rib arranged on the earphone fixing portion 311. In some embodiments, the reinforcing rib may be distributed on one side of the earphone fixing portion 311 close to the core housing 21. In some embodiments, the reinforcing structure 318 may include a plurality of reinforcing ribs. The plurality of reinforcing ribs may be arranged in parallel as shown in FIG. 11(*a*) and FIG. 11(*b*) or arranged to form a grid pattern as shown in FIG. 11(*c*). The plurality of reinforcing ribs may also be arranged in a radial shape as shown in FIG. 11(*d*) with a preset reference point on the earphone fixing portion 311 as a center. In some embodiments, a material of the reinforcing rib may be the same as the material of the ear-hook housing 31. For example, the material of the reinforcing rib may include polycarbonate, polyamide, an acrylonitrile-butadiene-styrene copolymer, or the like, or any combination thereof. Therefore, compared with injection molding of metal members on the earphone fixing part 311 or directly thickening the earphone fixing part 311, the reinforcing ribs arranged on the earphone fixing portion 311 may increase the stiffness of the earphone fixing portion 311 and balance the weight of the earphone fixing portion 311.

In some embodiments, as shown in FIG. 11(*a*), FIG. 11(*b*), FIG. 11(*c*), and FIG. 11(*d*), the earphone fixing portion 311 may include a long axis direction (e.g., a direction indicated by a dotted line X in FIG. 11) and a short axis direction (e.g., a direction indicated by a dotted line Y in FIG. 11). In some embodiments, a size of the earphone fixing portion 311 along the long axis direction may be greater than a size of the earphone fixing portion 311 along the short axis direction. The following is an exemplary description of the distribution of the reinforcing ribs.

As shown in FIG. 11(*a*), in some embodiments, a plurality of reinforcing ribs may be strip-shaped and extend along the long axis direction to be arranged side by side along the short axis direction. At this time, the reinforcing structure 318 may be simplified as adding reinforcing ribs on a long-side of the earphone fixing portion 311.

As shown in FIG. 11(*b*), in some embodiments, a plurality of reinforcing ribs may be strip-shaped and extend along the short axis direction to be arranged side by side along the long axis direction. At this time, the reinforcing structure 318 may be simplified as adding reinforcing ribs on a short-side of the earphone fixing portion 311.

As shown in FIG. 11(*c*), in some embodiments, a plurality of reinforcing ribs may be arranged along the long axis direction and the short axis direction, respectively, to form a grid pattern. At this time, the reinforcing structure 318 may be simplified as adding reinforcing ribs on a cross of the earphone fixing portion 311.

As shown in FIG. 11(*d*), ends of a plurality of reinforcement ribs close to each other may be arranged at intervals. Extension lines of the plurality of reinforcement ribs may intersect at the preset reference point (as shown by a solid point O in FIG. 11(*d*)). At this time, the reinforcing structure 318 may be simplified as adding reinforcing ribs on a radiational direction of the earphone fixing portion 311.

In some embodiments, under same conditions, when the following size relationship is satisfied by the reinforcing rib and the earphone fixing portion 311, the stiffness of the earphone fixing portion 311 may be effectively increased, and the weight of the earphone fixing portion 311 may be balanced. In some embodiments, a ratio between the thickness of the reinforcing rib and the thickness of the earphone fixing portion 311 may be within a range of 0.8 to 1.2. In some embodiments, the ratio between the width of the reinforcing rib and the thickness of the earphone fixing portion 311 may be within a range of 0.4 to 0.6. In some embodiments, the ratio between the interval between two reinforcing ribs and the thickness of the earphone fixing portion 311 may be within a range of 1.6 to 2.4. In some embodiments, the thickness of the reinforcing rib may be the same as the thickness of the earphone fixing portion 311. In some embodiments, the interval between two reinforcing ribs may be twice the thickness of the earphone fixing portion 311. Merely by way of example, the thickness of the earphone fixing portion 311 may be 0.8 millimeters, and the thickness, width of the reinforcing rib, and the interval between two adjacent reinforcing ribs may be 0.8 millimeters, 0.4 millimeters, and 1.6 millimeters, respectively. It should be noted that the various reinforcing structures shown in FIG. 11(*a*), FIG. 11(*b*), FIG. 11(*c*), and FIG. 11(*d*)

may be reasonably assembled based on the stiffness requirements of the earphone fixing portion 311, which may not be limited herein.

Figure 12:
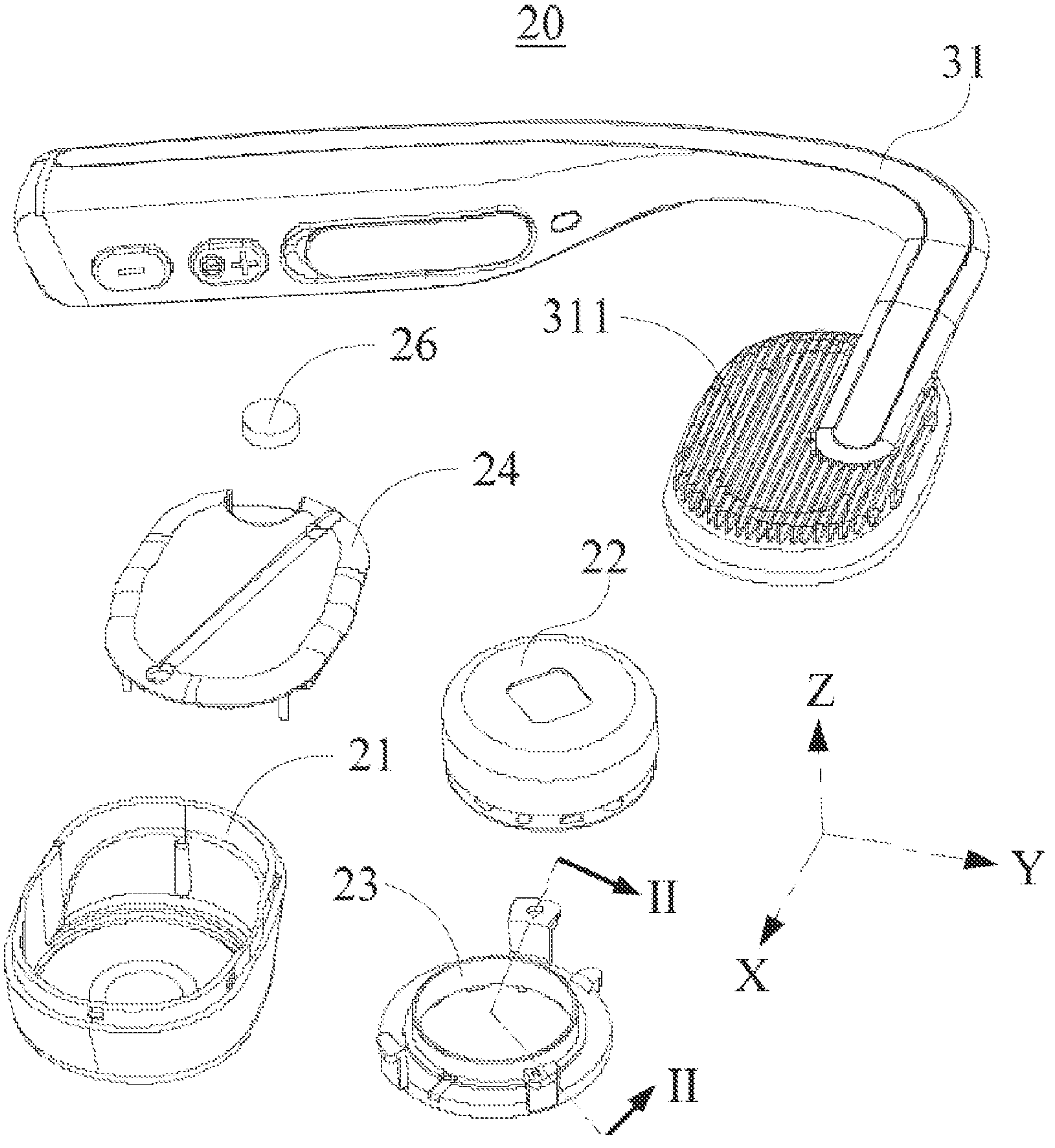
FIG. 12 is a schematic diagram illustrating a disassembled structure of an exemplary core module according to some embodiments of the present disclosure.

FIG. 12 is a schematic diagram illustrating a disassembled structure of an exemplary core module according to some embodiments of the present disclosure.

As shown in FIG. 12, in some embodiments, the core module 20 may further include a cover plate 24. In some embodiments, one end of the core housing 21 may include an opening. The cover plate 24 may be arranged on the opening end of the core housing 21 (e.g., the end of the core housing 21 with the opening) to form a chamber structure for accommodating the core 22. In some embodiments, the cover plate 24 may cover the other end of the annular peripheral wall 212 away from the bottom wall 211 and may be arranged opposite to the bottom wall 211. In some embodiments, the cover plate 24 and the core housing 21 may be connected by a glue connection or a combination of a clamping connection and the glue connection. In some embodiments, the ear-hook housing 31 may be connected with the cover plate 24. For example, the earphone fixing portion 311 may cover one side of the cover plate 24 facing away from the core housing 21 in a full cover or semi-covered manner. In some embodiments, the full cover of the cover plate 24 by the earphone fixing portion 311 may be taken as an example for an exemplary description. At this time, the ear-hook housing 31 and the core housing 21 may be connected by the glue connection or the combination of the clamping connection and the glue connection.

It should be noted that the ear-hook housing in FIG. 12 is mainly for the convenience of describing the relative position relationship between the ear-hook housing 31 and the cover plate 24, which may further implicitly indicate a possible assembly manner between the ear-hook housing 31 and the cover plate 24.

In some embodiments, the elastic modulus of the core housing 21 may be greater than the elastic modulus of the ear-hook housing 31. The elastic modulus of the cover plate 24 may be greater than the elastic modulus of the ear-hook housing 31. At this time, the cover plate 24 may be connected with the core housing 21, which may increase a stiffness of the structure of the opening end of the core housing 21 (e.g., the cover plate 24 and the earphone fixing portion 311). Therefore, the difference between the stiffness of the bottom wall 211 of the core housing 21 and the stiffness of the structure of the opening end of the core housing 21 may be further reduced. The core housing 21 may have a sufficiently large stiffness to cause the resonant frequency of the core housing 21 to be located at a region with a frequency as high as possible. The resonant frequency of the structure (the core housing 21, the cover plate 24, and the earphone fixing portion 311) may be increased, thereby reducing the sound leakage.

In some embodiments, the elastic modulus of the cover plate 24 may be less than or equal to the elastic modulus of the core housing 21. For example, the elastic modulus of the cover plate 24 may equal to the elastic modulus of the core housing 21. At this time, the cover plate 24 may be connected with the core housing 21 to form the structure (B+B). Therefore, a ratio of a difference between the stiffness K1 of the bottom wall 211 and the stiffness K3 of the cover plate 24 and the stiffness K1 of the bottom wall 211 may be less than or equal to 10%. That is, $(K1-K3)/K1 \leq 10\%$, or $K3/K1 \geq 90\%$.

In some embodiments, the area of the bottom wall 211 may be less than or equal to the area of the cover plate 24. The thickness of the bottom wall 211 may be less than or equal to the thickness of the cover plate 24. Based on the above detailed description, under the premise of ensuring a certain wearing comfort, the area of the bottom wall 211 may be reduced. The resonance frequency of the core housing 21 may be increased. Therefore, in some embodiments, in order to ensure that the core housing includes a sufficiently large stiffness to enable a resonant frequency of the core housing to be located in a high frequency region with a frequency as high as possible, the area of the bottom wall 211 may be less than or equal to the area of the cover plate 24. For example, the area of the opening end of the core housing 21 may be greater than the area of the bottom wall 211. In some embodiments, according to the above relationship equation $K \propto (E \cdot t)/S$, when the elastic modulus of the cover plate 24 is less than or equal to the elastic modulus of the core housing 21, and the area of the bottom wall 211 is less than or equal to the area of the cover plate 24, in order to satisfy the above relationship equation $(K1-K3)/K1 \leq 10\%$, the thickness of the bottom wall 211 may be less than or equal to the thickness of the cover plate 24.

In some embodiments, the material of the cover plate 24 may be the same as the material of the core housing 21. For example, the material of the cover plate 24 and the core housing 21 may be a mixture of polycarbonate and glass fibers and/or carbon fibers. In some embodiments, according to the above relationship equation $K \propto (E \cdot t)/S$, in order to satisfy the above relationship equation $K3/K1 \geq 90\%$, a ratio of a ratio the thickness and the area of the cover plate 24 and a ratio the thickness and the area of the bottom wall 211 may be greater than or equal to 90%. For example, the ratio the thickness and the area of the cover plate 24 may be equal to the ratio the thickness and the area of the bottom wall 211.

It should be noted that, according to the above relationship equation $K \propto (E \cdot t)/S$, in order to satisfy the above relationship equation $(K1-K3)/K1 \leq 10\%$, structural parameters such as the thickness, the area, and the ratio thereof of the cover plate 24 and the core housing 21 may be determined based on the material of the cover plate 24 and the core housing 21. Alternatively, the material of the cover plate 24 and the core housing 21 may be determined based on the structural parameters (e.g., the thickness, the area, and the ratio) of the cover plate 24 and the core housing 21. Therefore, the above embodiments may include two possible designs.

Based on the above detailed description, after the cover plate 24 is connected with the core housing 21 instead of the earphone fixing portion 311, the earphone fixing portion 311 may still be connected to one side of the core housing 21 facing away from the cover plate 24. For example, the cover plate 24 may be fully covered by the earphone fixing portion 311.

In some embodiments, if the ear-hook housing 31 and the cover plate 24 are plastic members, and the elastic modulus of the ear-hook housing 31 is less than the elastic modulus of the cover plate 24, the ear-hook housing 31 and the cover plate 24 may be formed an integrally structural piece by two-color injection molding. If the ear-hook housing 31 is a plastic member, the cover plate 24 is a metal piece, and the elastic modulus of the ear-hook housing 31 is less than the elastic modulus of the cover plate 24, the ear hook housing 31 and the cover plate 24 may be formed an integrally structural piece by metal insert injection molding. At this time, the ear-hook housing 31 and the cover plate 24 may be connected with the core housing 21 as a whole. Therefore, a consistency of the ear-hook housing 31 and the cover plate 24 in the vibration may be ensured. However, the buttons mentioned above, a second microphone mentioned later, etc., may be difficult to be arranged between the ear-hook housing 31 and the cover plate 24.

In some embodiments, the earphone fixing portion 311 and the cover plate 24 may be connected by a glue connection or a combination of a clamping connection and the glue connection. At this time, the buttons mentioned above, the second microphone mentioned later, etc., may be arranged between the ear-hook housing 31 and the cover plate 24. More descriptions regarding the structure may be illustrated later. When a filling degree of the glue between the earphone fixing portion 311 and the cover plate 24 is small, a connection strength between the earphone fixing portion 311 and the cover plate 24 may be small. A large hysteresis of the vibration may be between the earphone fixing portion 311 and the cover plate 24. In addition, air may be between the earphone fixing portion 311 and the cover plate 24, resulting in an adverse effect on the resonance frequency of the structure. That is, the above beneficial effects of the above improvement from the structure (A+B) to the structure (B+B) may be difficult to obtain. Noise may also be generated during the vibrations of the structure. Therefore, the filling degree of the glue (not shown in FIG. 12) between the earphone fixing portion 311 and the cover plate 24 may be as large as possible. For example, the filling degree may be greater than or equal to 90%.

Figure 13:
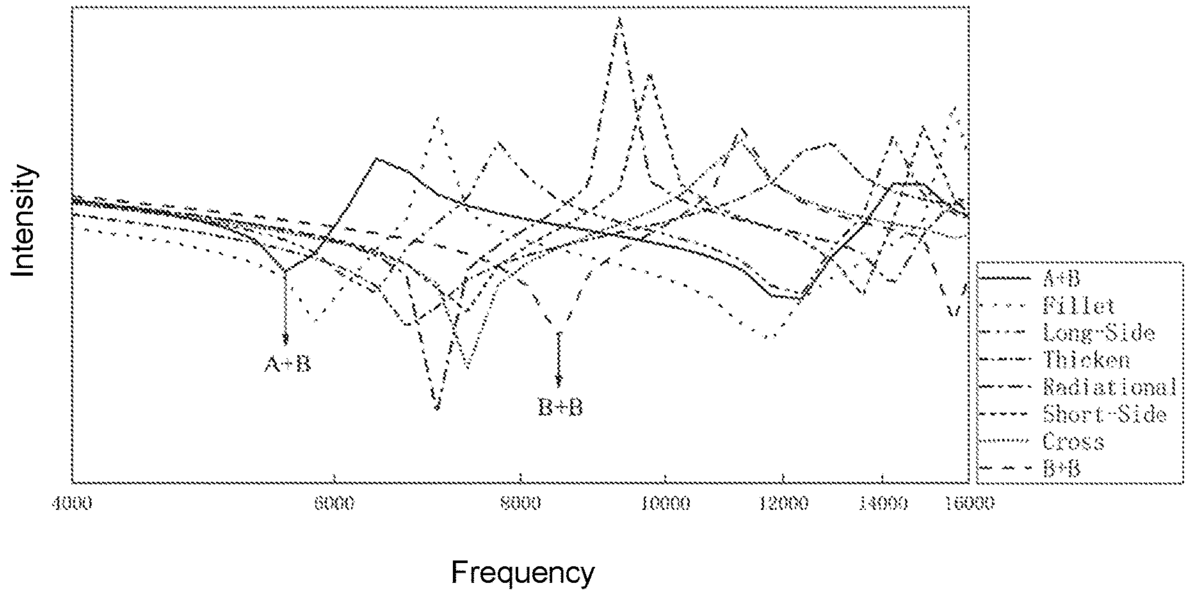
FIG. 13 is a curve graph illustrating a frequency response corresponding to a reinforcing structure according to some embodiments of the present disclosure.

In addition, in some embodiments, under same conditions, as shown in FIG. 13, a type of the glue (e.g., the structural glue, the hot melt glue, the instant glue, the silica gel, etc.) arranged between the earphone fixing portion 311 and the cover plate 24 may have an impact on the resonant frequency of the structure. As shown in FIG. 13, different types of glues may have an impact on the resonant frequency of the structure. If the glues are sorted according to the beneficial effects of the glues on the resonant frequency, the order may be the structural glue, the hot melt glue, the instant glue, and the silica gel. It should be noted that since the material of the silica gel is soft, the beneficial effects on the resonant frequency of the structure may be the weakest. Therefore, if the resonant frequency of the structure is considered, a glue with a high hardness may be arranged between the earphone fixing portion 311 and the cover plate 24.

Figure 14:
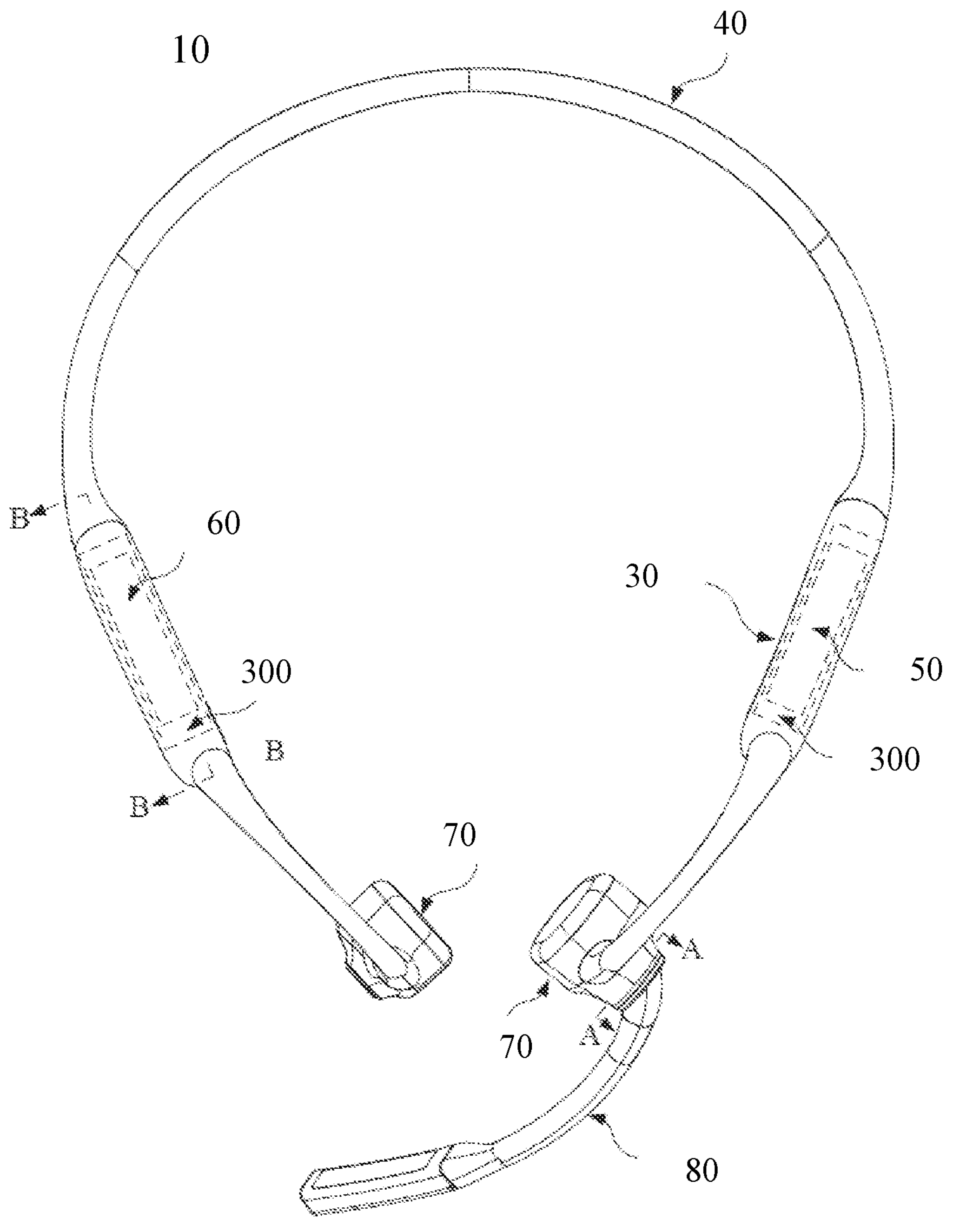
FIG. 14 is a schematic diagram illustrating a top view of an overall structure of an apparatus according to some embodiments of the present disclosure.

FIG. 14 is a schematic diagram illustrating a top view of an overall structure of an apparatus according to some embodiments of the present disclosure.

As shown in FIG. 14, in some embodiments, the apparatus 10 may include two loudspeaker assemblies 70, two ear-hook assemblies 30, a rear-hook assembly 40 connected between the two ear-hook assemblies 30, a battery assembly 50, and a control circuit assembly 60.

In some embodiments, the two loudspeaker assemblies 70 may be connected to the two ear-hook assemblies 30, respectively. The ear-hook assembly 30 may be connected between the rear-hook assembly 40 and the loudspeaker assembly 70. In some embodiments, the ear-hook assembly 30 may be configured with an accommodating space 300. The accommodating space 300 of one of the ear-hook assemblies 30 may be configured to accommodate the battery assembly 50, and the accommodating space 300 of the other ear-hook assembly 30 may be configured to accommodate the control circuit assembly 60. The battery assembly 50 may be used to supply power to the apparatus 10, and the control circuit assembly 60 may be used to control the work of the apparatus 10 and implement corresponding operations.

In some embodiments, the loudspeaker assembly 70 may include a first loudspeaker housing, a second loudspeaker housing, and the loudspeaker. The first loudspeaker housing may be matched and connected to the second loudspeaker housing to form a containment space for accommodating the loudspeaker.

In some embodiments, the apparatus 10 may further include a stick microphone assembly 80 for picking up sounds. The stick microphone assembly 80 may be connected to the loudspeaker assembly 70. A number or count of the stick microphone assembly 80 may be one, which is connected to one of the two loudspeaker assemblies 70. For example, the stick microphone assembly 80 may be connected to the loudspeaker assembly 70 corresponding to the battery assembly 50. In some embodiments, each loudspeaker assembly 70 may be connected to a stick microphone assembly 80.

To facilitate adjustment of a position for picking up sounds of the stick microphone assembly 80, the stick microphone assembly 80 may be rotatable relative to the first loudspeaker housing. In some embodiments, the loudspeaker assembly 70 may include a rotation member, and the first loudspeaker housing may be configured with a first through-hole. The rotation member may be rotatably inserted into the first through-hole, so that the stick microphone assembly 80 may be rotatable relative to the first loudspeaker housing.

In some embodiments, the first loudspeaker housing may be configured with a second through-hole arranged at an interval from the first through-hole. The second through-hole may be used for the adaption of the plug-in connection of the ear-hook assembly 30, so that the loudspeaker assembly 70 may be connected with the ear-hook assembly 30. The first through-hole and the second through-hole may be in communication with a containment space 700.

Figure 15:
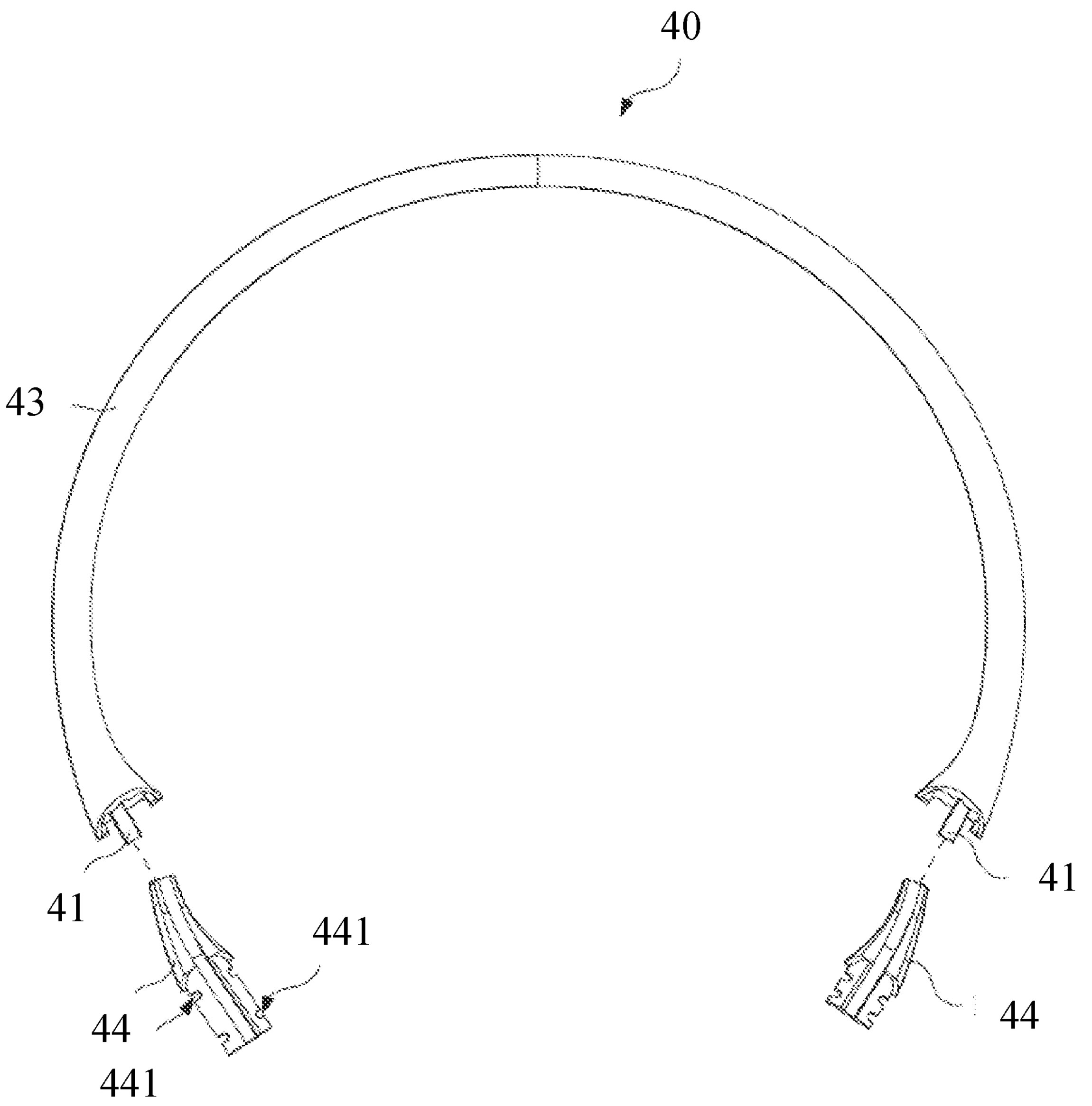
FIG. 15 is a schematic diagram illustrating an exploded structure of a rear-hook assembly according to some embodiments of the present disclosure.

FIG. 15 is a schematic diagram illustrating an exploded structure of a rear-hook assembly according to some embodiments of the present disclosure.

As shown in FIG. 15, in some embodiments, the rear-hook assembly 40 may include an elastic metal filament 41, an elastic cover body 43 covering the elastic metal filament 41, and inserting portions 44 arranged at two ends of the elastic metal filament 41. The elastic cover body 43 may also cover at least part of the inserting portions 44.

In some embodiments, the inserting portion 44 may be configured to be matched to and plugged in the ear-hook assembly 30. In some embodiments, at least one of the inserting portions 44 may be configured with two groups of notches 441 arranged at an interval in a length direction. That is, the two groups of notches 441 may be arranged on at least one of the inserting portions 44 at an interval in the length direction of the inserting portions 44, and each group of notches 441 may include at least one notch 441. The elastic metal filament 41 may be inserted into the inserting portions 44 via one end of the inserting portions 44. A group of notches 441 may be close to the inserting portions 44, and the other group of notches 441 may be arranged at one end away from the inserting portions 44.

In some embodiments, the two groups of notches 441 may be sequentially arranged along the direction from one end of the inserting portions 44 to the other end of the inserting portions 44. The notches 441 near one end of the inserting portions 44 may be configured to perform mold positioning. The notches 441 away from one end of the inserting portions 133 may be configured to be stuck and matched to the ear-hook housing.

In some embodiments, the two groups of notches 441 may be a first group of notches 441 and a second group of notches 441, respectively. The first group of notches 441 may be away from one end of the inserting portion 44 and used to be stuck and matched to the ear-hook assembly 30.

In some embodiments, the second group of notches 441 may be close to one end of the inserting portions 44 and used to mold positioning. That is, the second group of notches 441 may be used to fit with the corresponding protrusion structure on a mold to fix the inserting portions 44 in a precise position so that other processes may be performed to improve the yield rate. For example, the second group of notches 441 may be used to position the inserting portions 44 and the elastic metal filament 41, and the elastic cover body 43 may be formed by injection molding. In some embodiments, the notches 441 may extend from edges of the inserting portions 44 on two sides of a central axis toward the central axis. In some embodiments, each group of notches 441 may include two notches 441, and the two notches 441 in each group of notches 441 may be arranged opposite to each other.

Figure 16:
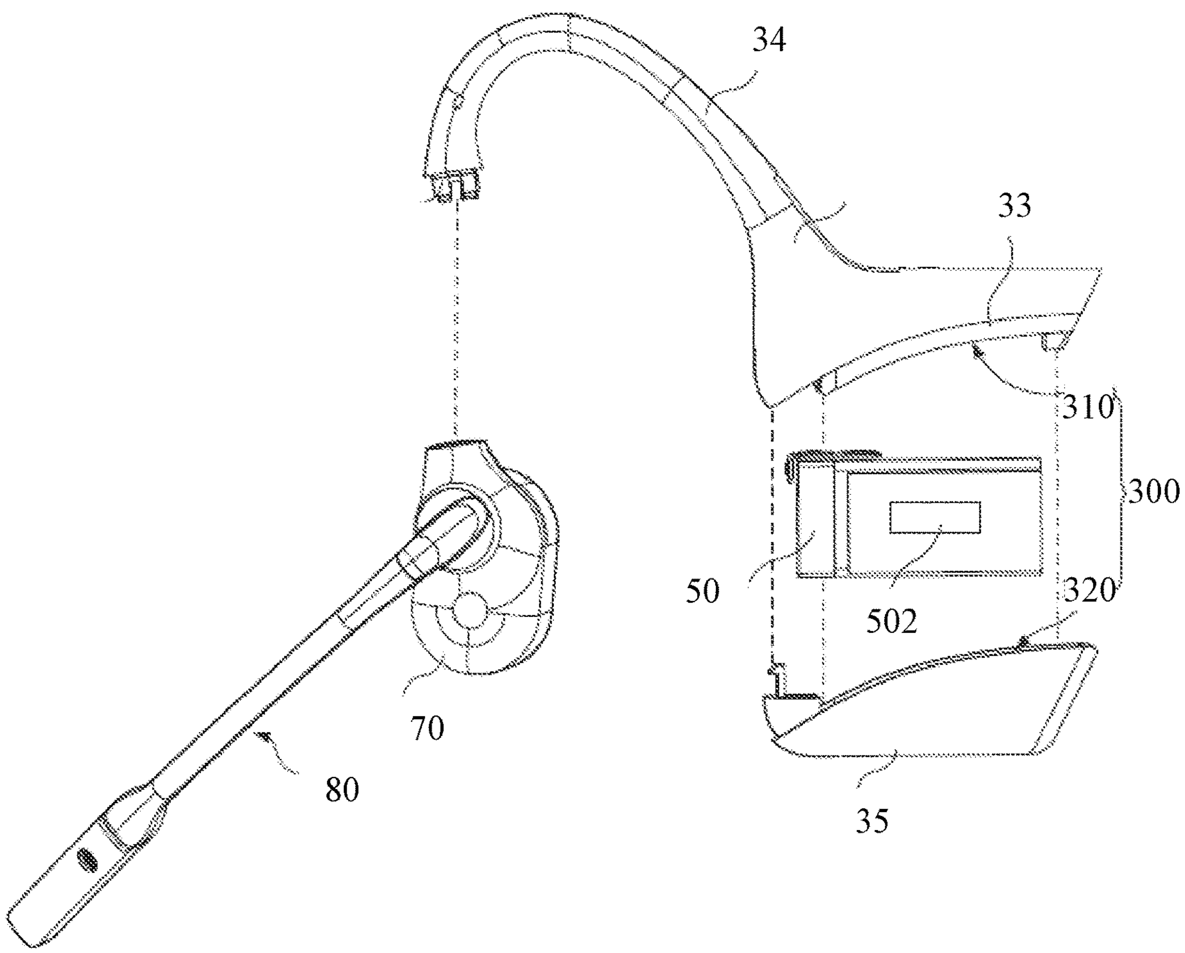
FIG. 16 is a structural schematic diagram illustrating an ear-hook assembly according to some embodiments of the present disclosure.
Figure 17:
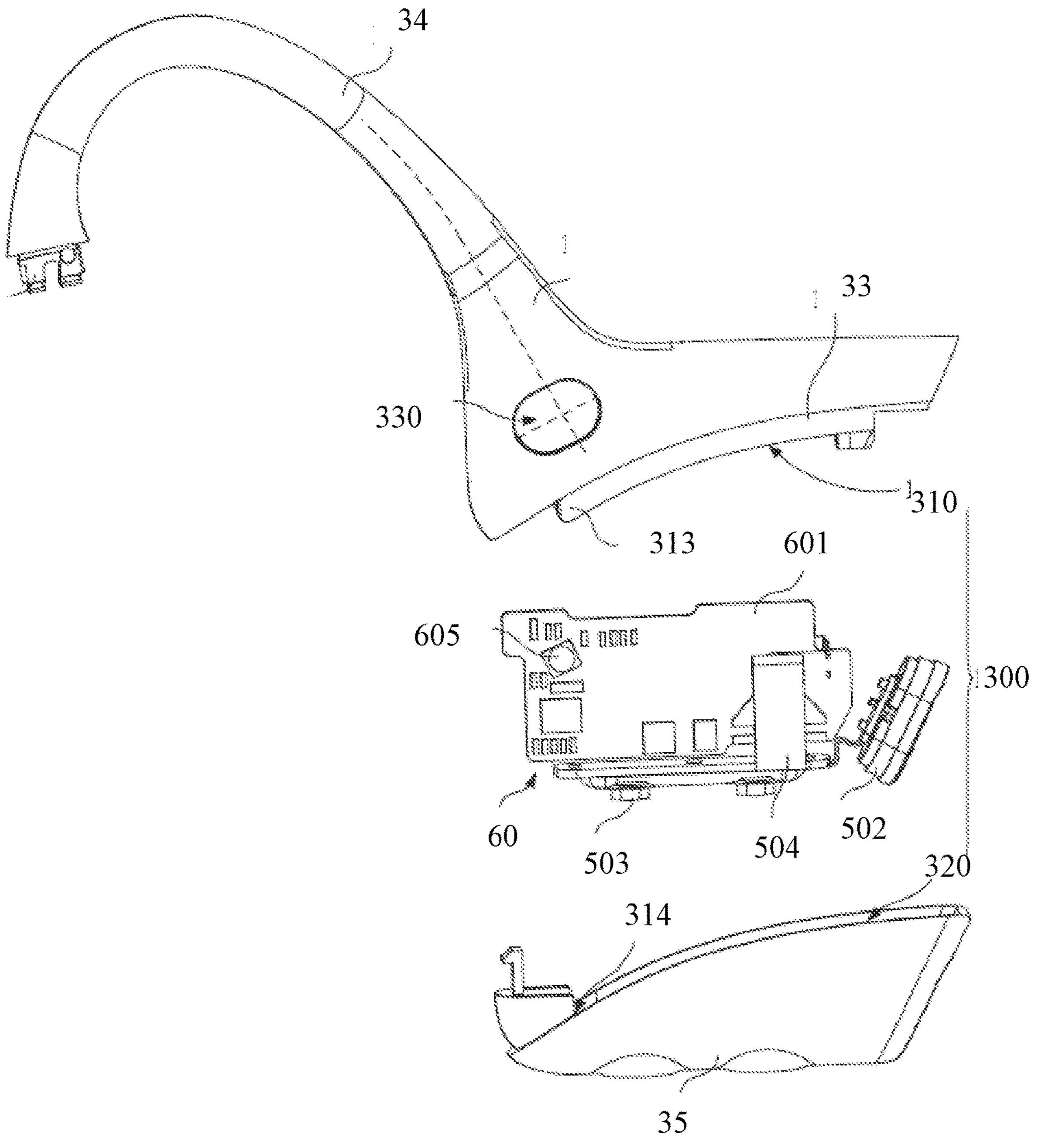
FIG. 17 is a structural schematic diagram illustrating an ear-hook assembly according to some embodiments of the present disclosure.

FIG. 16 is a structural schematic diagram illustrating an ear-hook assembly according to some embodiments of the present disclosure. FIG. 17 is a structural schematic diagram illustrating an ear-hook assembly according to some embodiments of the present disclosure.

As shown in FIG. 16 and FIG. 17, in some embodiments, the ear-hook assembly 30 may include a first ear-hook housing 33, a connection member 34, and a second ear-hook housing 35. One end of the connection member 34 may be connected to the first ear-hook housing 33. The other end of the connection member 34 may be connected to the loudspeaker assembly 70. For example, the other end of the connection member 34 may be inserted into the second through-hole of the first loudspeaker housing to be matched to and plugged in the loudspeaker assembly 70.

In some embodiments, the first ear-hook housing 33 may be matched and connected to the second ear-hook housing 35 to form an accommodating space 300 that is used to accommodate the battery assembly 50 or the control circuit assembly 60. In some embodiments, the accommodating space 300 of one of the ear-hook assemblies 30 may be used to accommodate the battery assembly 50, such as the ear-hook assembly 30 shown in FIG. 16. The accommodating space 300 of the other one of the ear-hook assemblies 30 may be used to accommodate the control circuit assembly 60, such as the ear-hook assembly 30 shown in FIG. 17. In some embodiments, the accommodating space 300 may include a first sub-accommodating space 310 and a second sub-accommodating space 320. The first ear hook housing 121 may include the first sub-accommodating space 310, and the second ear hook housing 123 may include the second sub-accommodating space 320. After the first ear-hook housing 33 and the second ear-hook housing 35 are spliced, the first sub-accommodating space 310 and the second sub-accommodating space 320 may be combined to form the accommodating space 300.

In some embodiments, a splicing edge of the first ear-hook housing 33 may be configured with a first blocking portion 3103, and a splicing edge of the second ear-hook housing 35 may be configured with a second blocking portion 3104. The first blocking portion 3103 may be matched with the second blocking portion 3104 to restrict the relative movement of the first ear-hook housing 33 and the second ear-hook housing 35 along the length direction.

As shown in FIG. 16, in some embodiments, the battery assembly 50 may include a battery housing (not labeled) and a battery chip (not shown in the figure) arranged in the battery housing. The battery chip may be configured to store power. In some embodiments, a first NFC module 502 may be attached to the battery assembly 50. For example, the first NFC module 502 may be attached to the battery housing so that the volume of the apparatus 10 may be reduced, and the electromagnetic interference or signal interference between the first NFC module 502 and the control circuit assembly 60 may also be reduced.

As shown in FIG. 17, in some embodiments, the control circuit assembly 60 may include a circuit board 601, a power supply interface 602, a button 603, an antenna 604, or the like. In some embodiments, a Bluetooth module that is used to achieve the Bluetooth communication function may be integrated into the control circuit assembly 60. In some embodiments, the control circuit assembly 60 may also integrate other circuits and elements. For example, the Bluetooth module may be integrated on the circuit board 601. The sensor assembly 605 may also be integrated on the circuit board 601.

As shown in FIG. 17, taking the sensor assembly 605 including an optical sensor as an example, the first ear-hook housing 33 may form a window 330 for transmitting optical signals of the optical sensor. The window 330 may be arranged close to the connection member 34, so that when the apparatus 10 is worn by the user, the window 330 may attach and close to the position near the root of the ear of the user. In some embodiments, the window 330 may be set up in a shape of a racetrack. In some embodiments, an extension line of a central axis of the connection member 34 and a long axis of the window 330 may intersect with each other, such as the rough intersecting relationships shown in FIG. 17. The extension line of the central axis of the connection member 34 and the long axis of the window 330 intersecting with each other may make the window 330 attach and close to the position near the root of the user's ear effectively. Therefore, the sensitivity and the validity of detection of the sensor assembly 605 may be guaranteed.

In some embodiments, the apparatus 10 may be a bone conduction earphone. The weight of the bone conduction earphone may be lighter and the size of the bone conduction earphone may be smaller. However, the ear-hook assembly 30 may occupy a larger volume of the bone conduction earphone due to that the ear-hook assembly 30 is used to accommodate the battery assembly 50, the control circuit assembly 60, the wiring, or the like. A design of relevant buckle positions and buckle structure of the ear-hook assembly 30 may also affect the volume of the entire ear-hook assembly 30. In order to reduce the volume of the ear-hook assembly 30, some embodiments of the present disclosure provide the following housing structure of the ear-hook assembly 30.

In some embodiments, the accommodating space 300 may include a length direction perpendicular to a thickness direction. In some embodiments of the present disclosure, if it is not specifically stated, the length direction refers to the length direction of the accommodating space 300, and the thickness direction refers to the thickness direction of the accommodating space 300.

Figure 18:
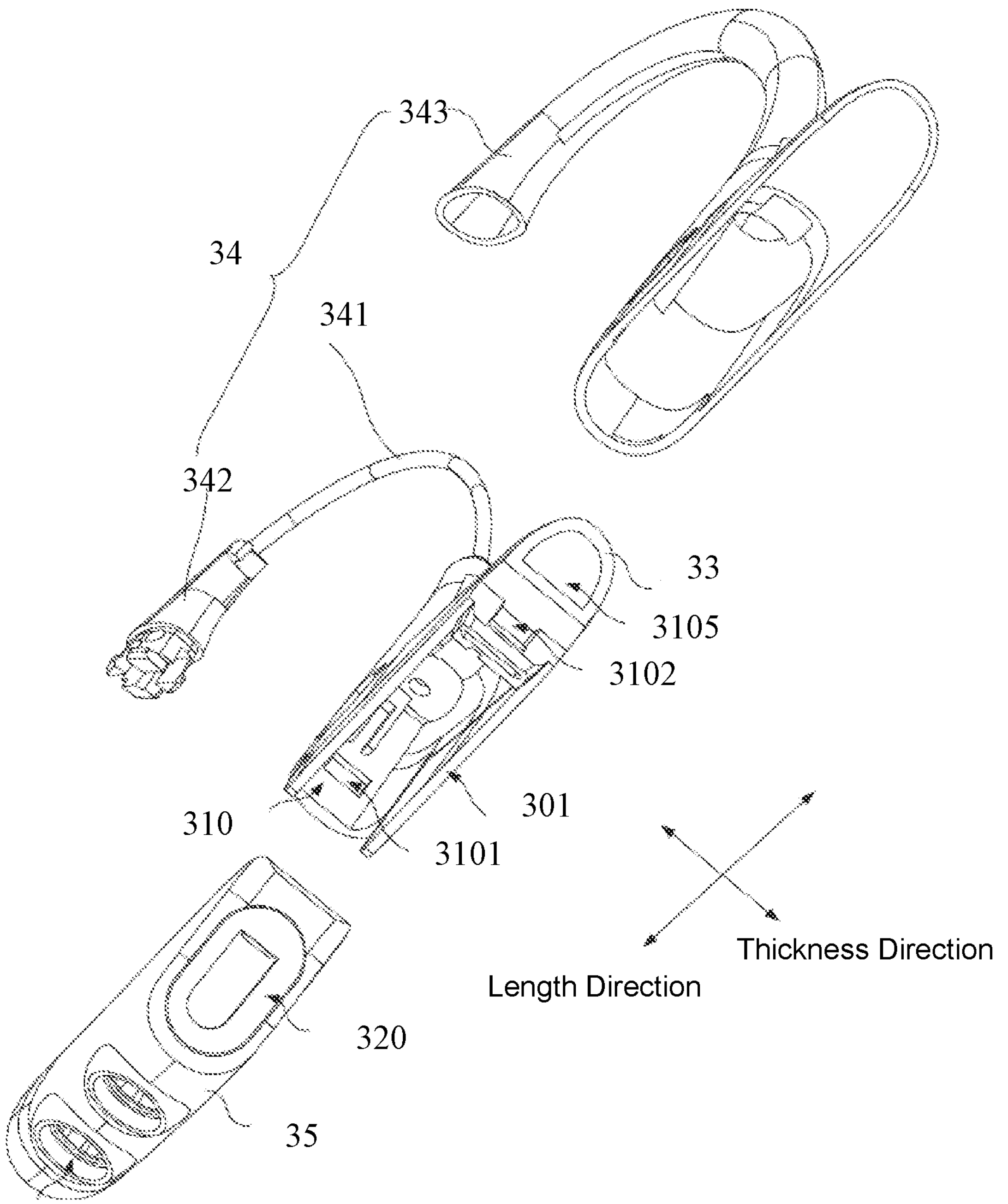
FIG. 18 is a structural schematic diagram illustrating a first ear-hook housing and a second ear-hook housing according to some embodiments of the present disclosure.
Figure 19:
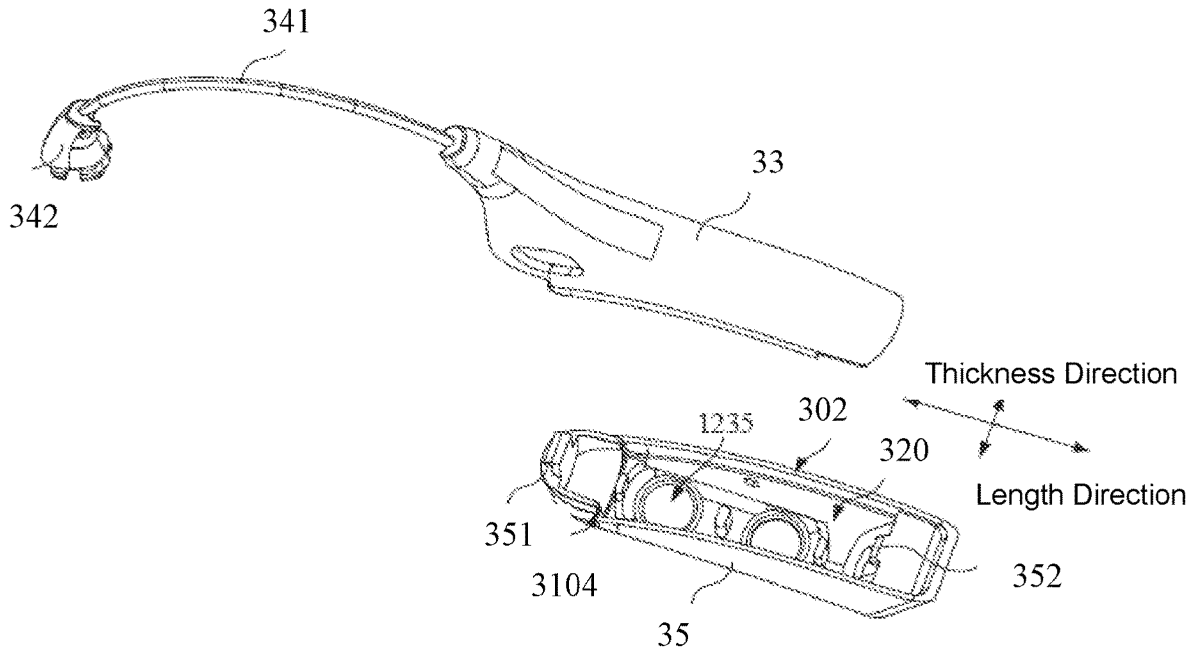
FIG. 19 is a structural schematic diagram illustrating a first ear-hook housing and a second ear-hook housing according to some embodiments of the present disclosure.

FIG. 18 is a structural schematic diagram illustrating a first ear-hook housing and a second ear-hook housing according to some embodiments of the present disclosure. FIG. 19 is a structural schematic diagram illustrating a first ear-hook housing and a second ear-hook housing according to some embodiments of the present disclosure.

As shown in FIG. 18 and FIG. 19, in some embodiments, the accommodating space 300 may include a length direction perpendicular to a thickness direction. The length direction may refer to the length direction of the accommodating space 300, and the thickness direction may refer to the thickness direction of the accommodating space 300.

In some embodiments, the first ear-hook housing 33 and the second ear-hook housing 35 may be spliced along a splicing direction perpendicular to the length direction and the thickness direction to form the accommodating space 300. In some embodiments, the first ear-hook housing 33 may include a first sub-accommodating space 310, and the second ear-hook housing 123 may include a second sub-accommodating space 320. After the first ear-hook housing 33 and the second ear-hook housing 35 are spliced, the first sub-accommodating space 310 and the second sub-accommodating space 320 may be combined to form the accommodating space 300.

In some embodiments, the first ear-hook housing 33 may be configured with a first slot 3101 and a second slot 3102 arranged at an interval along the length direction with the same opening directions. That is, the openings of the first slot 3101 and the second slot 3102 may face the same direction.

In some embodiments, the second ear-hook housing 35 may be configured with a first block 351 and a second block 352 protruding along the length direction with the same extending direction. That is, the first block 351 and the second block 352 may be arranged at an interval in the length direction, and the protruding direction of the first block 351 and the second block 352 may be the same, thereby facing the same direction. The first block 351 and the second block 352 may be inserted into the first slot 3101 and the second slot 3102, respectively, in the same direction.

In some embodiments, the first block 351 may be inserted into the first slot 3101, and the second block 352 may be inserted into the second slot 3102 to restrict the relative movement of the first ear-hook housing 33 and the second ear-hook housing 35 in the splicing direction and the thickness direction.

In some embodiments, a splicing edge 301 of the first ear-hook housing 33 may be matched with a splicing edge 302 of the second ear-hook housing 35 to restrict the relative movement of the first ear-hook housing 33 and the second ear-hook housing 35 along the length direction. In some embodiments, the first ear-hook housing 33 and the second ear-hook housing 35 being spliced may refer to the splicing edge 301 of the first ear-hook housing 33 may be substantially in contact with and connected to the splicing edge 302 of the second ear-hook housing 35. The splicing edge 301 of the first ear-hook housing 33 may refer to an edge of the first ear-hook housing 33 toward one side of the second ear-hook housing 35 splicing with the second ear-hook housing 35, such as the splicing edge 301 shown in FIG. 18. The splicing edge 302 of the second ear-hook housing 35 may refer to an edge of the second ear-hook housing 35 toward one side of the first ear-hook housing 33 splicing with the first ear-hook housing 33, such as the splicing edge 302 shown in FIG. 19.

In some embodiments, shapes of the splicing edge 301 of the first ear-hook housing 33 and the splicing edge 302 of the second ear-hook housing 35 may be matched to each other, which may fit together or complement each other, thereby forming a stable matching structure and restricting the relative movement along the length direction.

If the extending directions of the first block 351 and the second block 352 are opposite, the first block 351 and the second block 352 may protrude in opposite directions, respectively, which may inevitably cause an increase in the additional space occupied by the first block 351 and the second block 352. To ensure that the first block 351 and the second block 352 may be inserted into the first slot 3101 and the second slot 3102, the distance in the length direction may need to be increased to cover the first block 351 and the second block 352. In some embodiments, a matching direction of the first block 351 and the first slot 3101 and a matching direction of the second block 352 and the second slot 3102 may be the same by arranging the same opening directions of the first slot 3101 and the second slot 3102 and the same extending directions of the first block 351 and the second block 352. The same extending directions of the first block 351 and the second block 352 may reduce the additional volume occupied by the first block 351 and the second block 352, so that the volume occupied by the matching of the first block 351 and the first slot 3101 and the matching of the second block 352 and the second slot 3102 may be reduced, thereby effectively reducing the volume of the ear-hook assembly 30. The splicing edge 301 of the first ear-hook housing 33 and the splicing edge 302 of the second ear-hook housing 35 may be fitted to each other, so that additional structures such as buckles, protrusions, or the like, may not need to be arranged. The structure of the ear hook assembly 30 may be compact and the volume of the ear-hook assembly 30 may also be reduced. The displacement in the length direction may be restricted through the fitness of the splicing edge 301 and the splicing edge 302, so that the splicing of the first ear-hook housing 33 and the second ear-hook housing 35 may be stable and the structure may be reliable.

As shown in FIG. 18, in some embodiments, the first slot 3101 and the second slot 3102 may be arranged on two sides of the first ear-hook housing 33 along the length direction, respectively. The opening direction of the first slot 3101 may face the accommodating space 300, and the opening direction of the second slot 3102 may deviate from the accommodating space 300. That is, the opening direction of the first slot 3101 may face the first sub-accommodating space 310, and the opening direction of the second slot 3102 may deviate from the first sub-accommodating space 310. Alternatively, the first slot 3101 may be arranged on one side of the first ear-hook housing 33 close to the connection member 34, and the second slot 3102 may be arranged on one side of the first ear-hook housing 33 away from the connection member 34.

As shown in FIG. 19, in some embodiments, the first block 351 and the second block 352 may be arranged on two sides of the second ear-hook housing 35 along the length direction, respectively. The extending direction of the first block 351 may deviate from the accommodating space 300, and the extending direction of the second block 352 may face the accommodating space 300. That is, the extending direction of the first block 351 may deviate from the second sub-accommodating space 320, and the opening direction of the second slot 3102 may deviate from the second sub-accommodating space 320. Correspondingly, the first block 351 may be arranged on one side of the second ear-hook housing 35 close to the connection member 34, and the second block 352 may be arranged on one side of the second ear-hook housing 35 away from the connection member 34. Since the second block 352 protrudes and extends into the accommodating space 300, compared with protruding and extending to the outside of the accommodating space 300, the second block 352 may not occupy the additional space, thereby saving the corresponding space. The second slot 3102 may be located in front of the extending direction of the second block 352 during the matching of the second slot 3102 and the second block 352. The second block 352 may be inserted into and matched to the second slot 3102 to reduce the volume of the ear-hook assembly 30.

In some embodiments, the splicing edge 301 of the first ear-hook housing 33 may further include a first blocking portion 3103, and the splicing edge 302 of the second ear-hook housing 3104 may further include a second blocking portion 3104. The first blocking portion 3103 may be matched to the second blocking portion 3104 to restrict the relative movement of the first ear-hook housing 33 and the second ear-hook housing 35 along the length direction. For example, the first blocking portion 3103 may be an opening portion formed on the splicing edge 301 of the first ear-hook housing 33, and the second blocking portion 3104 may be a convex portion formed on the splicing edge 302 of the second ear-hook housing 35. The shape of the opening portion and the shape of the convex portion may be matched to each other, so that the splicing edge 301 of the first ear-hook housing 33 and the splicing edge 302 of the second ear-hook housing 35 may be complementary to restrict the relative movement in the length direction.

The opening direction of the first slot 3101 may face the accommodating space 300. If the first slot 3101 is formed directly in the first sub-accommodation space 310, a pattern drawing direction forming the first sub-accommodation space 310 and a pattern drawing direction forming the first slot 3101 may interfere with each other during the process of using corresponding molds to form the first sub-accommodation space 310 and the first slot 3101. Since the pattern drawing direction of the first slot 3101 is in the first sub-accommodating space 310, which may also conflict with the pattern drawing directions of other structures, it may bring great difficulties to the production. Based on the technical difficulties mentioned above, the following structures are designed to reduce production and manufacturing difficulties.

As shown in FIG. 18, in some embodiments, the connection member 34 may include an ear-hook elastic metal filament 341, and a joint portion 342 connected to one end of the ear-hook elastic metal filament 341. In order to protect the ear-hook elastic metal filament 341, the connection member 34 may also include an ear-hook elastic cover layer 343 at least covering the periphery of the ear-hook elastic metal filament 341. In some embodiments, the ear-hook housing elastic metal filament 341 may further cover the first ear-hook housing 33. The joint portion 342 may be configured to be matched and connected to the loudspeaker assembly 70. The other end of the ear-hook elastic metal filament 341 may be connected to the first ear-hook housing 33.

In some embodiments, the material of the ear-hook elastic metal filament 341 may be spring steel, titanium, or other metallic or non-metallic materials. In some embodiments, the material of the ear-hook elastic cover layer 343 may be silica gel, rubber, plastic, or the like. The ear-hook elastic cover layer 343 may cover the ear-hook elastic metal filament 341. The ear-hook elastic cover layer 343 may further cover the first ear-hook housing 33 and the second ear-hook housing 35. The ear-hook elastic cover layer 343 may also cover a second wire stuck portion. In some embodiments, it may be possible to make the power plug-in hole, or the like, to be exposed. The ear-hook elastic cover layer 343 may also cover at least a part of the joint portion 342, and may cover a first wire stuck portion.

In some embodiments, one side of the first ear-hook housing 33 away from the connection member 34 may be configured with an inserting hole 3105. The inserting hole 3105 may communicate with the accommodating space 300, and the inserting hole 3105 may be arranged adjacent to the second slot 3102. The inserting portion 44 may be inserted into and matched to the inserting hole 3105.

In some embodiments, the first ear-hook housing 33 may be configured with a protruding snap portion. For example, the inside of the inserting hole 3105 of the first ear-hook housing 33 may be configured with the protruding snap portion. The inserting portion 44 may be inserted into the inserting hole 3105 and the snap portion may be embedded into the first group of notches 441 to further restrict the relative movement of the ear-hook assembly 30 and the rear-hook assembly 40.

Figure 20:
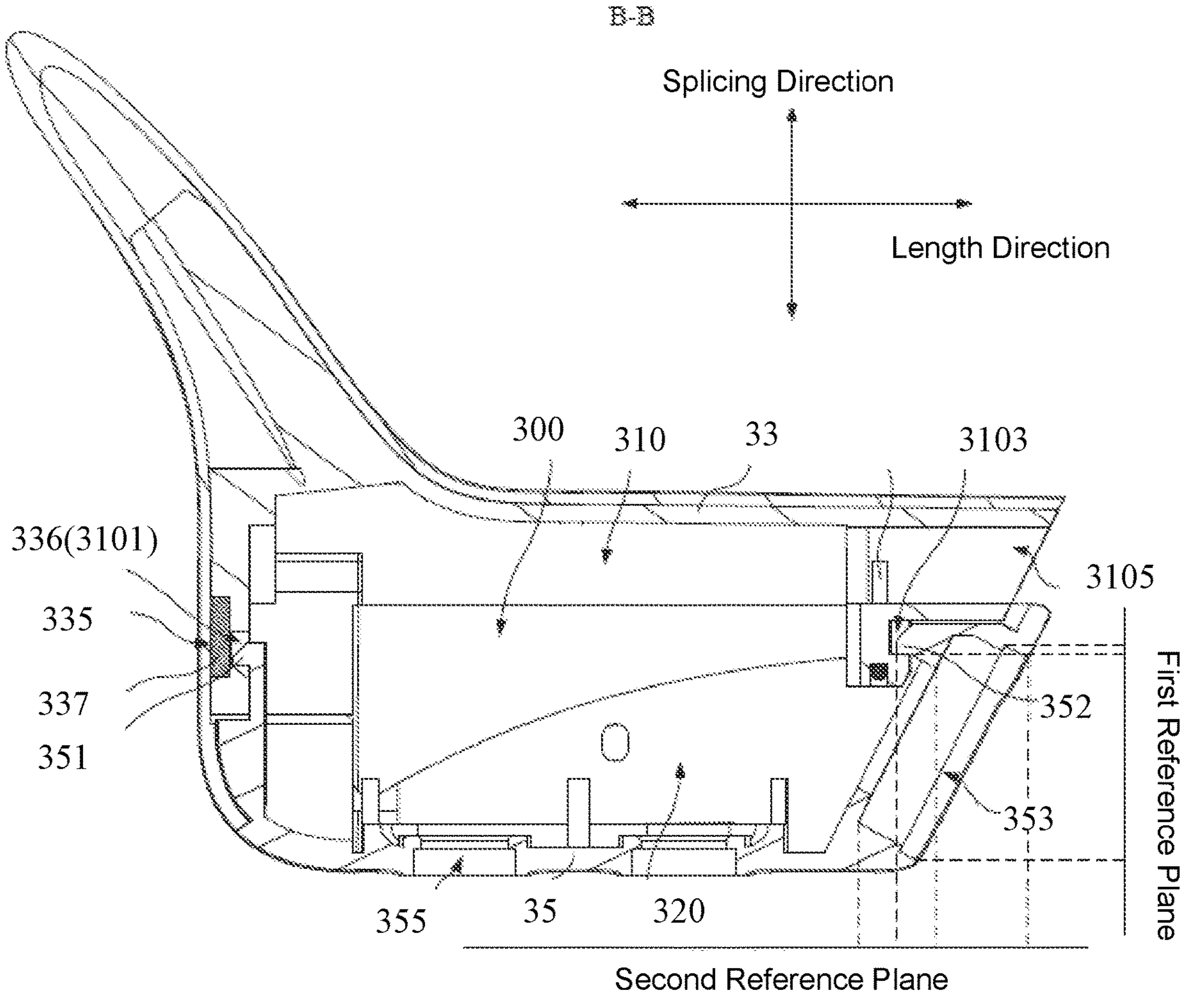
FIG. 20 is a schematic diagram illustrating a cross-sectional structure of an ear-hook housing according to some embodiments of the present disclosure.

FIG. 20 is a schematic diagram illustrating a cross-sectional structure of an ear-hook housing according to some embodiments of the present disclosure.

As shown in FIG. 20, in some embodiments, the first ear-hook housing 33 may be configured with an outer side hole segment 335 and an inner side hole segment 336 communicating with each other in a direction from the outside of the accommodating space 300 to the inside of the accommodating space 300. That is, the opening direction of the outer side hole segment 335 may be away from the accommodating space 300, and the opening direction of the inner side hole segment 336 may face the accommodating space 300. The outer side hole segment 335 may communicate with the inner side hole segment 336. The outer side hole segment 335 may be filled with a filling member 337. In some embodiments, the filling member 337 may be a rubber member, a hard glue, or the like. When the outer side hole segment 335 is filled and blocked, the inner side hole segment 336 may be configured as the first slot 3101, and the opening direction of the inner side hole segment 336 may face the accommodating space 300 to be matched to the first block 351.

In the actual manufacturing process, the outer side hole segment 335 and the inner side hole segment 336 may be formed sequentially from the outside of the first ear hook housing 33 to the inside of the first ear hook housing 33. The pattern drawing direction may not be carried out in the first sub-accommodating space 310, but may be carried out outside of the first ear-hook housing 33. The filling member 337 may be used to fill the outer side hole segment 335, so that the remaining inner side hole segment 336 may be designated as the first slot 3101, thereby effectively reducing the difficulty and complexity of manufacturing and saving costs.

In some embodiments, the cross-sectional area of the outer side hole segment 335 perpendicular to a connection direction of the inner side hole segment 335 and the inner side hole segment 336 may be greater than the cross-sectional area of the inner side hole segment 336 perpendicular to the connection direction of the outer side hole segment 335 and the inner side hole segment 336. Since the cross-sectional area corresponding to the outer side hole segment 335 is greater than the corresponding cross-sectional area of the inner side hole segment 336, it may be convenient to fill the filling member 1217 in the outer side hole segment 335, thereby having a better blocking effect and forming the first slot 3101 quickly.

Based on the illustration of the outer side hole segment 335 and the inner side hole segment 336 of the ear-hook assembly 30, an exemplary illustration of a manufacturing method for the ear-hook assembly 30 may be as follows:

In 210, the first ear-hook housing 33 and the second ear-hook housing 35 may be formed by an injection molding manner, the first ear-hook housing 33 may be configured with the outer side hole segment 335 and the inner side hole segment 336 communicating with each other in a direction from the outside of the first ear-hook housing 33 to the inside of the first ear-hook housing 33, and the second ear-hook housing 35 may be configured with the first block 351.

In 220, The outer side hole segment 335 may be filled with a filling member 337, and the inner side hole segment 336 may be designated as the first slot 3101.

Alternatively, the outer side hole segment 335 may be filled with the filling member 337 by the injection molding manner.

In some embodiments, in order to protect the first ear-hook housing 33, the first ear-hook housing 33 may be covered by the ear-hook elastic cover layer 343 after operation 220. Details may be as follows:

In 230, the first ear-hook housing 33 may be covered by the ear-hook elastic cover layer 343 by the injection molding manner, and the ear-hook elastic cover layer 343 may cover the outer side hole segment 335.

In 240, the first block 351 may be inserted into and matched to the first slot 3101 to splice the first ear-hook housing 33 and the second ear-hook housing 35.

The molding methods and operations for other structures of the ear-hook assembly 30 may be manufactured based on the specific structures of the ear-hook assembly 30 using existing molding methods, which may not be repeated herein.

In order to better reduce the volume of the ear-hook assembly 30, the positions of the components in the accommodating space 300 may be replaced or reset, thereby effectively compressing the accommodating space 300 and reducing the volume of the ear-hook housing. If a power plug-in hole 353 of the apparatus 10 is arranged on a side of the second ear-hook housing 35 away from the bottom wall of the first ear-hook housing 33, the volume of the ear-hook assembly 30 may be increased. In order to effectively reduce the volume of the ear-hook assembly 30, in the embodiment, the power plug-in hole 353 may be arranged on a sidewall of the second ear-hook housing 35 away from the connection member 34. Details may be as follows:

As shown in FIG. 18 to FIG. 20, part of the second ear-hook housing 35 far from the connection member 34 may be configured with the power plug-in hole 353. The power plug-in hole 353 may communicate with the accommodating space 300, and the power plug-in hole 353 may be configured to accommodate a power supply interface 602. In some embodiments, the second ear-hook housing 35 may include a housing bottom portion and a housing side portion, and the housing side portion may surround and connect the housing bottom portion to form the second sub-accommodating space 320. A side edge of the housing side portion away from the housing bottom portion may be the splicing edge 302 spliced with the first ear-hook housing 33. The power plug-in hole 353 may be arranged on the housing side portion, communicating with the second sub-accommodating space 320, that is, communicating with the accommodating space 300.

As shown in FIG. 20, the second block 352 may be arranged close to the power plug-in hole 353. That is, the second block 1232 may be arranged protruding from the part of the housing of the second ear-hook housing 35 away from the connection member 34, and may face the inside of the accommodating space 300. In some embodiments, the second block 352 may be closer to the accommodating space 300 compared with the power plug-in hole 353. That is, the second block 352 may be closer to the connection member 34 compared with the power plug-in hole 353.

In some embodiments, the projections of the second block 352 and the power plug-in hole 353 on a first reference plane perpendicular to the length direction may overlap each other. In some embodiments, overlapping each other may include partial overlap (e.g., the overlapping part is a part of the projection of the second block 352, that is, a part of the projection of the power plug-in hole 353), and also may include overall overlap (e.g., the projection of the second block 352 completely falls into the projection of the power plug-in hole 353). In some embodiments, taking the plane perpendicular to the length direction as the first reference plane, the projection of the second block 352 on the first reference plane may be located in the projection of the power plug-in plane 353 on the first reference plane, that is, ranges of two projections may overall overlap each other. The positions of the second block 352 and the power plug-in hole 353 may make the structure of the second ear-hook housing 35 to be compact, and the volume of the ear-hook housing assembly 30 may be reduced without affecting the installation of the power supply interface 602.

In some embodiments, the projections of the second block 352 and the power plug-in hole 353 on a second reference plane perpendicular to the splicing direction may overlap each other. Overlapping each other described herein may also include partial overlap and overall overlap. In some embodiments, taking the plane perpendicular to the splicing direction as the second reference plane, the projection of the second block 352 on the second reference plane may also be located in the projection of the power plug-in hole 353 on the second reference plane, that is, ranges of two projections may also overlap. The arrangement of the structures of the second block 352 and the power plug-in hole 353 may be compact no matter in the splicing direction or the length direction. The space occupied by the power plug-in hole 353 and the second block 352 may be saved to improve the compact of the structure of the ear hook assembly 30.

The apparatus 10 may be used in the producing and manufacturing field or the like, and there may be great requirements for the control experience of the apparatus 10. The power plug-in hole 353 arranged at the part of the housing of the second ear-hook housing 35 away from the connection member 34 may improve the control experience of the apparatus 10, and the reasons may be as follows:

The apparatus 10 (e.g., the bone conduction earphone) generally may have a volume button, or the like. A buttonhole 153 or the like, and the power plug-in hole 353 corresponding to the button 153 may be generally arranged on the bottom part of the second ear-hook housing 35, that is, the second ear-hook housing 35 may be away from a part of the housing of the first ear-hook housing 33. Since the area of the bottom part of the housing is relatively limited, a buttonhole 355 and the power plug-in hole 353 may be compact. The buttonhole 355 and the power plug-in hole 353 may occupy as little space as possible. In some application scenarios, a wearer may wear workmanship, gloves, or the like. The buttonhole 355 may be smaller, and the arrangement may be too compact, which may cause the wearer's control experience to decline and may easily cause mishandling. The power plug-in hole 353 may not be arranged on the bottom part of the housing, and the power plug-in hole 353 may be arranged on the side part of the housing, so that the buttonhole 355 may be designed large, and the arrangement may be loosely, which may be convenient for the user to operate and reduce the occurrence of the mishandling.

In addition, based on the design of the power plug-in hole 353, if the second block 352 is arranged close to the power plug-in hole 353 on the second ear-hook housing 35 and faces the top position of the first ear-hook housing 33 (such as a table area connecting the second block 352 shown in FIG. 19, that is, the second block 352 may be regarded as formed by extending inward from the table area to the second sub-accommodating space 320), the space of a plug-in hole 3105 of the first ear-hook housing 33 may be squeezed, which in turn may affect the ear-hook assembly 30 being matched to and plugged in the rear-hook assembly 40. The second block 352 may need to occupy an additional space so that the first ear-hook housing 33 and the second ear-hook housing 35 may occupy a large space in the splicing direction, which may not be compact enough. Therefore, in one or more embodiments of the present disclosure, the power plug-in hole 353 may be arranged on the bottom part of the housing of the second ear-hook housing 35, and the structure between the second block 352 and the power plug-in hole 353 may be arranged based on the projection relationship mentioned above so that the structure of the second ear-hook housing 35 may be compact in the splicing direction. The second block 352 may extend toward the inside of the accommodating space 300, and the size of the ear-hook housing may be miniaturized without occupying additional spaces.

Figure 21:
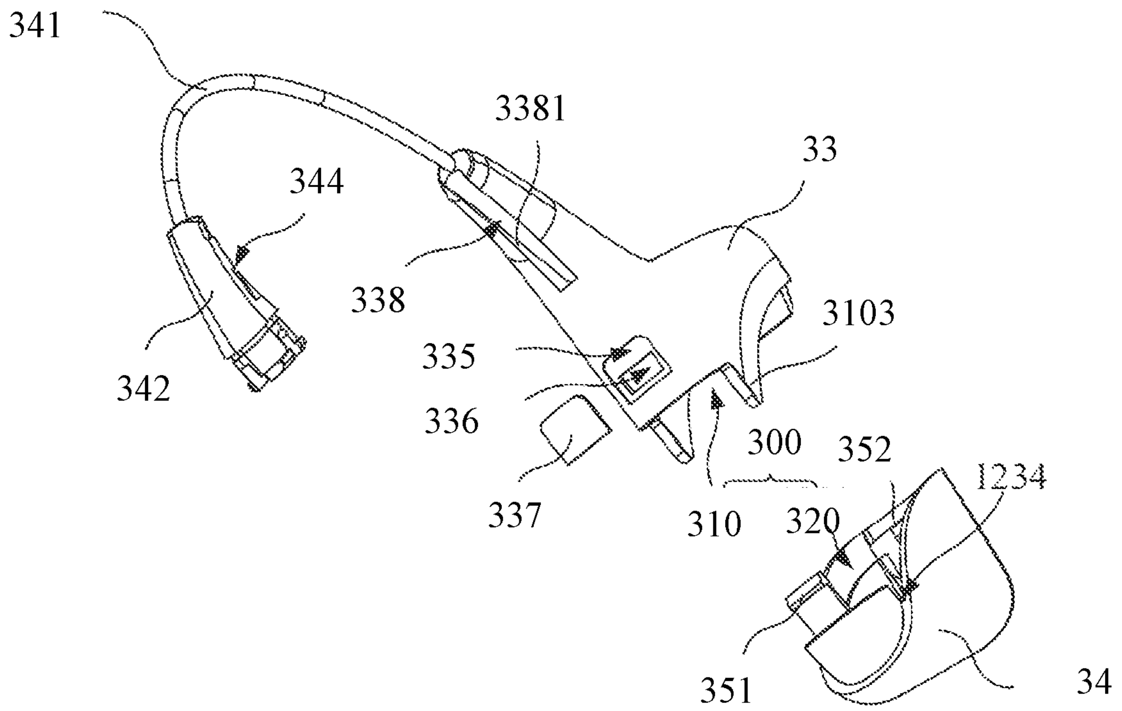
FIG. 21 is a structural schematic diagram illustrating a first ear-hook housing and a second ear-hook housing according to some embodiments of the present disclosure.
Figure 22:
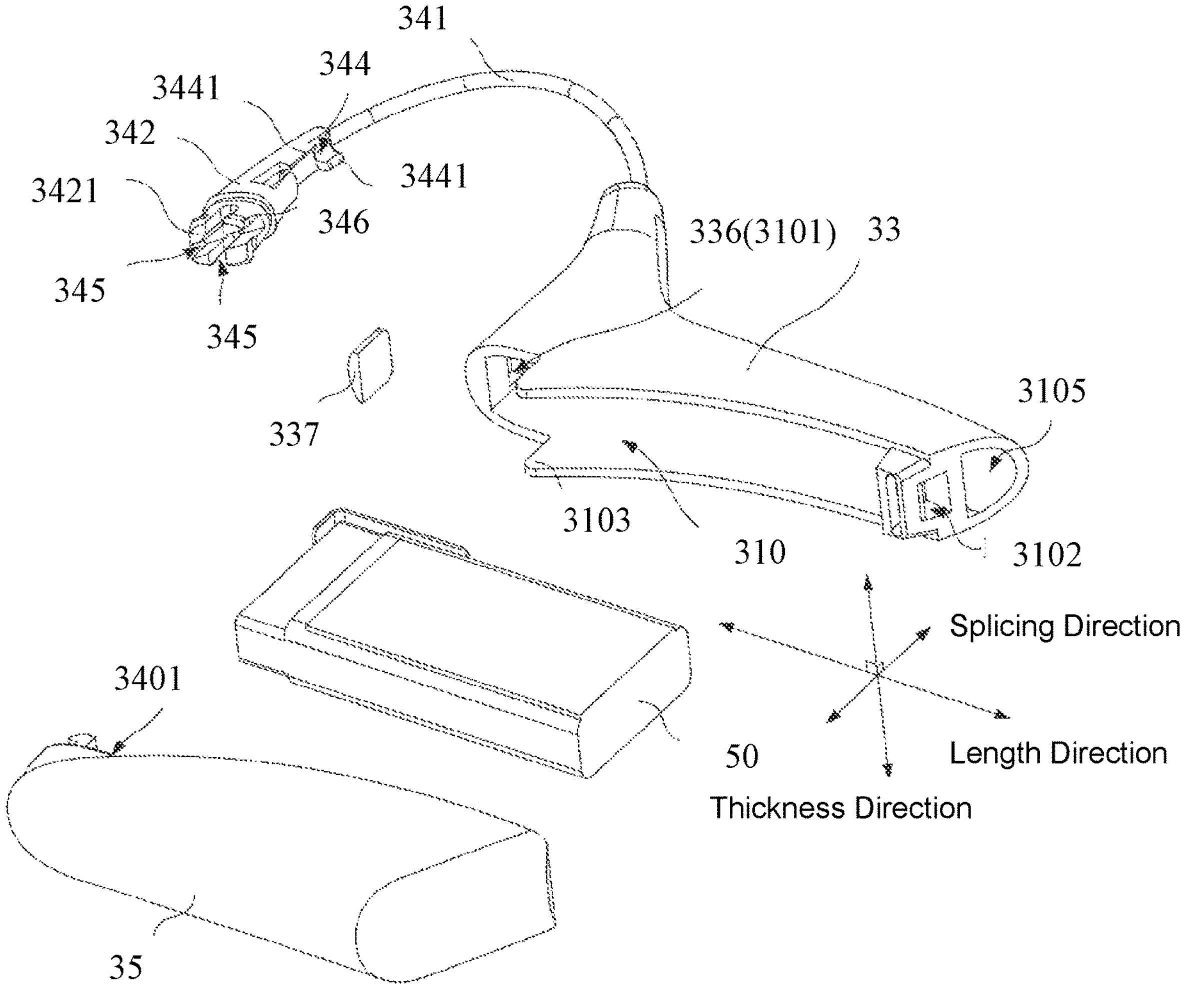
FIG. 22 is a structural schematic diagram illustrating an ear-hook assembly according to some embodiments of the present disclosure.

Based on the detailed illustration, a stable splicing structure between the first ear-hook housing 33 and the second ear-hook housing 35 may protect the battery assembly 50 and the control circuit assembly 60 in the accommodating space 300. In some embodiments, in order to reduce the failure rate of the apparatus 10, it may be not only necessary to ensure the stability of the structure, but also need to ensure the stability of the electrical connection. The wiring group may be routed between the loudspeaker assembly 70 and the ear hook assembly 30, and the stability of the route may be related to the reliability of the bone conduction assemblies. In order to improve the reliability of the wiring, the ear hook assembly 30 may be configured with a corresponding wire stuck structure to ensure the stability of the wires when the wiring group passes through the ear hook assembly 30. Details may be as follows:

FIG. 21 is a structural schematic diagram illustrating a first ear-hook housing and a second ear-hook housing according to some embodiments of the present disclosure. FIG. 22 is a structural schematic diagram illustrating an ear-hook assembly according to some embodiments of the present disclosure.

As shown in FIG. 21 and FIG. 22, in some embodiments, the joint portion 342 may include a first wire stuck portion 344, and the first ear-hook housing 33 may include a second wire stuck portion 338. The wiring group leading from the loudspeaker assembly 70 may enter the accommodating space 300 via the first wire stuck portion 344 and the second wire stuck portion 338 sequentially. The first wire stuck portion 344 and the second wire stuck portion 338 may be configured to stuck and stop the wiring group in the radial direction of the wiring group, so that the shaking of the wiring group in the radial direction may be reduced.

The wiring group stuck and stopped by the first wire stuck portion 344 and the second wire stuck portion 338 may be an additional member such as an auxiliary titanium wire used during the preparation of the ear hook assembly 30, or the like. Specifically, during the preparation of ear hook assembly 30, the wiring channel may be formed in the ear-hook elastic cover layer 343 using the auxiliary titanium wire. Therefore, the auxiliary titanium wire may be led to pass through the first wire stuck portion 344 and the second wire stuck portion 338 sequentially and enter the accommodating space 300. After the preparation is completed, the auxiliary titanium wire may be drawn out to form a wiring channel of the containment space 110 and the accommodation space 300. The first wire stuck portion 344 and the second wire stuck portion 338 may keep the stability of the auxiliary titanium wire to reduce the shake of the auxiliary titanium wire, thereby enabling the glue position to be stable.

In some embodiments, the wiring channel and the ear-hook elastic metal filament 341 may be arranged in parallel in the ear-hook elastic cover layer 343.

In some embodiments, the wiring group stuck and stopped by the first wire stuck portion 344 and the second wire stuck portion 338 may be a wiring group used for electrical connection and led after forming the wiring channel. That is, the wiring group led by the loudspeaker assembly 70 may enter the accommodating space 300 via the first wire stuck portion 344 and the second wire stuck portion 338. It should be understood that the shake of the wiring group may need to be reduced before entering the wiring channel and after entering the wiring channel so that the wiring efficiency may be improved. In addition, since the ear-hook assembly 30 is used to hang on a human ear, thus the ear-hook assembly 30 may generally be arc-shaped. The wiring group passing through the ear-hook assembly 30 may tend to shake, move, or the like, thus the first wire stuck portion 344 and the second wire stuck portion 338 may reduce the shaking of the wiring group.

In some embodiments, the ear-hook elastic cover layer 343 may be configured with a wiring channel (not shown in the figures). The wiring group led by the loudspeaker assembly 70 may enter the accommodating space 300 via the first wire stuck portion 344, the wiring channel, and the second wire stuck portion 338 in sequence.

In some embodiments, the first wire stuck portion 344 and the second wire stuck portion 338 may be arranged at the joint portion 342 and the first ear-hook housing 33, respectively. On the one hand, the movement of the auxiliary titanium wire relative to the first ear-hook housing 33 and the joint portion 342 may be stuck and stopped during the preparation process to make the glue position of ear-hook assembly 30 uniform and improve the good product rate of the ear-hook assembly 30, on the other hand, the movement of the wiring group in the radial direction may also be stuck and stopped, thereby reducing the shake generated by the wiring group so that the leading efficiency of the wiring group may be efficient. The structure of the wiring group in the actual product may be stable, and the stability of the electrical connection may be guaranteed.

In some embodiments, the first wire stuck portion 344 may have two first sub-wire stuck portions 3441 arranged at intervals in the thickness direction. As shown in FIG. 22, the two first sub-wire stuck portions 3441 may be staggered from each other in the length direction of the wiring group. The two first sub-wire stuck portions 3441 may stuck and stop the wiring group in the thickness direction when the wiring group passes between the two first sub-wire stuck portions 3441, which in turn may restrict the movement of the wiring group in the thickness direction. In some embodiments, the extending lengths of the two first sub-wire stuck portions 3441 may be different in the length direction of the wiring group.

In some embodiments, the second wire stuck portion 338 may have two second sub-wire stuck portions 3381 arranged at intervals in the thickness direction, and the two second sub-wire stuck portions 3381 may be arranged opposite relatively. The two second sub-wire stuck portions 3381 may stuck and stop the wiring group in the thickness direction when the wiring group passes between the two second sub-wire stuck portions 3381, which in turn may restrict the movement in the thickness direction.

In some embodiments, the first wire stuck portion 344 may be formed recessed on the joint portion 342, and the second wire stuck portion 338 may be formed recessed on the first ear-hook housing 33 so that the wiring group may be seen in the first wire stuck portion 344 and the second wire stuck portion 338, which may reduce the distance when the wiring group is led and passes through an invisible area to improve the leading efficiency.

In order to facilitate the joint portion 342 to be inserted into the second through-hole of the first loudspeaker housing, and enhance the connection stability between the joint portion 342 and the second through-hole, in some embodiments, as shown in FIG. 22, an end portion 3421 of the joint portion 342 may form two through-grooves 345 crossing each other to divide the end portion 3421 into four sub-end portions. The end portion 3421 may be divided into four sub-end portions by the two through-grooves 345 crossing each other so that the elasticity of the end portion 3421 may be improved and the four sub-end portions may be squeezed and elastically recovered. When the joint portion 342 is inserted into the second through-hole, the four sub-end portions may be squeezed and close to each other, so that the end portion 3421 may be smaller, and the joint portion 342 may be easy to be inserted into the second through-hole.

In some embodiments, a protrusion 346 may be arranged protruding from the periphery of the sub-end portions. The joint portion 342 may be inserted into the loudspeaker assembly 70 and the protrusion 346 may be stuck and stopped by the loudspeaker assembly 70 to restrict the movement of the joint portion 342 from moving away from the loudspeaker assembly 70. Specifically, after the joint portion 342 is inserted into the second through-hole, the four sub-end portions may be elastically recovered, which may cause the protrusion 346 on the periphery of the sub-end portions to be stuck and stopped by the loudspeaker assembly 70. The connection reliability of the ear hook assembly 30 and the loudspeaker assembly 70 may be improved.

Specifically, after the joint portion 342 is inserted into the second through-hole, the protrusion 346 may be arranged in the containment space 110, and the protrusion 346 may be stuck and stopped at the edge of the connection between the second through-hole and the containment space 110.

Figure 23:
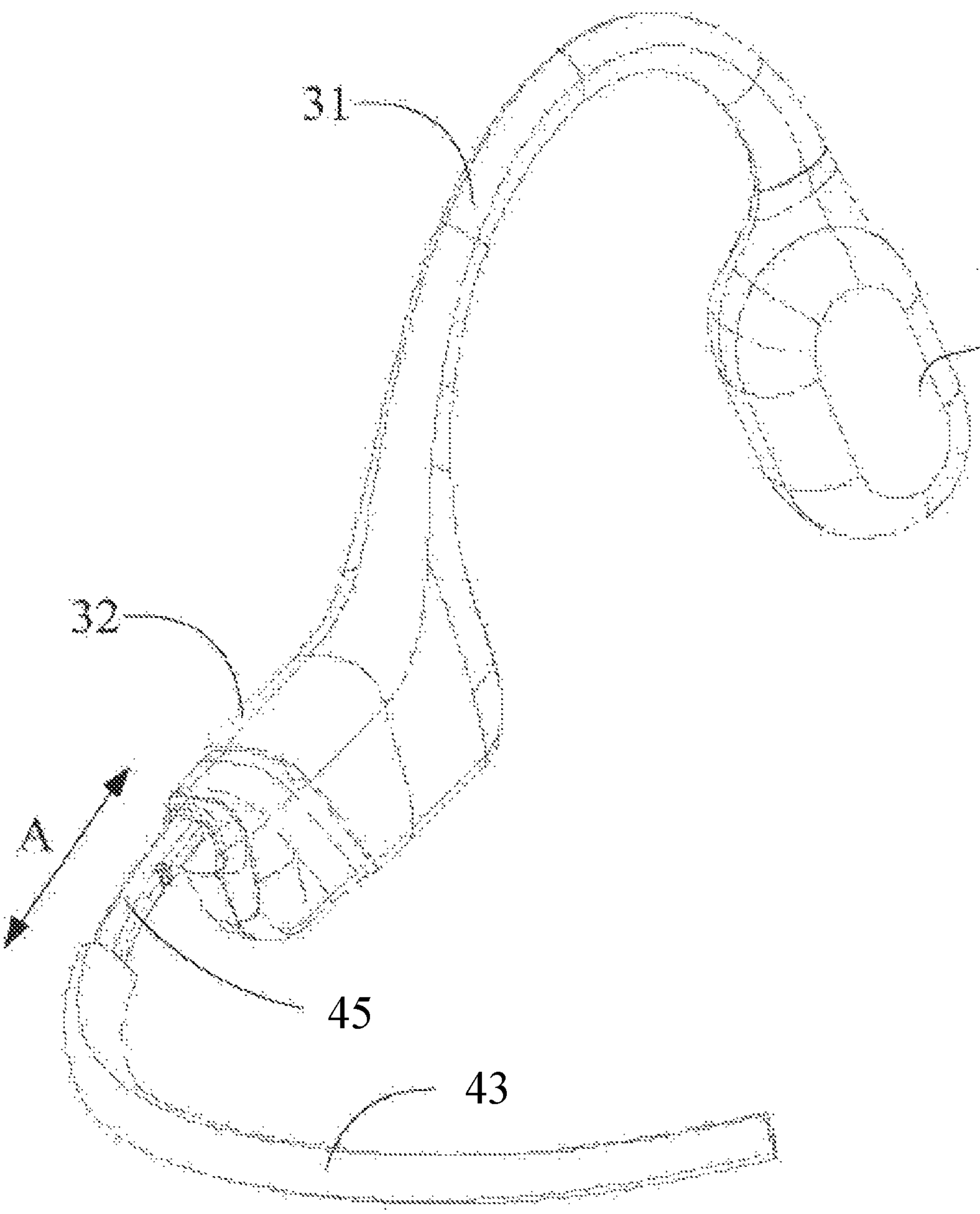
FIG. 23 is a schematic diagram illustrating a part of a structure of an earphone after the earphone is assembled according to some embodiments of the present disclosure.
Figure 24:
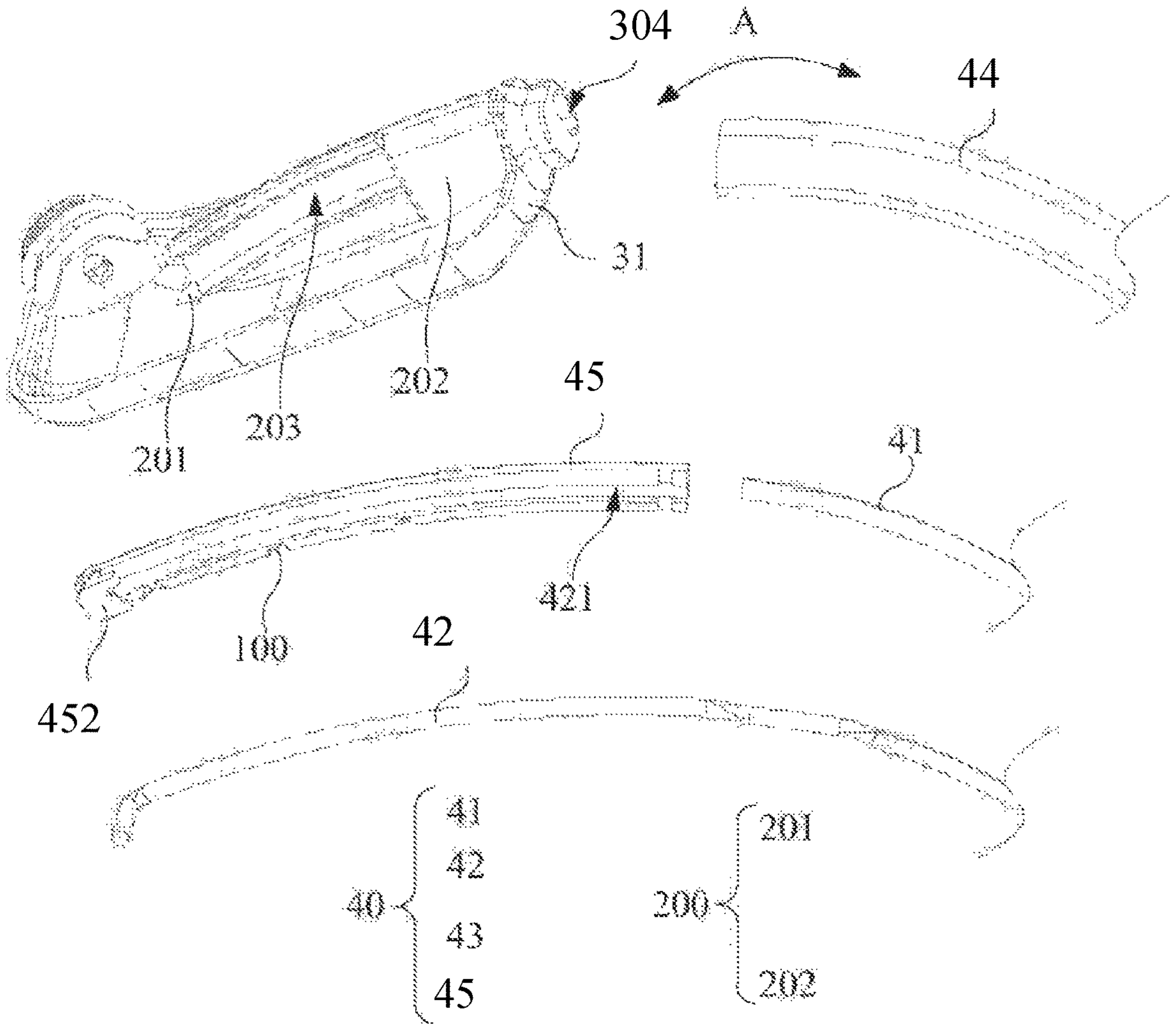
FIG. 24 is a schematic diagram illustrating an internal structure after an ear-hook housing and a rear-hook assembly are disassembled according to some embodiments of the present disclosure.

FIG. 23 is a schematic diagram illustrating a structure of a part of an assembled earphone according to some embodiments of the present disclosure. FIG. 24 is a schematic diagram illustrating an inner structure of an ear-hook housing and a rear-hook assembly after decomposing according to some embodiments of the present disclosure.

As shown in FIG. 23 and FIG. 24, in some embodiments, an ear-hook housing 31 may be provided with a mounting port 304, and a rear-hook assembly 40 may be partially inserted into the ear-hook housing 31 through the mounting port 304 (specifically, the mounting port 304 may be a corresponding part of an accommodation bin 313 and a chamber cover 314). The rear-hook assembly 40 may be in a clearance fit or a transition fit with the ear-hook housing 31 at the ear-hook housing 31, and a regulatory space may be left in the ear-hook housing 31, so that the rear-hook assembly 40 may adjust an insertion depth relative to the ear-hook housing 31 in the effect of a user's plugging force, thereby adjusting an effective length of the rear-hook assembly 40, so that the apparatus 10 may adapt to head sizes of different users.

In some embodiments, a positioning mechanism 100 may be arranged between the ear-hook housing 31 and the rear-hook assembly 40, which is used to keep the rear-hook assembly 40 and the ear-hook housing 31 relatively fixed without action of the plugging force of the user. The positioning mechanism 100 may be screws, pins, buckles, etc., which may make the rear-hook assembly 40 abut against the ear-hook housing 31. Based on the configurations mentioned above, when the user adjusts the insertion depth of the rear-hook assembly 40 relative to the ear-hook housing 31 to a certain use state, the state may be kept under the action of the positioning mechanism 100, thereby satisfying the user's requirements. Detailed exemplary descriptions about the specific structure of the positioning mechanism 100 may be as follows.

As shown in FIG. 23 and FIG. 24, in some embodiments, the rear-hook assembly 40 may include an elastic metal filament 41, a plug-in column 45, a conductor 42, and a covering body 43. As shown in FIG. 24, the elastic metal filament 41 may be curved in a length direction, so that the rear-hook assembly 40 may wrap around a rear side of head of the user. Meanwhile, the elastic metal filament 41 may mainly support the rear-hook assembly 40 to maintain a basic structural form. When the user wears the apparatus 10, the rear-hook assembly 40 may cooperate with two core modules 20 and two ear-hook assemblies 30 to provide clamping force, thereby improving stability and reliability when wearing the apparatus 10. Therefore, a material of the elastic metal filament 41 may be, but not limited to spring steel, titanium alloy, titanium nickel alloy, chrome molybdenum steel, etc.

As shown in FIG. 24, in some embodiments, the plug-in column 45 may be arranged at the end of the elastic metal filament 41, and partly inserted into the ear-hook housing 31 through the mounting port 304. The positioning mechanism 100 may be arranged between the ear-hook housing 31 and the inserted part of the plug-in column 45 relative to the ear-hook housing 31. Based on the configurations mentioned above, when the user adjusts the insertion depth of the plug-in column 45 of the rear-hook assembly 40 relative to the ear-hook housing 31 to a certain use state, the relative position relationship between the plug-in column 45 and the ear-hook housing 31 may be kept under the action of the positioning mechanism 100, so that an effective length of the rear-hook assembly 40 may be adjusted, and the apparatus 10 may adapt to head sizes of different users. Instead of direct plug operation of the rear-hook assembly 40 with the ear-hook housing 31, the present disclosure may perform the plug operation through the plug-in column 45 with the ear-hook housing 31. Further, the corresponding positioning mechanism 100 may be configured with the plug-in column 45, which may improve the structural flexibility of the positioning mechanism 100. The plug-in column 45 may be a metal part that is hard-wearing.

As the rear-hook assembly 40 (especially the elastic metal filament 41) may be curved, the plug-in column 45 may further be curved in the length direction, so as to adapt to the curved shape of the elastic metal filament 41, and further make the curvature of the rear-hook assembly 40 vary uniformly along the length direction. At this time, from one end of the plug-in column 45 near the elastic metal filament 41 to the other end away from the elastic metal filament 41, the curving radius of the plug-in column 45 may be gradually increased and changed within 50-150 mm. As the size of the plug-in column 45 in the length direction may be small, that is, the size of the plug-in column 45 may be short compared to the length of the elastic metal filament 41, so that the plug-in column 45 may further be straight.

As shown in FIG. 23 and FIG. 24, in some embodiments, the covering body 43 may be wrapped around a periphery of the elastic metal filament 41, the plug-in column 45, and the wire 42 to protect the elastic metal filament 41, the plug-in column 45, and the wire 42 from external intrusions, thereby extending the service life of the rear-hook assembly 40. In some embodiments, the materials of the covering body 43 may include but not limited to polycarbonate, polyamide, silicone, rubber, etc. The texture of the plug-in column 45 may be soft to improve the wearing comfort of the rear-hook assembly 40. In some embodiments, on the part of the plug-in column 45, the covering body 43 may be partly wrapped on the plug-in column 45, so that the end of the plug-in column 45 away from the elastic metal filament 41 may be exposed outside the covering body 43, and the plug-in column 45 may be partly inserted into the ear-hook housing 31.

In some embodiments, the plug-in column 45 may be a tube, that is, the shape of the section of the plug-in column 45 perpendicular to the length direction upward may be annular. In some embodiments, the elastic metal filament 41 may be fixedly connected within the plug-in column 45, and the wire 42 may further extend into the ear-hook housing 31 through the plug-in column 45. A part of the wire 42 corresponding to the plug-in column 45 may further be sleeved with a soft rubber sleeve (not shown in FIG. 23 and FIG. 24) to avoid wearing of the wire 42 and the plug-in column 45 due to frictions between the wire 42 and the plug-in column 45. In some embodiments, the plug-in column 45 may further be a semi-tube, that is, the shape of the section of the plug-in column 45 perpendicular to the length direction may be a half ring. In some embodiments, a wiring groove 451 may be arranged on the plug-in column 45, and the wire 42 may further be embedded in the wiring groove 451. In some embodiments, when the plug-in column 45 is a tube and is used to accommodate the conductor 42, the end of the elastic metal filament 41 and the end of the plug-in column 45 getting close to each other may further be fixedly connected through other fasteners. In addition, for the conductor 42, a part corresponding to the elastic metal filament 41 may be relatively fixed with the elastic metal filament 41 under the wrapping action of the covering body 43; and a part corresponding to the plug-in column 45 may be relatively fixed with the plug-in column 45 under the bonding action of adhesives (not shown in FIG. 23 and FIG. 24) to prevent the wire 42 from shaking in the rear-hook assembly 40. When the wire 42 is embedded in the wiring groove 451 of the plug-in column 45, adhesives may be provided between the wire 42 and the plug-in column 45 to prevent the wire 42 from separating from the plug-in column 45 under the action of plugging force, thereby increasing the reliability of the rear-hook assembly 40.

In some embodiments, as shown in FIG. 23 and FIG. 24, a blocking mechanism 200 matched with each other may be further arranged between the ear-hook housing 31 and the plug-in column 45, and the blocking mechanism 200 may be used to define a maximum or minimum value of the insertion depth of the plug-in column 45 relative to the ear-hook housing 31, so as to avoid the over-plugging or over-pulling during the process of adjusting the rear-hook assembly 40. For the ear-hook housing 31, the blocking mechanism 200 may include a first blocking portion 201 and a second blocking portion 202 within the ear-hook housing 31. The two portions may be relatively spaced apart in the direction in which the rear-hook assembly 40 is inserted and removed from the ear-hook housing 31. For the plug-in column 45, the blocking mechanism 200 may be a stop block 452 fixed on the end of the plug-in column 45. The stop block 452 may be located between the first blocking portion 201 and the second blocking portion 202. In the process of insertion portion of the plug-in column 45 into the ear-hook housing 31, the stop block 452 may be stopped by the first blocking portion 201; in the process of pulling out part of the plug-in column 45, the stop block 452 may be stopped by the second blocking portion 202. In this way, the over-plugging or over-pulling situation above may be avoided. In some embodiments, a guiding groove 203 may further be arranged between the first blocking portion 201 and the second blocking portion 202, and the stop block 452 and part of the plug-in column 45 may slide under the guide of the guiding groove 203, thereby improving the reliability and stability of the above plug adjustment.

In some embodiments, to make the apparatus 10 adapt to as many head sizes as possible for more users of different types, the maximum insertion depth of the plug-in column 45 relative to the ear-hook housing 31 may be 20 mm, and the minimum insertion depth of the plug-in column 45 relative to the ear-hook housing 31 may be 5 mm.

Figure 25:
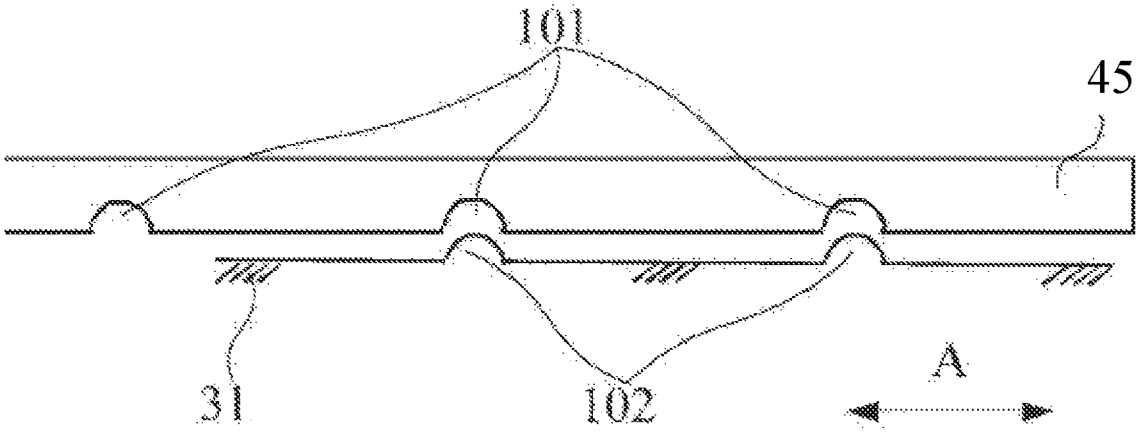
FIG. 25 is a structural schematic diagram illustrating an exemplary positioning mechanism according to some embodiments of the present disclosure.

The following may be a detailed exemplary description on the specific positioning mechanism:

FIG. 25 is a schematic diagram illustrating an exemplary positioning mechanism according to some embodiments of the present disclosure. The arrow A in FIG. 25 may indicate a plugging direction of a rear-hook assembly relative to an ear-hanging housing.

In some embodiments, as shown in FIG. 25, the positioning mechanism 100 may include a positioning depression 101 arranged on one of an ear-hook housing 31 and an inserted part of a plug-in column 45; and a positioning protrusion 102 arranged on the other one of the ear-hook housing 31 and the inserted part of the plug-in column 45. A count of one of the positioning depression 101 and the positioning protrusion 102 may be at least two, which are spaced apart along the insertion direction of the rear-hook assembly 40 relative to the ear-hook housing 31 in order to be able to engage with the other one of the positioning depression 101 and the positioning protrusion 102 in sequence with the change of the insertion depth of the plug-in column 45 relative to the ear-hook housing 31. In some embodiments, the positioning protrusion 102 may be set to escape from the positioning depression 101 after the user's plugin force is greater than a preset threshold, and then the insertion depth may be adjusted. The positioning protrusion 102 may be a metal part that is hard-wearing.

As shown in FIG. 25, in some embodiments, the positioning depression 101 may be arranged on the plug-in column 45, and the count of the positioning depressions 101 may be three. In some embodiments, the positioning protrusion 102 may further be arranged on the ear-hook housing 31, and the count of the positioning protrusion 102 may be two. At this time, in the direction of the insertion of the rear-hook assembly 40 relative to the ear-hook housing 31, the distances between the two adjacent depressions 101 in the three positioning depressions 101 may be equal to each other, and the distance between the two positioning protrusions 102 may be equal to that between two adjacent depressions 101. In this way, in the process of adjusting the rear-hook assembly 40 relative to the ear-hook housing 31, the positioning depression 101 and the positioning protrusion 102 may snap each other, thereby maintaining the use status of the rear-hook assembly 40. At this time, as the count of the positioning depressions 101 is three, there may be three options for maintaining the relative position of the rear-hook assembly 40 and the ear-hook housing 31 after the former is inserted into the latter to different depths. That is, the user may have three different options when adjusting the effective length of the rear-hook assembly 40 relative to the ear-hook housing 31.

In some embodiments, the count of the positioning depressions 101 may be arbitrarily, and the count of positioning protrusions 102 may further be arbitrarily. Furthermore, when the count of one of the positioning depressions 101 and the positioning protrusions 102 has been determined, the greater the count of the other is, the more the two may snap with each other, and the more reliable a positioning effect of the positioning mechanism 100 on the rear-hook assembly 40 and the ear-hook housing 31 may be. However, the plugging force required by the user may be greater as well. Conversely, the smaller the count of the other is, the less the two may snap with each other, and the less reliable the positioning effect of the positioning mechanism 100 on the rear-hook assembly 40 and the ear-hook housing 31 will be. However, the plugging force required by the user may be smaller as well. Therefore, the specific quantity of the positioning depressions 101 and positioning protrusions 102 and the spaces between them may be reasonably designed according to the actual adjustment requirements.

Figure 26:
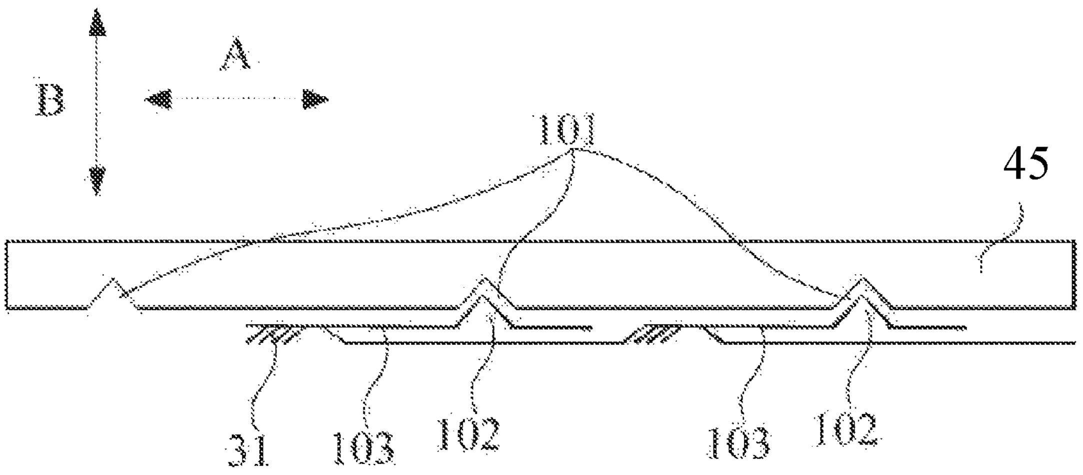
FIG. 26 is a structural schematic diagram illustrating an exemplary positioning mechanism according to some embodiments of the present disclosure.
Figure 27:
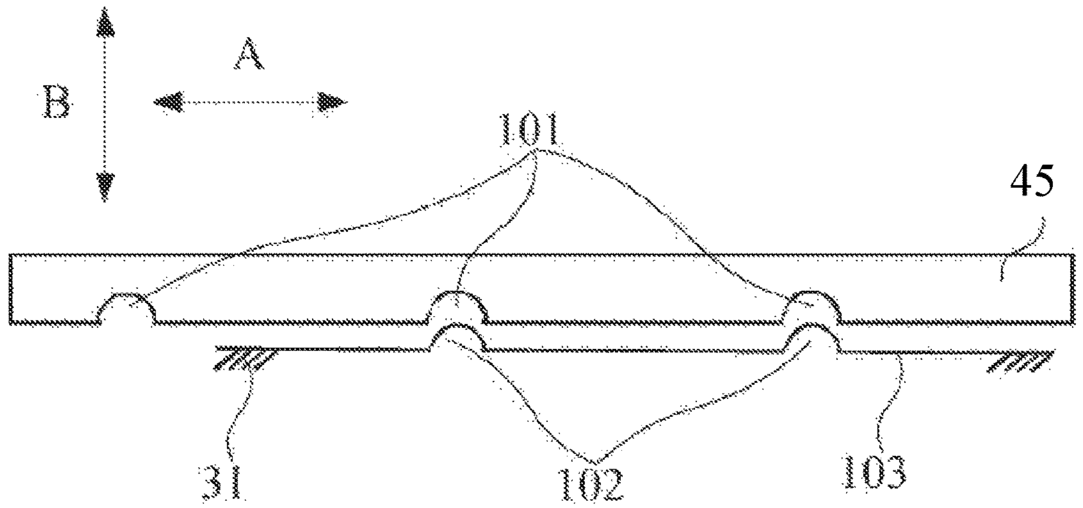
FIG. 27 is a structural schematic diagram illustrating an exemplary positioning mechanism according to some embodiments of the present disclosure.
Figure 28:
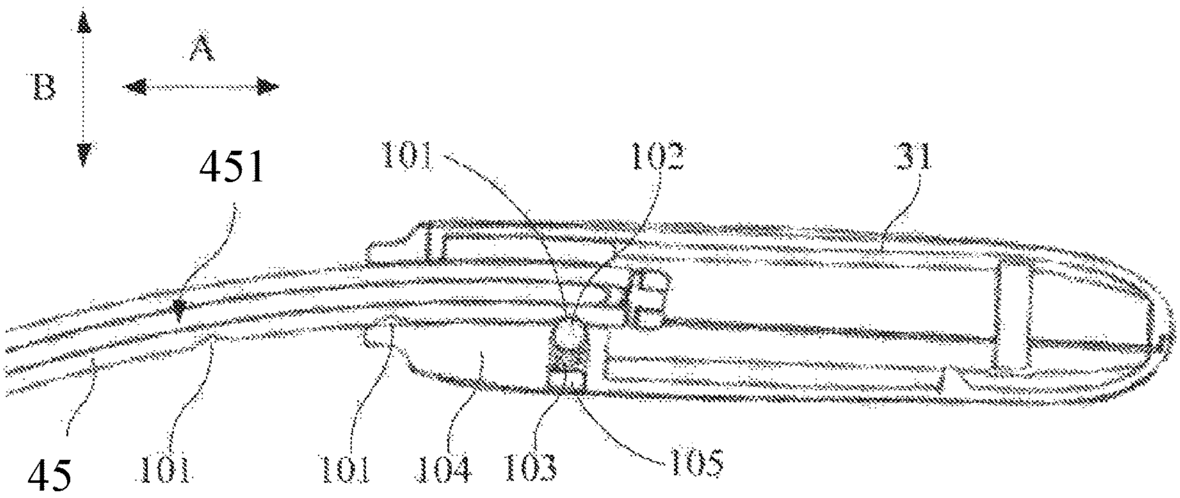
FIG. 28 is a structural schematic diagram illustrating an exemplary positioning mechanism according to some embodiments of the present disclosure.

FIG. 26 is a schematic diagram illustrating an exemplary positioning mechanism according to some embodiments of the present disclosure. FIG. 27 is a schematic diagram illustrating an exemplary positioning mechanism according to some embodiments of the present disclosure. FIG. 28 is a schematic diagram illustrating an exemplary positioning mechanism according to some embodiments of the present disclosure. It should be noted that an arrow A in FIG. 26 to FIG. 28 may indicate a plugging direction of a rear-hook assembly 40 relative to an ear-hook housing 31. An arrow B may indicate a deformation direction of elastic members under an action of plugging.

In some embodiments, a positioning mechanism 100 may further include an elastic member 103, which are used to elastically hold positioning protrusions 102 in positioning depressions 101. In this way, the positioning protrusions 102 may be pushed into the positioning depression 101 under the elastic force of the elastic member 103, the positioning protrusions 102 may further elastically deform the elastic member 103 and escape form the positioning depressions 101. Compared with the rigid cooperation shown in FIG. 6, the flexible cooperation shown in FIG. 7 to FIG. 9 may reduce the wear of the positioning mechanism 100 and increase the portability of regulating. In addition, as the positioning depressions 101 and the positioning protrusions 102 may be metal parts, when the elastic member 103 push the positioning protrusions 102 into the positioning depressions 101, the positioning protrusions 102 may colloid with the positioning depressions 101 to emit a "bang" metal impact sound, thereby reminding the user that the positioning mechanism 100 is in place.

In some embodiments, as shown in FIG. 26, the elastic member 103 may be elastic cantilevers. One end of the elastic cantilevers 103 may be connected with the ear-hook housing 31, the positioning protrusions 102 may be arranged on the elastic cantilevers 103, and the positioning depressions 101 may be arranged on a plug-in column 45. At this time, as shown in FIG. 26, a count of the elastic cantilevers 103 may be consistent with the count of positioning protrusions 102. In this way, in the process of plugging, elastic deformations or recoveries may happen to the elastic member 103, and then elastic forces may be applied to the positioning protrusions 102 to achieve flexible cooperation between the positioning protrusions 102 and the positioning depressions 101.

In some embodiments, as shown in FIG. 27, the elastic member 103 may be elastic bridges. One end of the elastic bridges 103 may be connected with the ear-hook housing 31, the positioning protrusions 102 may be arranged on the elastic bridges 103, and the positioning depressions 101 may be arranged on a plug-in column 45. At this time, as shown in FIG. 27, the count of the elastic bridges 103 may be inconsistent with the count of positioning protrusions 102. In this way, in the process of plugging, elastic deformations or recoveries may happen to the elastic member 103, and then elastic forces may be applied to the positioning protrusions 102 to achieve flexible cooperation between the positioning protrusions 102 and the positioning depressions 101.

In some embodiments, as shown in FIG. 28, elastic member 103 may be springs. A mounting seat 104 may be arranged in the ear-hook housing 31, the mounting seat 104 may form an accommodation bin for holding the spring 103 and the positioning protrusion 102, the spring 103 may elastically support the positioning protrusion 102 so that the positioning protrusion 102 may be exposed from the accommodation bin, and the positioning depression 101 may be arranged on the plug-in column 45. In this way, in the process of plugging, elastic deformations or recoveries may happen to the elastic member 103, and then elastic forces may be applied to the positioning protrusions 102 to achieve flexible cooperation between the positioning protrusions 102 and the positioning depressions 101.

In some embodiments, the positioning protrusion 102 may be spherical, such as a steel ball. In some embodiments, the ratio between the embedding depth of the positioning protrusion 102 relative to the positioning depression 101 and the radius of the positioning protrusion 102 may be ⅓ to ⅔. For example, the diameter of the steel ball may be 1.0 mm, and the embedding depth may be 0.25 mm.

In some embodiments, the mounting seat 104 and ear-hook housing 31 may be an integrated structure. At this time, a pin 105 may be arranged on one end of the elastic member 103 apart from the positioning protrusions 102. The pin 105 may be fixedly connected with any one or combinations of assembly methods such as clamping, bonding, and thread connection.

Just as an example, as shown in FIG. 28, if the count of positioning depressions 101 is three, and the count of the positioning protrusion 102 and the elastic member 103 cooperating with the positioning protrusion 102 may be 1, then the effective length of the rear-hook assembly 40 may have three adjustable gears. Further, if the basic length of the rear-hook assembly 40 is 200 mm, and the distance between the two positioning depressions 101 may be 10 mm, then the effective length of the rear-hook assembly 40 may be adjusted to 180 mm and 160 mm.

In some embodiments, parameters such as a diameter of the positioning protrusion 102, an elasticity of the elastic member 103, a depth of the positioning protrusion 102 depressed into the positioning depression, etc. may affect a size of a preset threshold of the plugging force applied by the user. Obviously, if the preset threshold is too small, then the positioning mechanism 100 may not be reliable; if the preset threshold is too large, then the plugging force applied by the user may be very large, which makes adjustment be difficult. Further, under the action of the elastic member 103, the positioning protrusion 102 may always be elastically pressed on the plug-in column 45. Therefore, when designing the preset threshold, a pushing force F1 required by the plug-in column 45 to push the positioning protrusion 102 away from the corresponding positioning depression 101 and a sliding friction force F2 of the plug-in column 45 after the positioning protrusion 102 is separated from the positioning depression 101.

For the pushing force F1, the elasticity F of the elastic member 103 and the pushing force F1 implemented to the positioning protrusion 102 satisfies the following relational expression: $F1=F*\sin\theta/\cos$, wherein θ refers to an angle between a tangent of a contact surface between the positioning protrusion 102 and the positioning depression 101 and the pushing force F1. In some embodiments, 180 g≤F1≤240 g. For example, F1=200 G, that is, the preset threshold may be designed to 200 g.

For the sliding friction F2, the elasticity F of the elastic member 103 and the sliding friction F2 implemented to the positioning protrusion 102 satisfies the following relational expression: $F2=(\mu1+\mu2)*F$, wherein μ1 refers to a friction coefficient between the positioning protrusion 102 and the plug-in column 45, and μ2 refers to a friction coefficient between the plug-in column 45 and the ear-hook housing 31. Obviously, the smaller the value of the sliding friction F2 is, the sliding resistance after the separation of the positioning protrusion 102 and the positioning depression 101 may be, and the user may adjust more conveniently.

Figure 29:
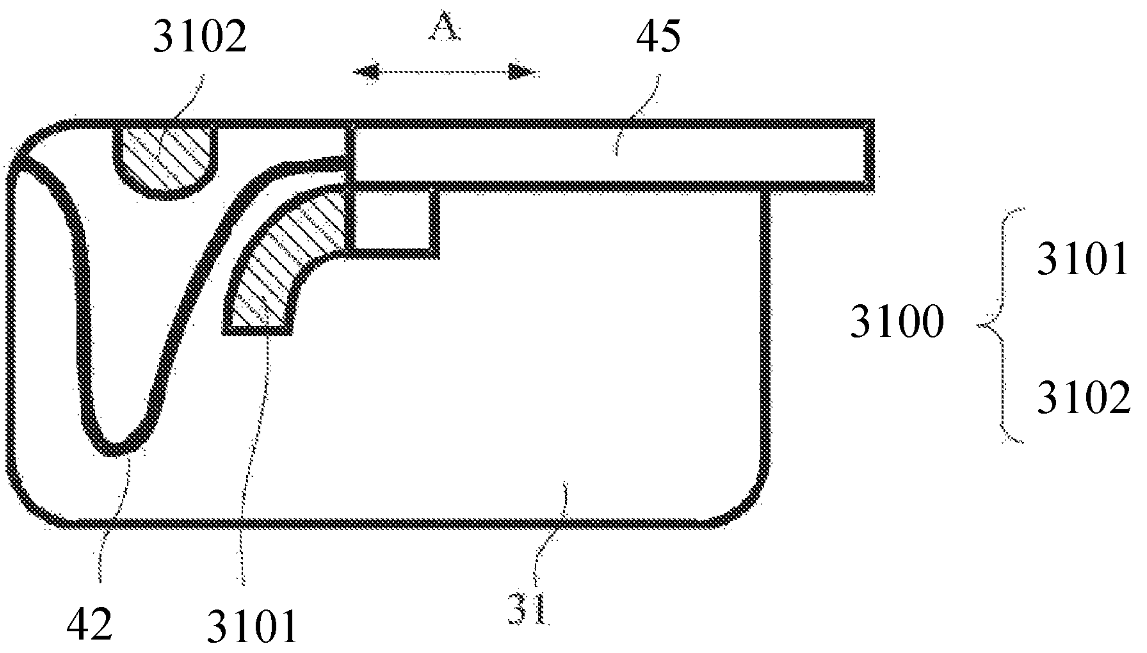
FIG. 29 is a structural schematic diagram illustrating a principle of arranging a guide mechanism on an ear-hook housing according to some embodiments of the present disclosure.

FIG. 29 is a structural schematic diagram illustrating a principle of arranging a guide mechanism on an ear-hook housing according to some embodiments of the present disclosure.

Based on the above detailed description, in some embodiments, after the wire 42 transmits through the rear-hook assembly 40, the end of the wire 42 may be fixedly connected with the control circuit assembly 60 or the battery assembly 50, and the other parts may be relatively fixed with the elastic metal filament 41, the plug-in column 45, etc. Obviously, when a user adjusts the relative insertion depth of the rear-hook assembly 40 into an ear-hook housing 31, a part of the wire 42 corresponding to the ear-hook housing 31 may need to be reserved to avoid being pulled off. That is, the end of the wire 42 inserted into the ear-hook housing 31 from the plug-in column 45 may extend to form a certain length. The length (or the reserved amount) extended by the wire 42 may be reasonably designed according to the maximum value and/or the minimum value of the relative insertion depth of the rear-hook assembly 40 into an ear-hook housing 31, which is not limited here.

In some embodiments, a guiding mechanism 3100 may further be arranged in the ear-hook housing 31. The guiding mechanism 3100 may be used to guide the part of the wire 42 extended from the plug-in column 45 during the plugging process of the plug-in column 45 relative to the ear-hook housing 31, so that the wire 42 may not accumulate near the amount port 304.

In some embodiments, as shown in FIG. 29, the guiding mechanism 3100 may include a first guiding mechanism 3101 and a second guiding mechanism 3102. The first guiding mechanism 3101 may be arranged near the mounting port 304, and may be located on one side of the part of the wire 42 extended from the plug-in column 45; the second guiding mechanism 3102 may be spaced apart with the first guiding mechanism 3101 along the inserting direction of the plug-in column 45 relative to the ear-hook housing 31, and may be located on the other side of the part of the wire 42 extended from the plug-in column 45. Further, the part of the wire 42 extended from the plug-in column 45 may be curved from the side of the second guiding mechanism 3102 to the side of the first guiding mechanism 3101. At this time, at least the first guiding mechanism 3101 may be curved to facilitate the guidance of the conductor 42.

The above descriptions are only part of the embodiments of the present disclosure, and are not intended to limit the protection scope of the present disclosure. Any equivalent device or equivalent process transformation using the contents of the present disclosure and the drawings, or any direct or indirect applications thereof in other relevant technical fields shall be within the protection range of the present disclosure.

Figure 30:
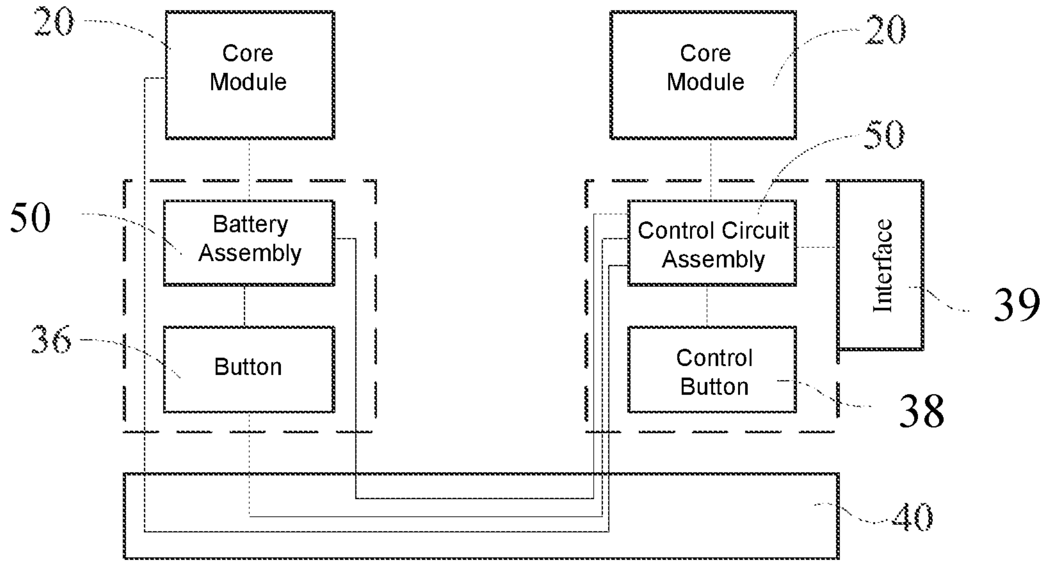
FIG. 30 is a structural schematic diagram illustrating wiring among each of a plurality of electrical components according to some embodiments of the present disclosure.

FIG. 30 is a structural schematic diagram illustrating wiring among each of a plurality of electrical assemblies according to some embodiments of the present disclosure.

In some embodiments, as shown in FIG. 30, the core module 20 on one side of the control circuit assembly 60, the control button 38 and other electrical devices may be electrically connected with the control circuit assembly 60 through a conductor instead of a connection assembly 40 (i.e., a rear-hook assembly 40). The core module 20 on one side of a battery assembly 50, a button 36 and other electrical devices may further be electrically connected with the battery assembly 50 through the conductor instead of the connection assembly 40. However, the electrical connections between the battery assembly 50 and the control circuit assembly 60, between the core module 20 on one side of the battery assembly 50 and the button 36 and the other electrical devices and the control circuit assembly 60 may be through the connect assembly 40. In some embodiments, the wiring structure of the connection assembly 40 may often be designed as a stranded wire, making the wiring structure of this part relatively bulky. At this time, when the stranded wire (whose cross-section is generally a circle) cooperates with the elastic metal filaments and other structural members (whose cross section is generally a circle), a comparatively large space may be left between the two, so that the size of this part may be comparatively bulky. Therefore, in some embodiments of the present disclosure, different from other embodiments, the stranded wire may be split and wired separately, making the wires conformal to the structural members like the elastic metal filament to narrow the space between two wires, thereby making the connection assembly 40 compact in structure.

Figure 31:
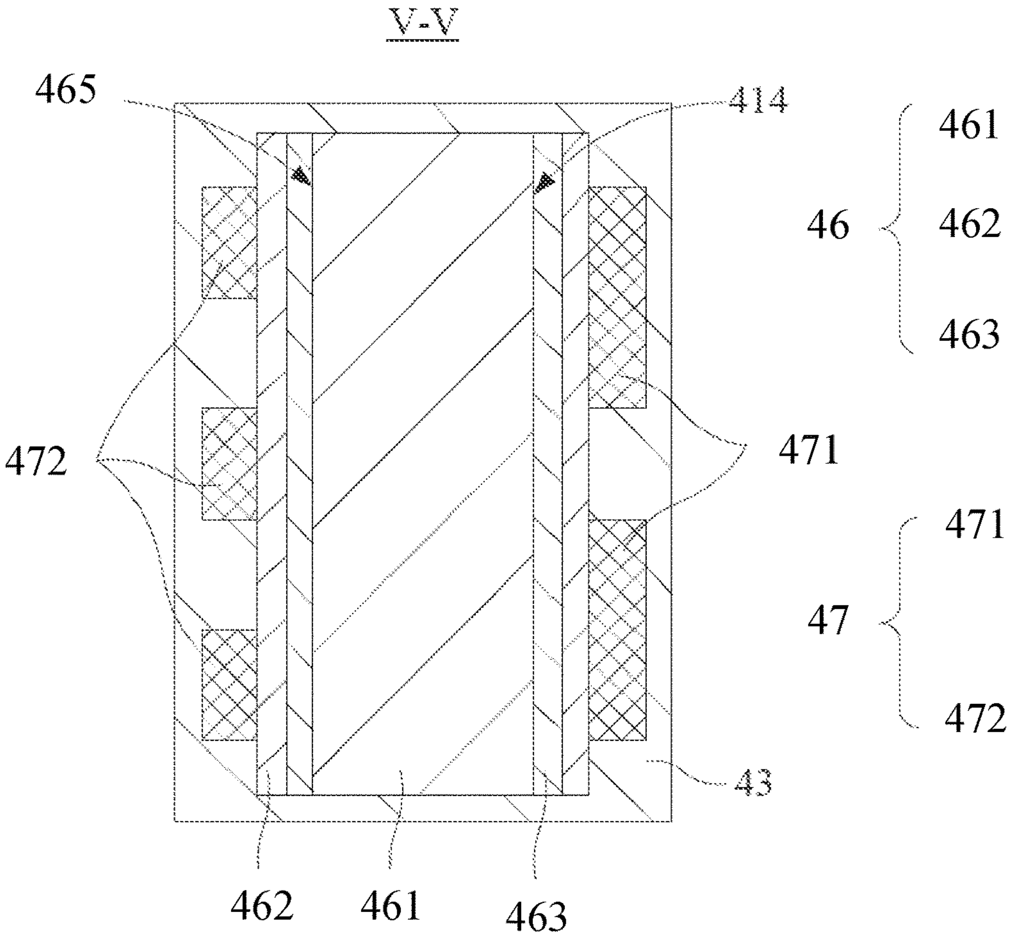
FIG. 31 is a schematic diagram illustrating a cross-sectional structure of a connection assembly according to some embodiments of the present disclosure.
Figure 32:
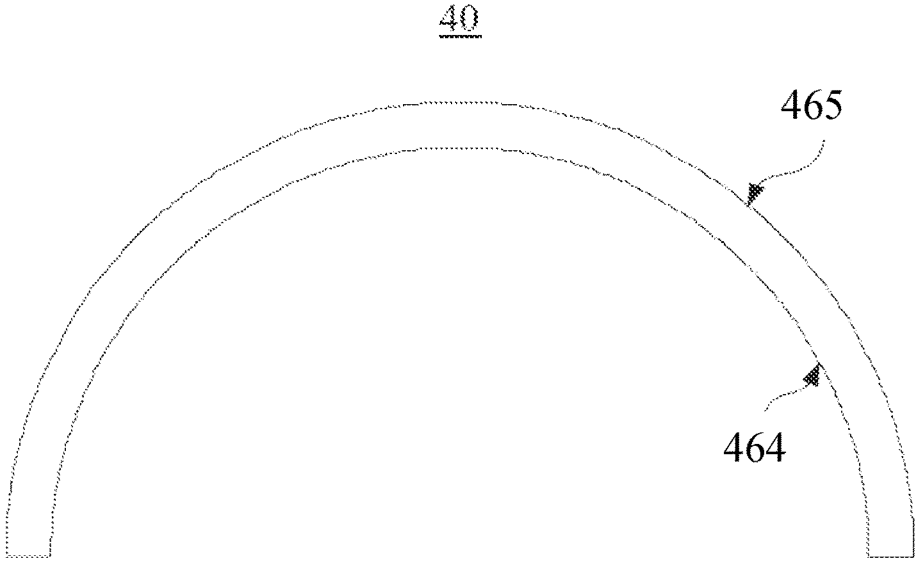
FIG. 32 is a schematic diagram illustrating a top view structure of a connection assembly according to some embodiments of the present disclosure.
Figure 33:
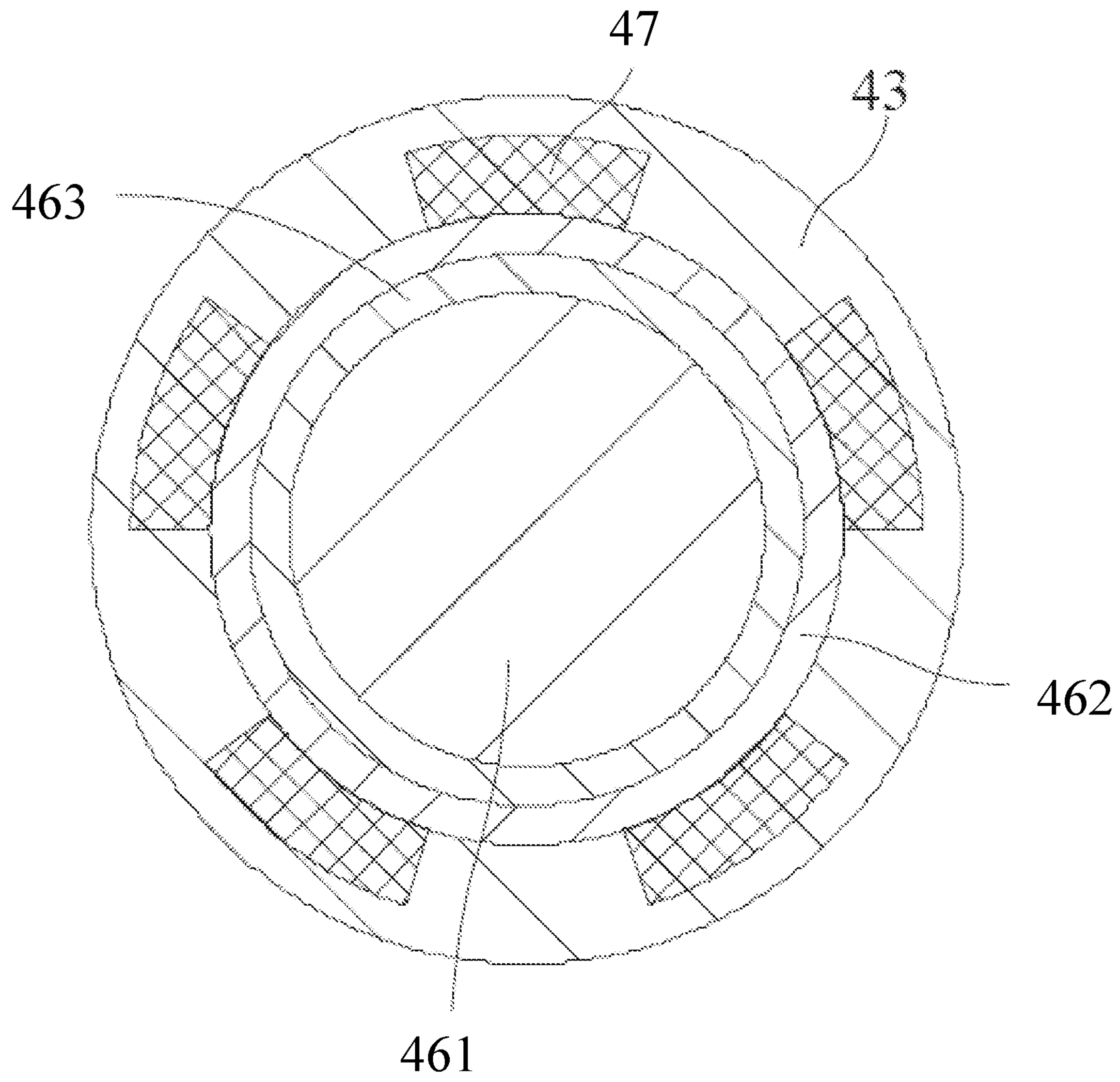
FIG. 33 is a structural schematic diagram illustrating a base body according to some embodiments of the present disclosure.
Figure 34:
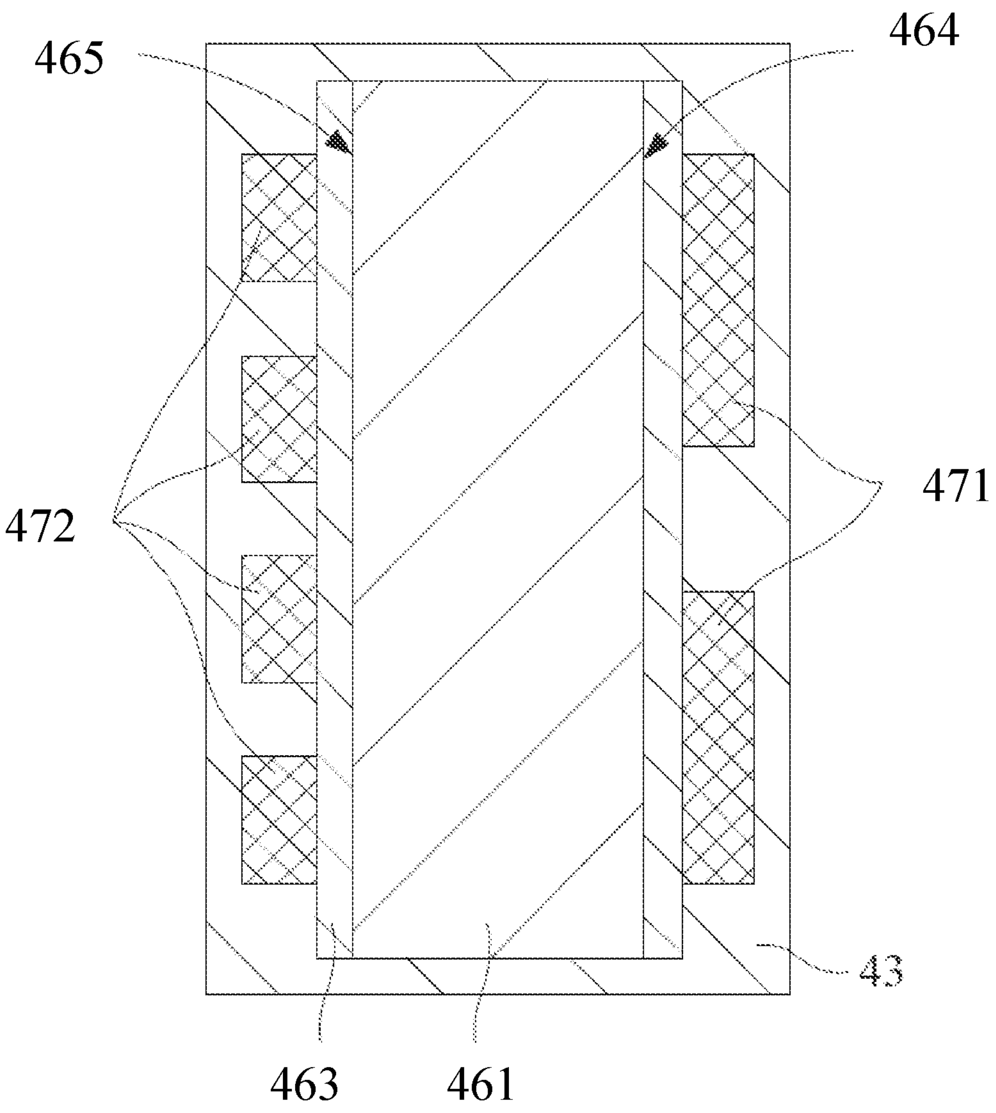
FIG. 34 is a schematic diagram illustrating a cross-sectional structure of a connection assembly according to some embodiments of the present disclosure.

FIG. 31 is a schematic diagram illustrating a cross-sectional structure of a connection assembly according to some embodiments of the present disclosure. FIG. 32 is a schematic diagram illustrating a top view structure of a connection assembly according to some embodiments of the present disclosure. FIG. 33 is a structural schematic diagram illustrating a base body according to some embodiments of the present disclosure. FIG. 34 is a schematic diagram illustrating a cross-sectional structure of a connection assembly according to some embodiments of the present disclosure.

In some embodiments, the connection assembly 40 may be curved in overall structure, and the length direction may be a corresponding curve instead of a straight line. Further, the direction shown in FIG. 31 may be perpendicular to the length direction of the connection assembly 40, so that the plane of the section structure shown in FIG. 31 may indicate a reference section perpendicular to the length direction of the connection assembly 40 (that is, the base body 46).

As shown in FIG. 31, in some embodiments, the connection assembly 40 may include the base body 46, a plurality of conformal lines 47, and a covering body 43. The base body may be in a curved shape along the length direction, so that the connection assembly 40 may be hung on the user's head or ear. For example, when the connection assembly 40 is hung on the user's head, the weight of the apparatus 10 may be mainly borne by the user's head; when the connection assembly 40 is hung on the user's ears, the weight of the apparatus 10 may be mainly borne by the user's ear. At this time, the base body 46 may mainly support the connection assembly 40 to maintain the basic structural form, and then when the user wears the apparatus 10, the connection assembly 40 may cooperate with the two core modules 20 and two ear-hook assemblies 30 to provide a clamping force to increase the stability and reliability of wearing. In some embodiments, on the reference section perpendicular to the length direction of the connection assembly 40, the cross-section of the base body 46 may be a circle, a rectangle, a trapezoid, etc. Meanwhile, the plurality of conformal lines 47 may be conformally spaced apart on the base body 46. In some embodiments, the plurality of conformal lines 47 may further extend along the length direction of the base body 46 from a first end of the base body 46 to a second end, so that the plurality of conformal lines 47 may be electrically connected with the electrical devices hung on the first end and the second end of the base body 46 (e.g., the core module 20, the button 36, the control circuit assembly 60, the battery assembly 50, etc.), then replace the stranded wires in relevant technologies. At this time, to avoid short circuit in the plurality of conformal lines 47, the insulation impedance between the plurality of conformal lines 47 may be no less than 10 trillion Ohms. Furthermore, the covering body 43 may be wrapped in the periphery of the plurality of conformal lines 47 and the base body 46 to protect the plurality of conformal lines 47 and the base body 46, thereby increasing the service life of connection assembly 40. In some embodiments, the material of the covering body 43 may be but not limited to polycarbonate, polyamide, silicone, rubber, etc. The texture may be soft to increase the comfort of the connection assembly 40.

In some embodiments, the conformal arrangement may mainly on the reference section, and the shape of the contact surface of the plurality of conformal lines 47 and the base body 46 may be generally consistent with each other. For example, as shown in FIG. 31, the surface of the base body 46 may be plane, then contact surface of the plurality of conformal lines 47 and the base body 46 may further be plane. For another example, as shown in FIG. 33, the surface of the base body 46 may be a curved surface, then the contact surface of the plurality of conformal lines 47 and the base body 46 may correspondingly be a curved surface, and the bending direction and radius of curvature of the two may be roughly the same. This arrangement may effectively narrow the space between the stranded wires (whose cross section may generally be a circle) and the structural members like the elastic metal filament (whose cross section may generally be a circle as well), thereby making the connection assembly 40 compact in structure. In some embodiments, the plurality of conformal lines 47 may be formed on the base body 46 through a conformal circuit fabrication process, a photolithography process, an electroplating process, a roll printing process, etc. In some embodiments, the material of the plurality of conformal lines 47 may include but not limited to gold, silver, copper, nickel, tin, silver, palladium, rhodium, etc. or the alloys thereof. In some embodiments, the plurality of conformal lines 47 may further be lines bond on the base body 46, but the two need to be conformal in structure.

In some embodiments, the base body 46 may include an elastic metal filament 461 and an insulation layer 462 wrapped in the peripheral of the elastic metal filament 461.

At this time, the plurality of conformal lines 47 may be conformally arranged on the insulation layer 462. In some embodiments, the material of the elastic metal filament 461 may include but not limited to spring steel, titanium alloy, titanium nickel alloy, chromium molybdenum steel, etc. The material of the insulation layer 462 may include, but not limited to ethylene resin paint, acrylic resin paint, polyester resin paint, epoxy resin paint, polyurethane paint, organic element paint, rubber paint, etc., or the material may further include but not limited to oil paint, natural resin, phenolic resin, asphalt paint, etc. At this time, the insulation layer 462 may be formed on the surface of the base body 46 by spraying, spraying, coating, electrophoresis, vapor deposition, etc. Further, the plurality of conformal lines 47 may be a metal layer attached and fixed on the insulation layer 462.

In some embodiments, the base body 46 may further include a bonding layer 463 between the elastic metal filament 461 and the insulation layer 462. The bonding layer 463 may include but not limited to neoprene adhesives, nitrile rubber adhesive, polyurethane adhesives, acrylic adhesives, polymethacrylate adhesives, organic silicon rubber adhesive, etc. This arrangement makes an adhesion coefficient of the bonding layer 463 to the elastic metal filament 461 greater than that of the insulation layer 462 to the elastic metal filament 461 to increase the adhesion between the insulation layer 462 and the base body 46. That means the insulation layer 462 may be better attached to the elastic metal filament 461 through the bonding layer 463, thereby improving the firmness of the connection assembly 40 in the overall structure.

It should be explained that as the elastic metal filament 461 is not an insulator, the elastic metal filament 461 has certain conductivity. The elastic metal filament 461 may be further used to achieve the electrical connections between the electrical devices hung on the first and the second ends of the base body 46. At this time, the elastic metal filament 461 may not only support the entire connection assembly 40 in the structure, but further cooperate with the plurality of conformal lines 47 as part of a wiring structure to make it "one piece of two purposes", thereby simplifying the circuit structure of the connection assembly 40 and saving costs.

In other embodiments, the base body 46 may be a hard plastic part that has a certain variable (that is, the curvature corresponding to a curved shape of the base body 46 may be smaller), structural strength and electrical insulation, and further takes into account the wearing of the connection assembly 40, the support of the base body to the connection assembly 40, and the electrical insulating demand of the plurality of conformal lines 47. At this time, the plurality of conformal lines 47 may be directly conformally arranged on the base body 46, or the bonding layer 463 may be added between the two. The following will perform an exemplary illustration taking the example of the shape of the reference cross-section is roughly a rectangle:

As the plurality of conformal lines 47 (and the elastic metal filament 461) need to realize the electrical connections between a plurality of electrical devices, the plurality of conformal lines 47 may be divided into a plurality of groups according to the specific electrical connection needs, and then the wiring structure in the connection assembly 40 may be reasonably arranged.

As shown in FIG. 31, on the reference section, the base body 46 may have a first surface 464 and a second surface 465 opposite to each other. The first surface 464 and the second surface 465 may be planes. On the reference section, the widths of the first surface 464 and the second surface 465 may be greater than the distance between the first surface 464 and the second surface 465. That is, the shape of the base body 46 on the reference section may be a rectangle; the shape of the connection assembly 40 on the length direction may be flat, and with a bending arc. This arrangement may limit a rotation freedom of the connection assembly 40 to a certain extent, thereby avoiding the fracture of the apparatus 10 due to improper operations such as stretching and bending the connection assembly 40 when a user uses the apparatus 10. The ratio between the width of the first surface 464 and the second surface 465 and the distance between the first surface 464 and the second surface 465 may be 2:1-4:1. For example, the above ratio may be 3:1. In a specific embodiment, the length of the base body 46 may be 200 mm, the widths of the first surface 464 and the second surface 465 (that is, the width of the base body 46) may be 2.4 mm, the distance between the first surface 464 and the second surface 465 (that is, the thickness of the base body 46) may be 0.8 mm. Further, the edges of the first surface 464 and the second surface 465 may be rounded corners, that is, the corners of the base body 46 may be round corners, and then the outer surface of the connection assembly 40 may further be an arc transition, which reduces unnecessary wear and tear.

Further, one of the first surface 464 and the second surface 465 may face the inner side of the curved shape of the base body 46, the other one may face the outer side of the curved shape of the base body 46. For example, as shown in FIG. 32, the first surface 464 may face the inner side of the curved shape of the base body 46, and the second surface 465 may face the outer side of the curved shape of the base body 46. That is, when the connection assembly 40 is hung on the head or ear of the user, the part of the connection assembly 40 corresponding to the first surface 464 may contact the user's skin, while the part of the connection assembly 40 corresponding to the second surface 465 may not contact, or may seldom contact the skin of the user.

It should be noted that on the reference section, if the section shape of the base body 46 is a circle shown in FIG. 33, the base body 46 may not have the first surface 464 and the second surface 465 in the strict sense. At this time, the plurality of conformal wires 47 may be evenly distributed in the circumferential direction of the base body 46.

Based on the basic structure of the base body 46, the plurality of conformal lines 47 may be divided into two groups. A first group of conformal lines 471 may be conformally arranged on the first surface 464, and a second group of conformal lines 472 may be arranged on the second surface 465. This arrangement may make full use of the surface of the base body 46, and then reasonably arrange the wiring structure in the connection assembly 40. Further, to meet the electrical insulation between the plurality of conformal lines 47, the spaces between the conformal wires in the first group of conformal lines 471 may be no less than 0.1 mm, and the spaces between the conformal lines in the second group of conformal lines 472 may be no less than 0.1 mm as well.

As shown in FIG. 31, the count of the conformal lines in the first group of conformal lines 471 may be less than that of the conformal lines in the second group of conformal lines 472; and on the reference section, the cross-sectional area of the conformal lines of the first group of conformal lines 471 may be greater than that of the conformal lines of the first group of conformal lines 471. For example, on the reference section, each conformal line may have a width along the first surface 464 or the second surface 465 where the conformal line locates, and each conformal line may further have a thickness along the direction perpendicular to the first surface 464 or the second surface 465. The width of the conformal line in the first group of conformal lines 471 may be greater than that of the conformal line in the second group of conformal lines 472. In some embodiments, the thickness of the conformal line in the first group of conformal lines 471 may further be greater than the thickness of the conformal line in the second group of conformal lines 472. At this time, in the case where the resistivities of the plurality of conformal lines 47 may be substantially equal, the conformal lines in the first group of conformal lines 471 may have smaller resistance.

In some embodiments, to meet the electrical connections between the electrical devices in the apparatus 10, and reduce the impedance as much as possible, the resistance of the conformal line in the first group of conformal lines 471 may be less than or equal to 100 milliohms. The resistance of the conformal lines in the second group of conformal lines 472 may be less than or equal to 500 milliohms. Similarly, the count of conformal lines in the second group of conformal lines 472 may further be less than that of the first group of conformal lines 471, and on the reference section, the cross-sectional area of the conformal lines of the second group of conformal lines 472 may be greater than that of the conformal lines in the first group of conformal lines 471.

Further, the conformal lines in the first group of conformal lines 471 may be used to realize the electrical connection between the battery assembly 50 hung on the first end of the base body 46 and the control circuit assembly 60 hung on the second end of the base body 46. In this way, as a Type-C (USB) interface 39 may be arranged on one side of the control circuit assembly 60, when the battery assembly 50 is charging, electric energy may need to be transmitted through the conformal lines of the connection assembly 40 (specifically, through the first group of conformal lines 471). Then when the resistance of the conformal lines in the first group of conformal lines 471 may be less than that of the second group of conformal lines 472, using the conformal lines of the first group of conformal lines 471 to transmit the electric energy when charging may reduce the loss of the energy and improve the situation of heating problem of the apparatus 10 in the charging process.

In some embodiments, combining FIG. 30 and FIG. 31, the count of conformal lines in the first group of conformal lines 471 may be two, and the count of conformal lines in the second group of conformal lines 472 may be three. The conformal lines in the first group of conformal lines 471 may be used to form a current circuit between the battery assembly 50 and the control circuit assembly 60. Two of the conformal lines in the second group of conformal lines 472 may cooperate with each other, and the remaining one may cooperate with the elastic metal filament 461, to form current circuits respectively between the control circuit assembly 60 and the core module 20 hung on a first end of the base body 46 (i.e., the core module 20 near the side of the battery assembly 50), and between the control circuit assembly 60 and the button 36 hung on a first end of the base body 46 to form a current circuit.

Further, on the reference section, the width of the first surface 464 and the width of the second surface 465 may be equal. In this way, when the conformal lines in the second group of conformal lines 472 meet the signal transmission requirement of the corresponding electrical device, the width of the conformal lines in the first group of conformal lines 471 may be as great as possible, so that the resistance in the conformal lines of the first group of conformal lines 471 may be reduced as much as possible. In some embodiments, on the reference section, the widths of the first group of conformal lines 471 and the second group of conformal lines 472 may be different. In this way, when the conformal lines of the second group of conformal lines 472 meet the signal transmission of the corresponding electrical device, and the conformal lines of the first group of conformal lines 472 meet the signal transmission of the corresponding electrical device, through reducing the width of the first surface 464 or the second surface 465, the material may be saved and the cost of the connection assembly 40 may be reduced.

In some other embodiments, combining FIG. 30 and FIG. 34, the count of conformal lines in the first group of conformal lines 471 may be two, and the count of conformal lines in the second group of conformal lines 472 may be four. The conformal lines in the first group of conformal lines 471 may be used to form a current circuit between the battery assembly 50 and the control circuit assembly 60. The conformal lines of the second group of conformal lines 472 may cooperate in pairs, that is, may be further divided into two groups, to form current circuits between the control circuit assembly 60 and the core module 20 hung on a first end of the base body 46 (i.e., the core module 20 near the side of the battery assembly 50), and between the control circuit assembly 60 and the button 36 hung on a first end of the base body 46 to form a current circuit.

Figure 35:
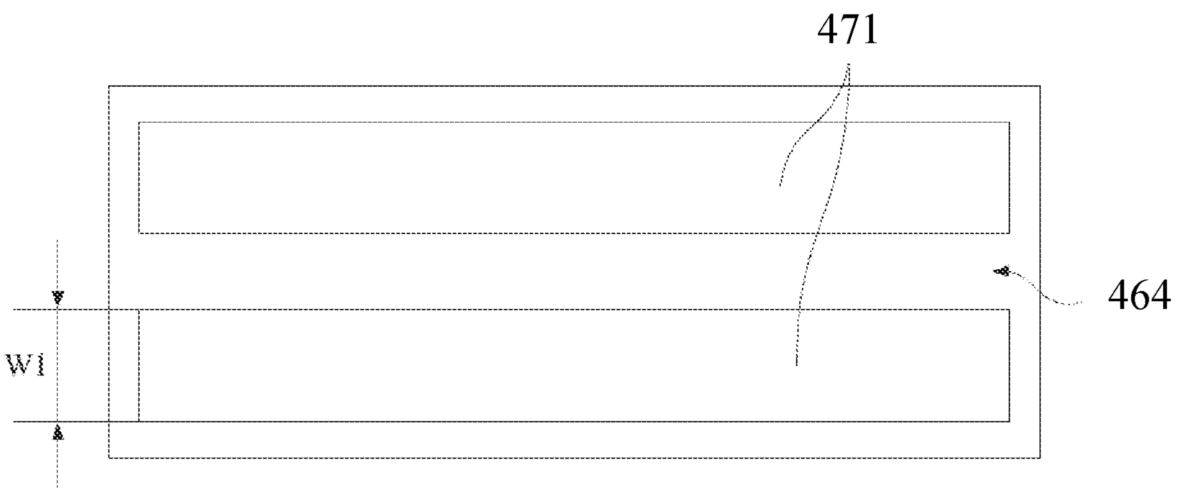
FIG. 35(*a*) is a structural schematic diagram illustrating an orthographic projection of a first group of conformal lines on a base body according to some embodiments of the present disclosure.
Figure 35:
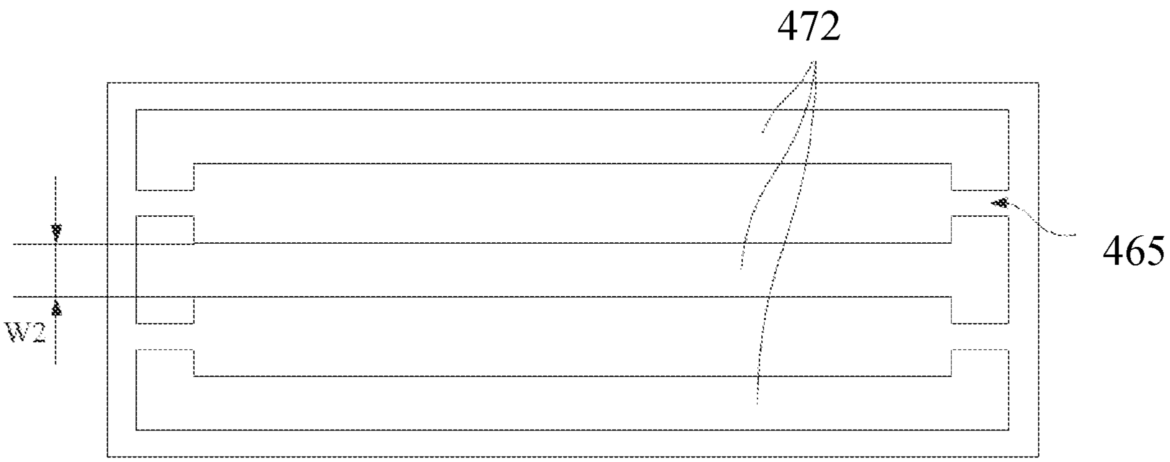

FIG. 35 (A) is a structural schematic diagram illustrating an orthographic projection of a first group of conformal wires on a base body according to some embodiments of the present disclosure. FIG. 35(*b*) is a structural schematic diagram illustrating an orthographic projection of a second group of conformal wires on a base body according to some embodiments of the present disclosure.

As shown in FIG. 35 A and FIG. 35 B, widths of conformal lines in the first group of conformal lines 471 (such as the size shown in W1 in FIG. 9) may be greater than that of widths of conformal lines in the second group of conformal lines 472 (such as the size shown in W2 in FIG. 9), so that two ends of the conformal lines in the first group of conformal lines 471 may not be configured with welding pads (e.g., the square ear shown in FIG. 10), and a structure of the first group of conformal lines 471 may be simplified. The difference may be that as the width W2 of the conformal lines in the second group of conformal lines 472 is small, to meet the welding needs between the conformal lines in the second group of conformal lines 472 and other electrical devices, two ends of the conformal lines in the second group of conformal lines 472 may be configured with welding pads as shown in FIG. 35B, to increase the contact area between the conformal lines in the second group of conformal lines 472 and other electrical devices when welding, thereby avoiding the dilemma such as cold joint, etc.

The above descriptions are only part of the embodiments of the present disclosure, and are not intended to limit the protection scope of the present disclosure. Any equivalent device or equivalent process transformation using the contents of the present disclosure and the drawings, or any direct or indirect applications thereof in other relevant technical fields shall be within the protection range of the present disclosure.

Figure 36:
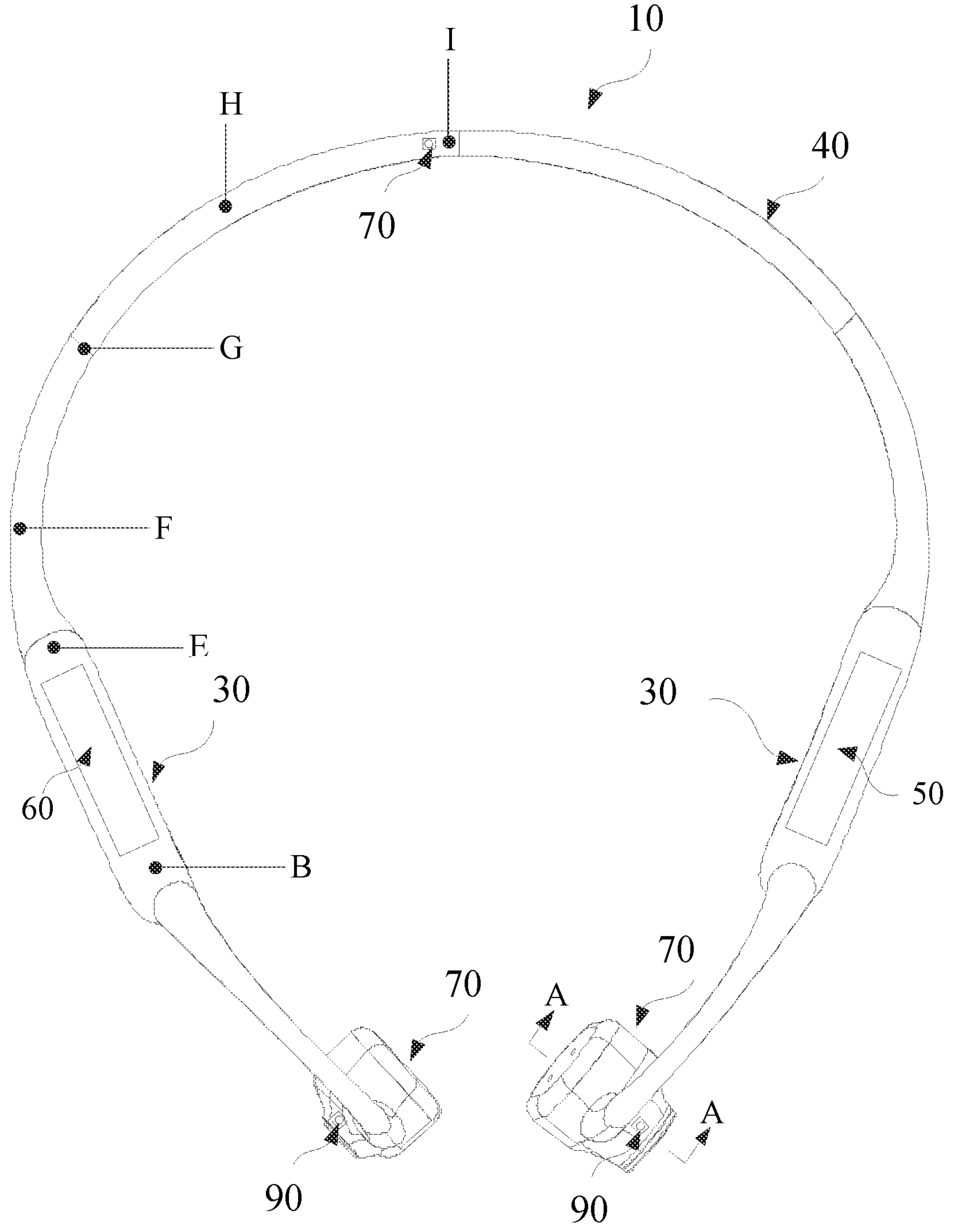
FIG. 36 is a structural schematic diagram illustrating an apparatus according to some embodiments of the present disclosure.

FIG. 36 is a structural schematic diagram illustrating an apparatus according to some embodiments of the present disclosure.

As shown in FIG. 36, in some embodiments, the apparatus 10 may include two loudspeaker assemblies 70, two ear-hook assemblies 30, and a rear-hook assembly 40. One end of the two ear-hook assemblies 30 may respectively connect the loudspeaker assembly 70, that is, the two ear-hook assemblies 30 each may connect the loudspeaker assembly 70. The rear-hook assembly 40 may connect between the other ends of the two ear-hook assemblies 30 deviating from the corresponding loudspeaker assembly 70. In some embodiments, the apparatus 10 may further include one or more sound pickup assemblies 90.

The loudspeaker assembly 70 may be used to transform audio into mechanical vibrations of different frequencies. When the apparatus 10 is worn, the loudspeaker assembly 70 may be close to the user's head and near the user's ear, and then the mechanical vibration may be transmitted to the human auditory system through the bone of the head. The ear-hook assembly 30 may be used to hang on the ears of the user. In some embodiments, the two ear-hook assemblies 30 may be arranged with a battery assembly 50 and a control circuit assembly 60. The control circuit assembly 60 may be used to control the operation of the apparatus 10, such as volume control, startup/shutdown, headphone mode selection, wireless connection or data transmission, etc. The battery assembly 50 may be used to power the apparatus 10. When the apparatus 10 is worn, the rear-hook assembly 40 may surround the back side of the user's head. The rear-hook assembly 40 may be connected between the other ends of the two ear-hook assemblies 30, and the structure may be reliable and stable, so that the apparatus 10 may be worn stably.

Taking the plurality of sound pickup assemblies 90 included in the embodiment as an example, the plurality of sound pickup assemblies 90 may be arranged in at least two of the two loudspeaker assemblies 70 and the rear-hook assembly 40, or the plurality of sound pickup assemblies 90 may be spaced apart on the rear-hook assembly 40, wherein the plurality of sound pickup assemblies 90 may be independent from each other, so that the plurality of sound pickup assemblies 90 may be able to pick up and amplify the signal independently. It should be explained that the "a/the plurality of" described in this embodiment refers to "at least two", such as "two", "three", "four", etc.

In some embodiments, at least two sound pickup assemblies 90 may be arranged on the rear-hook assembly 40. One of the sound pickup assemblies 90 may be arranged in the middle position of the rear-hook assembly 40, and the other sound pickup assemblies 90 may be spaced apart on one side or two sides of the middle position. For another example, this embodiment includes three sound pickup assemblies 90, two of three sound pickup assemblies 90 may be respectively arranged in two corresponding loudspeaker assemblies 70, and the other one may be arranged in the rear-hook assembly 40. The sound pickup assemblies 90 may be independent from each other, so that the sound pickup assemblies 90 may be able to pick up and amplify the signal independently, thereby processing sounds from different azimuths. In this way, the hearing impaired may adapt to the sounds from different azimuths, and the auditory effect may be improved for them.

This embodiment may be applied to a hearing aid headphone with bone conduction technology. The loudspeaker assembly 70 may need to have a good sound transmission effect. The loudspeaker assembly 70 may mainly use a mechanical vibration to transmit an audio signal. Under normal circumstances, a large air vibration in the loudspeaker assembly 70 may affect the sound transmission effect of a bone conduction loudspeaker 72 through mechanical vibration and reduce a sound quality, and further affect the hearing effect of the hearing impaired. The loudspeaker assembly 70 in this embodiment may refer to the following description of the embodiment of the loudspeaker assembly 70 of the present disclosure. In some embodiments, the following loudspeaker assembly 70 of the present disclosure may further be applied to other types of bone conduction headphones, which are not limited to the apparatus 10 described in the above embodiment.

Figure 37:
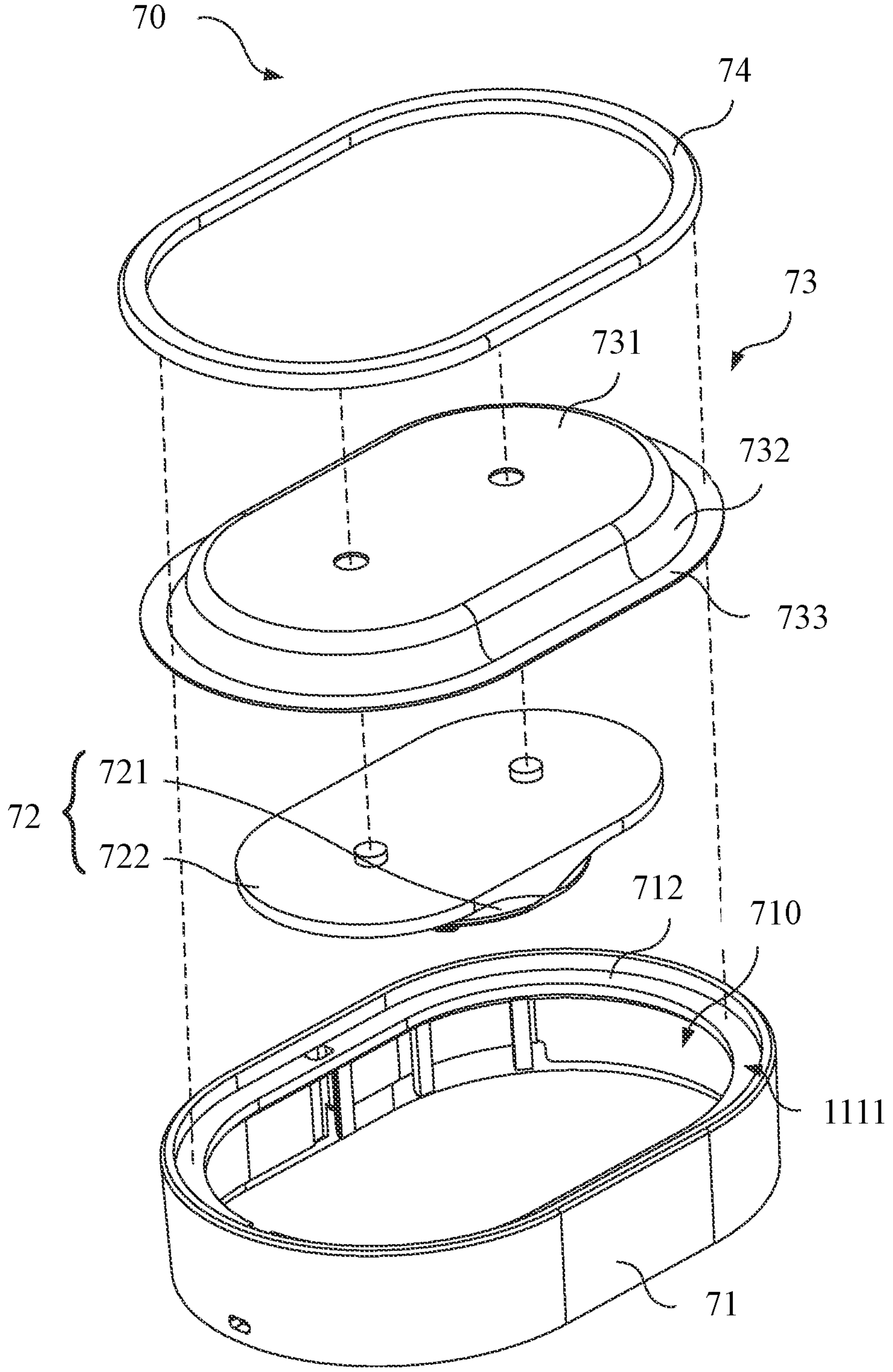
FIG. 37 is a schematic diagram illustrating a disassembled structure of a loudspeaker assembly according to some embodiments of the present disclosure.
Figure 38:
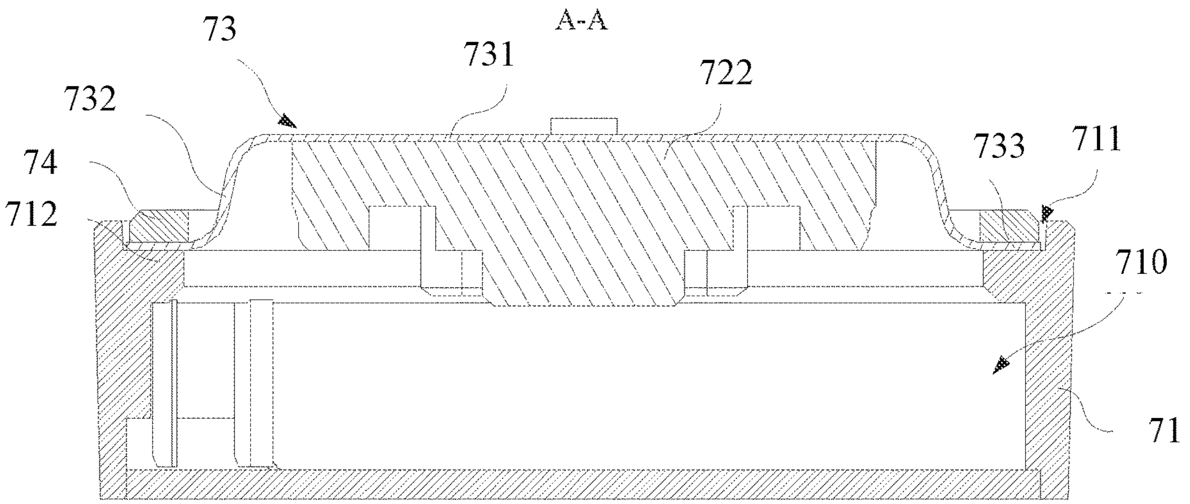
FIG. 38 is a schematic diagram illustrating a cross-sectional structure of a loudspeaker assembly according to some embodiments of the present disclosure.
Figure 39:
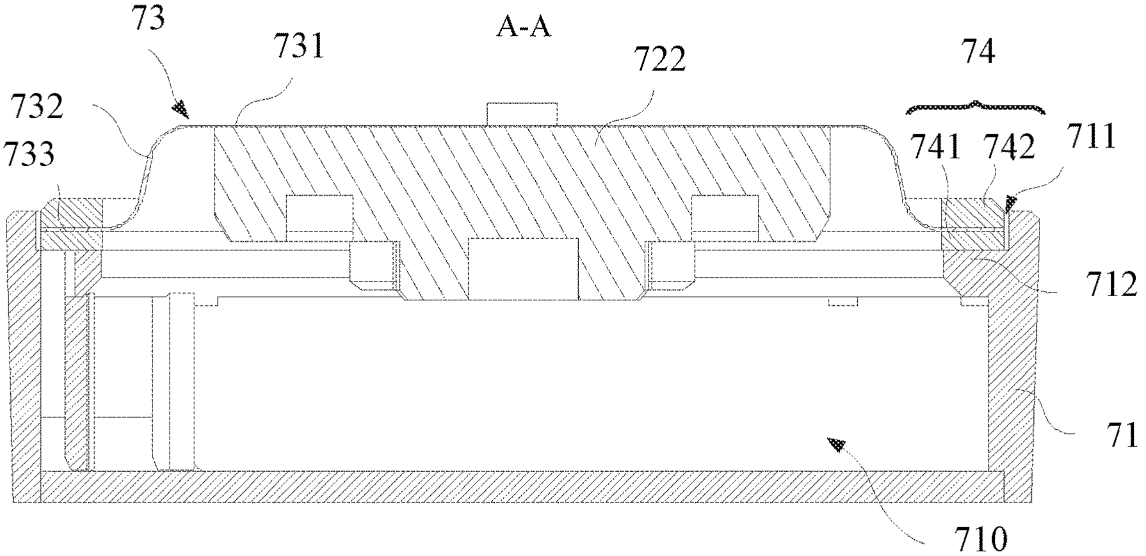
FIG. 39 is a schematic diagram illustrating a cross-sectional structure of a loudspeaker assembly according to some embodiments of the present disclosure.
Figure 40:
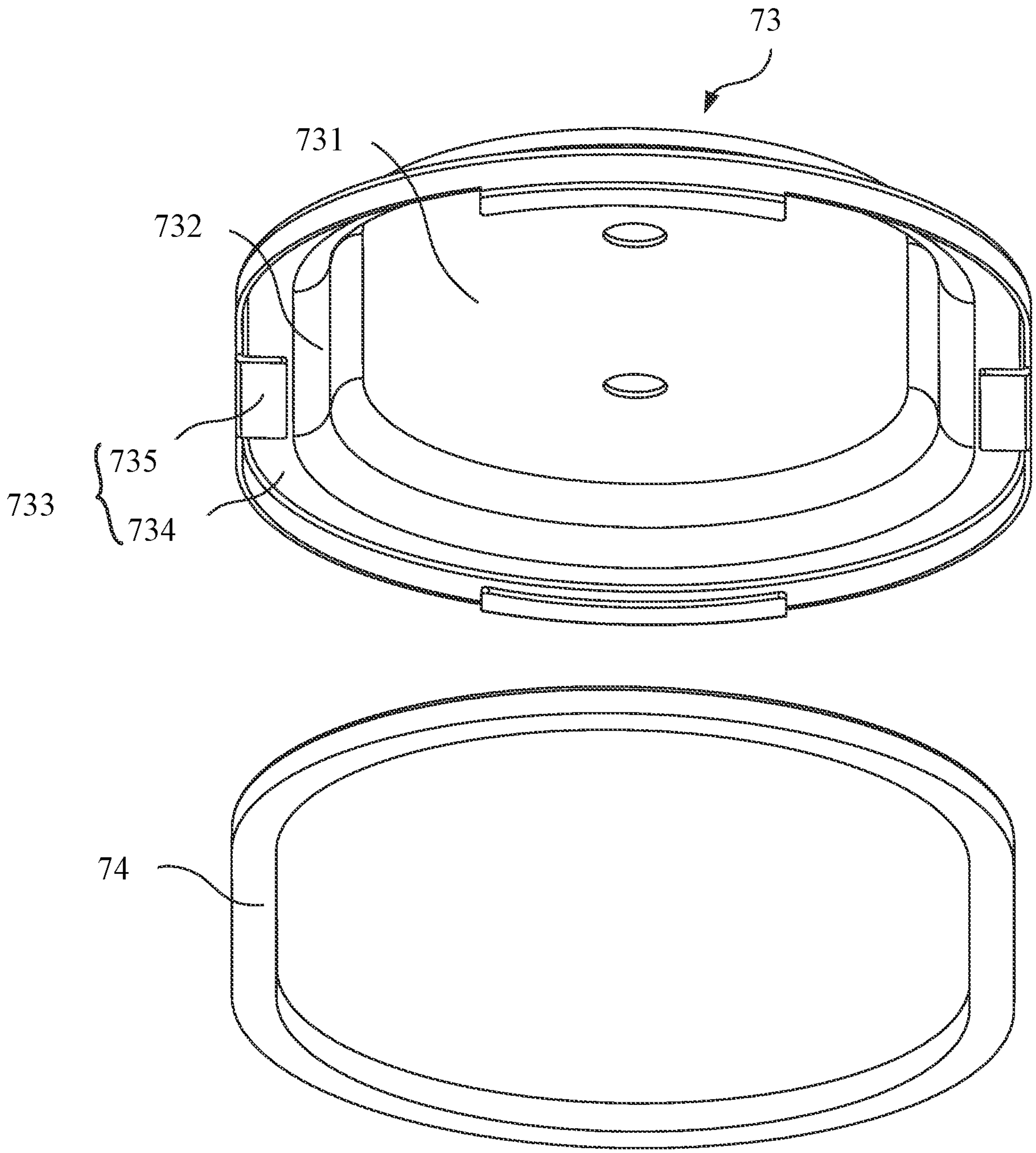
FIG. 40 is a schematic diagram illustrating a disassembled structure of a protective gauze and an annular top cover according to some embodiments of the present disclosure.
Figure 41:
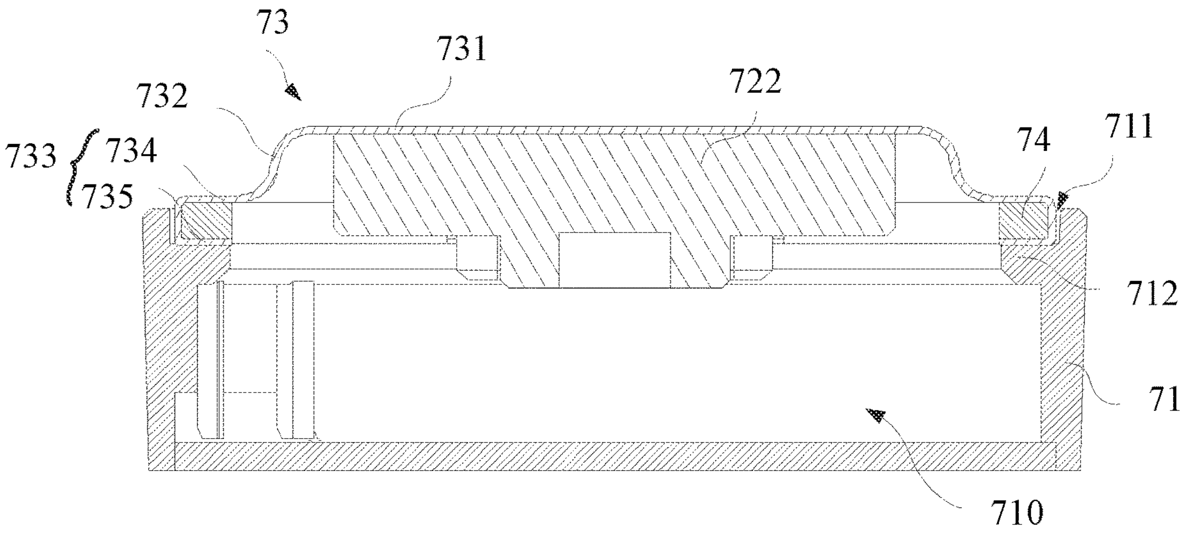
FIG. 41 is a schematic diagram illustrating a cross-sectional structure of a loudspeaker assembly according to some embodiments of the present disclosure.

FIG. 37 is a schematic diagram illustrating a disassembled structure of a speaker assembly according to some embodiments of the present disclosure. FIG. 38 is a schematic diagram illustrating a cross-sectional structure of a speaker assembly according to some embodiments of the present disclosure. FIG. 39 is a schematic diagram illustrating a cross-sectional structure of a speaker assembly according to some embodiments of the present disclosure. FIG. 40 is a schematic diagram illustrating a disassembled structure of a protective gauze and an annular top cover according to some embodiments of the present disclosure. FIG. 41 is a schematic diagram illustrating a cross-sectional structure of a speaker assembly according to some embodiments of the present disclosure.

As shown in FIG. 37 to FIG. 41, in some embodiments, the loudspeaker assemblies 70 may include a loudspeaker housing 71, a bone conduction loudspeaker 72, and a protective gauze 73. The bone conduction loudspeaker 72 may be placed in the loudspeaker housing 71. The protective gauze 73 may be supported on the loudspeaker housing 71, and used to protect the bone conduction loudspeaker 72.

As shown in FIG. 37, the loudspeaker housing 71 may form an accommodation bin 710 with an opening 711. A side of the loudspeaker housing 71 where the opening 711 locates may be close to the head of a user. The accommodation bin 710 may be used to accommodate the bone conduction loudspeaker 72. The mechanical vibration generated by the bone conduction loudspeaker 72 may be transmitted to the user's head through the opening 711.

In some embodiments, the inner wall of the loudspeaker housing 71 may be configured with an annular bearing platform 712. The inner wall of the loudspeaker housing 71 may refer to the inner wall of the accommodation bin 710 enclosed by the loudspeaker housing 71. The annular bearing platform 712 may be arranged adjacent to the opening 711. The annular bearing platform 712 may be used to support the protective gauze 73. In some embodiments, when the protective gauze 73 is supported on the annular bearing platform 712, the protective gauze 73 may cover or roughly cover the opening 711, thereby protecting the bone conduction loudspeaker 72.

As shown in FIG. 37, in some embodiments, the bone conduction loudspeaker 72 may include a vibration assembly 721 and a vibration transmission plate 722. Specifically, the vibration assembly 721 may be placed in the accommodation bin 710. The vibration transmission plate 722 may be connected with the vibration assembly 721, and the opening 711 may be exposed. In other words, the vibration transmission plate 722 may be exposed outside the accommodation bin 710 through the opening 711, and the bone conduction loudspeaker 72 as a whole may form the effect of protruding from the inside of the loudspeaker housing to the outside. The vibration transmission plate 722 may protrude at the opening 711 and be exposed. When the vibration assembly 721 receives an audio signal, the vibration assembly 721 may convert the audio signal into a mechanical vibration. The vibration transmission plate 722 connected with the vibration assembly 721 may transmit a vibration of the bone conduction loudspeaker 72 through the user's head to the user's auditory nerve.

As shown in FIG. 37, in some embodiments, the protective gauze 73 may be arranged at the opening end of the loudspeaker housing 71, and may fit a vibration surface of the vibration transmission plate 722. For example, the protective gauze 73 may include a fitting portion 731, a cylindrical holding portion 732, and an annular supporting portion 733. The vibration transmission plate 722 may be arranged in the cylindrical holding portion 732. The fitting portion 731 may be used to block one end of the cylindrical holding portion 732 and fit an outer end surface of the vibration transmission plate 722. In some embodiments, one end of the cylindrical holding portion 732 may be the end of the cylindrical holding portion 732 away from the accommodation bin 710, and the other end of the cylindrical holding portion 732 may be the end of the cylindrical holding portion 732 close to the accommodation bin 710. The outer end surface of the vibration transmission plate 722 may refer to the end surface deviate from the accommodation bin 710, or the end surface away from the vibration assembly 721. During a specific assembly process, the protection gauze 73 may cover the opening 711, and the vibration transmission plate 722 exposed at the opening 711 may be extended into the cylindrical holding portion 732, and then the outer end surface of the vibration transmission plate 722 may be fitted with the fitting portion 731. The annular supporting portion 733 may be connected with the other end of the cylindrical holding portion 732, and extend toward the outer side of the cylindrical holding portion 732. The annular supporting portion 733 may be used to support at the opening end of the loudspeaker housing 71. Specifically, the annular supporting portion 733 may be supported on the annular bearing platform 712.

By applying a bone conduction technology to a hearing aid, the problem of limitations on improving the auditory effect of the hearing impaired with a traditional hearing aid applying a traditional sound transmission mode may be solved. By exposing the vibration transmission plate 722 connecting the vibration assembly 721 at the opening 711, and by using the protective gauze 73 to fit to the vibration transmission plate 722, the vibration transmission plate 722 may be closer to the user's head. The vibration of the exposed vibration transmission plate 722 may be transmitted to the user's bone rapidly and forcefully. The mechanical vibration of this embodiment may be complete, and unlikely to lose a frequency band. It may effectively improve the auditory effect of the hearing impaired. Further, due to a mesh structure, the protective gauze 73 may allow air inside and outside of the accommodation bin 710 to communicate during the vibration, so as to balance the air pressures inside and outside the accommodation bin 710 and reduce the sound generated by the air vibration in the accommodation bin 710 and attenuates the sound generated from the air vibration other than the mechanical vibrations of the vibration transmission plate 722. In this way, a phenomenon of sound leakage may be reduced. Compared with the closing structure of the accommodation bin 710, the protective gauze 73 may reduce the influence on the vibration of vibration transmission plate 722 brought by the vibration of the air within the accommodation bin 710, and effectively improve the sound quality and sound effect of the apparatus 10.

As shown in FIG. 37, to further enable the annular supporting portion 733 to stably support on the annular bearing platform 712. In some embodiments, the loudspeaker assembly 70 may include an annular top cover 74, the annular top cover 74 may be used to press the annular supporting portion 733 on the annular bearing platform 712, which may reduce the situation where annular supporting portion 733 is easily pulled out, so that the protective gauze 73 may be stably supported on the annular bearing platform 712.

For a position relationship and a supporting structure between the annular top cover 74, the annular supporting portion 733, and the annular bearing platform 712, there may be a variety of embodiments as follows.

In some embodiments, as shown in FIG. 38, the annular supporting portion 733 may be clamped between the annular top cover 74 and the annular bearing platform 712, wherein an outer surface of the annular supporting portion 733 may be close to the annular top cover 74, an inner surface of the annular supporting portion 733 may be close to the annular bearing platform 712. In this embodiment, an inner surface of the protective gauze 73 may refer to the surface that is fitted with the outer end surface of the vibration transmission plate 722. The inner surface of the annular supporting portion 733 may refer to the part of the inner surface of the protective gauze 73 in the annular supporting portion 733. Correspondingly, an outer surface of the protective gauze 73 may be arranged opposite to the inner surface of the protective gauze 73. The outer surface of the annular supporting portion 733 may refer to the part of the outer surface of the protective gauze 73 in the annular supporting portion 733. Specifically, the annular top cover 74 may directly press on the outer surface of the annular supporting portion 733, and then press the inner surface of the annular supporting portion 733 on the annular bearing platform 712. That is, the annular supporting portion 733 may extend outward from the inside of the gap between the annular top cover 74 and the annular bearing platform 712.

In some embodiments, a bonding layer may be arranged between the inner surface of the annular supporting portion 733 and the annular bearing platform 712, and may bond the annular supporting portion 733 and the annular bearing platform 712. Another bonding layer may be arranged between the outer end surface of the vibration transmission plate 722 and the fitting portion 731, and may bond the vibration transmission plate 722 and the fitting portion 731. In the actual assembly process, the protective gauze 73 may be bond to the vibration transmission plate 722 and the loudspeaker housing 71 at the same time through adhesives, thereby forming the above bonding layer, and then cover the annular top cover 74 on the annular supporting portion 733. In some embodiments, the bonding layer may further be arranged between the outer surface the annular supporting portion 733 and the annular top cover 74, thereby making the annular supporting portion 733 and the annular top cover 74 bonded with each other.

Through bonding the protective gauze 73 as described in above embodiment, the structure may be simple, the assembly process may be convenient, and the support of the protective gauze 73 may further be relatively stable.

In some embodiments, as shown in FIG. 41, the inner surface of the annular supporting portion 733 may wrap the annular top cover 74, and the annular supporting portion 733 may further curve and extend to between the annular top cover 74 and the annular bearing platform 712, wherein the outer surface of the annular supporting portion 733 may be close to the annular bearing platform 712. Specifically, the inner surface of the annular supporting portion 733 may wrap the annular top cover 74, and then extend from the outside of the gap between the annular top cover 74 and the annular supporting part 733 to the inside.

In some embodiments, the annular supporting portion 733 may include an annular subsection 7331 and a curved subsection 7332. The annular subsection 7331 may connect the cylindrical holding portion 732, and extend toward the outer side of the cylindrical holding portion 732. The curved subsection 7332 may connect the annular subsection 7331 at an edge of the annular subsection 7331 extended toward the outer side of the cylindrical holding portion 732. That is, the curved subsection 7332 and the edge of the annular subsection 7331 extended toward the outer side of the cylindrical holding portion 732 may be connected with each other, and may further extend toward the direction away from the annular subsection 7331. In some embodiments, the count of the curved subsections 7332 may be more than one, and may respectively extend from the edge of the annular subsection 7331 to the outside. The curved subsections 7332 may be spaced part at the annular subsection 7331 of the ring section. Alternatively, the curved subsection 7332 may further be a continuous circle which extends outward from the edge of the annular subsection 7331.

In some embodiments, the annular subsection 7331 may wrap the annular top cover 74, and the curved subsection 7332 may extend from the annular subsection 7331 to between the annular top cover 74 and the annular bearing platform 712. The inner surface of the annular supporting portion 733 may be close to the annular top cover 74. Specifically, the inner surface of the annular subsection 7331 and the inner surface of the curved subsection 7332 may be close to the annular top cover 74. The outer surface of the annular supporting portion 733 may be close to the annular bearing platform 712. Specifically, the outer surface of the curved subsection 7332 may be close to the annular bearing platform 712.

In some embodiments, the bonding layer may be arranged between the outer surface of the annular supporting portion 733 and the annular bearing platform 712, thereby bonding the annular supporting portion 733 and the annular bearing platform 712. The bonding layer may further be arranged between the outer end surface of the vibration transmission plate 722 and the fitting portion 731, thereby bonding the vibration transmission plate 722 and the fitting portion 731. In the actual assembly process, the protective gauze 73 may first wrap the annular top cover 74, and then may be bond with the vibration transmission plate 722 and the loudspeaker housing 71 at the same time through adhesives, thereby forming the bonding layer. In some embodiments, the bonding layer may be arranged between the inner surface of the annular supporting portion 733 and the annular top cover 74, thereby bonding the annular supporting portion 733 and the annular top cover 74.

Through the above embodiments, the protective gauze 73 may be fixed. Compared with other embodiments, by wrapping the inner surface of the annular supporting portion 733, the gap formed between the protective gauze 73 and the inner side surface of the annular top cover 74 (the side facing the accommodation bin 710) may be avoided, thereby avoiding an accumulation of dust on the gap to cause a blockage of the protective gauze 73, and reducing the failure rate of the apparatus 10.

In some embodiments, as shown in FIG. 39 and FIG. 40, the annular top cover 74 may include a first cover 741 and a second cover 742 arranged in layers, wherein a first cover 741 may be closer to the annular bearing platform 712 than the second cover 742, and the second cover 742 may be supported on the annular bearing platform 712. The annular supporting part 733 may be clamped between the first cover 741 and the second cover 742. Specifically, the inner surface of the annular supporting part 733 may be close to the first cover 741, and the outer surface of the annular supporting part 733 may be close to the second cover 742.

Figure 42:
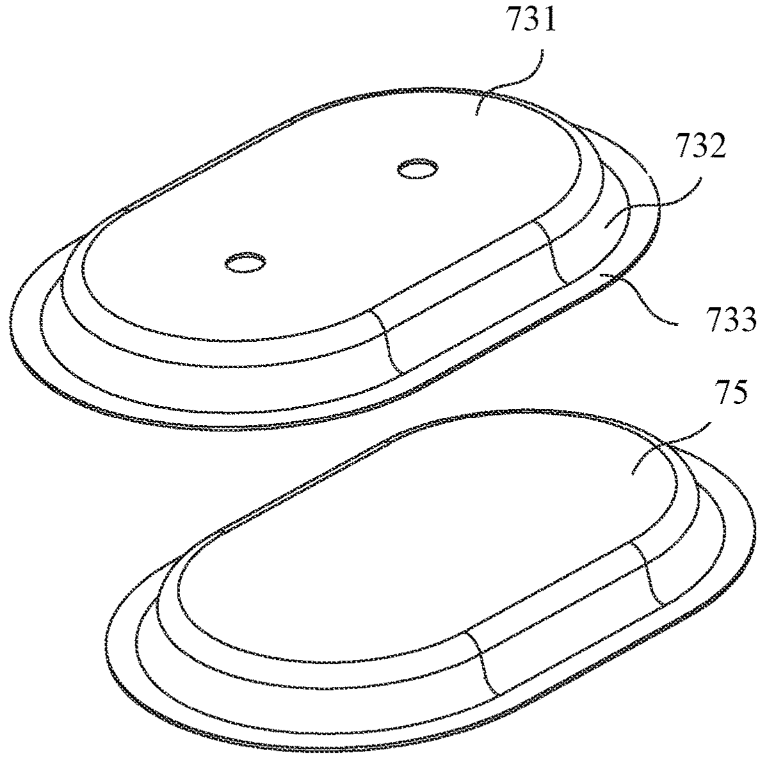
FIG. 42 is a schematic diagram illustrating a disassembled structure of a gauze assembly according to some embodiments of the present disclosure.
Figure 43:
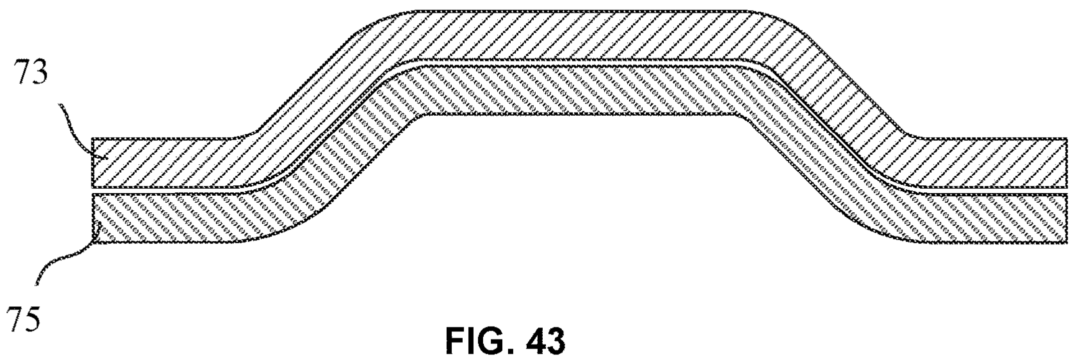
FIG. 43 is a schematic diagram illustrating a cross-sectional structure of a gauze assembly in a fit state according to some embodiments of the present disclosure.
Figure 44:
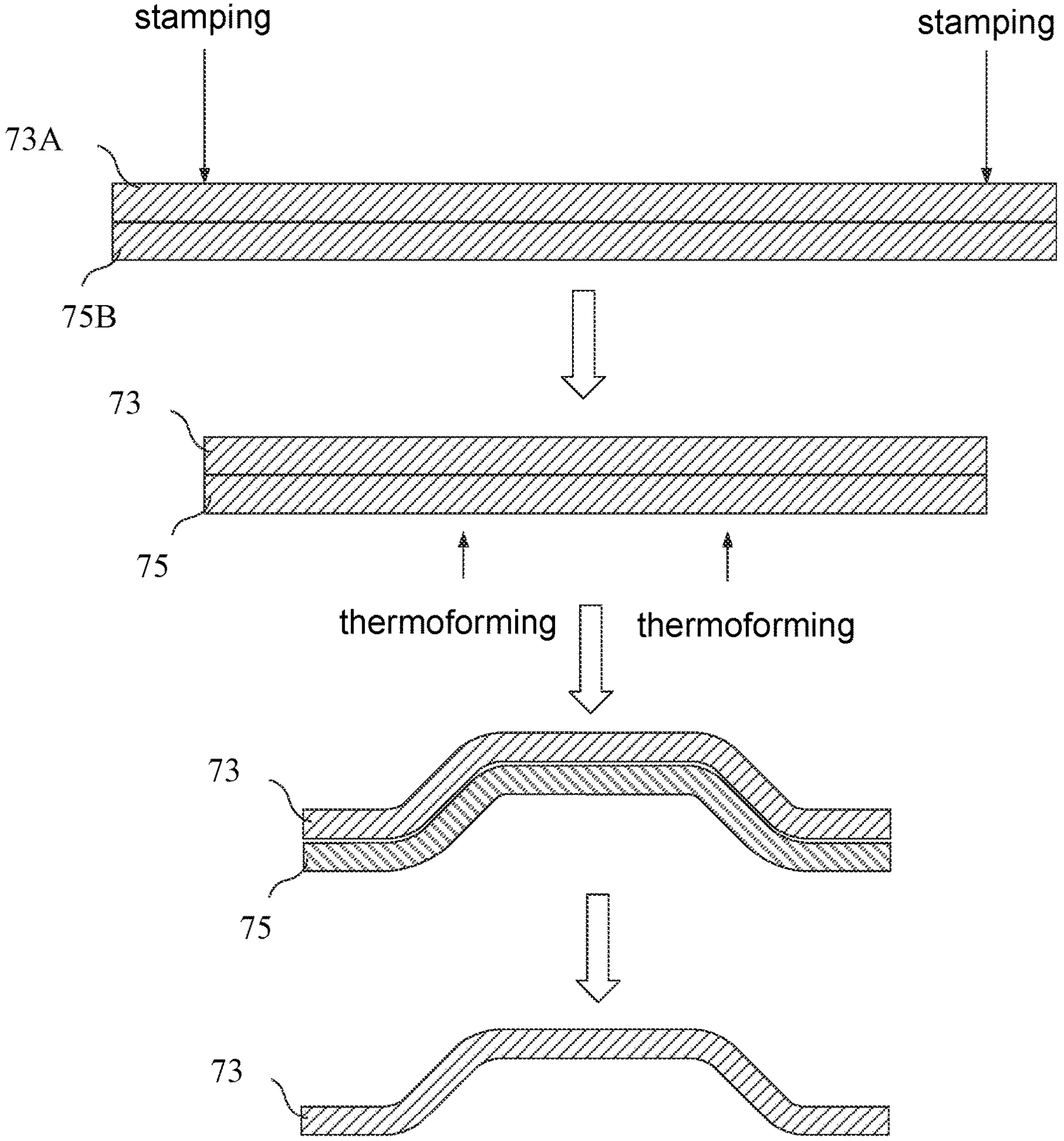
FIG. 44 is a schematic diagram illustrating a process for preparing a gauze assembly according to some embodiments of the present disclosure.
Figure 45:
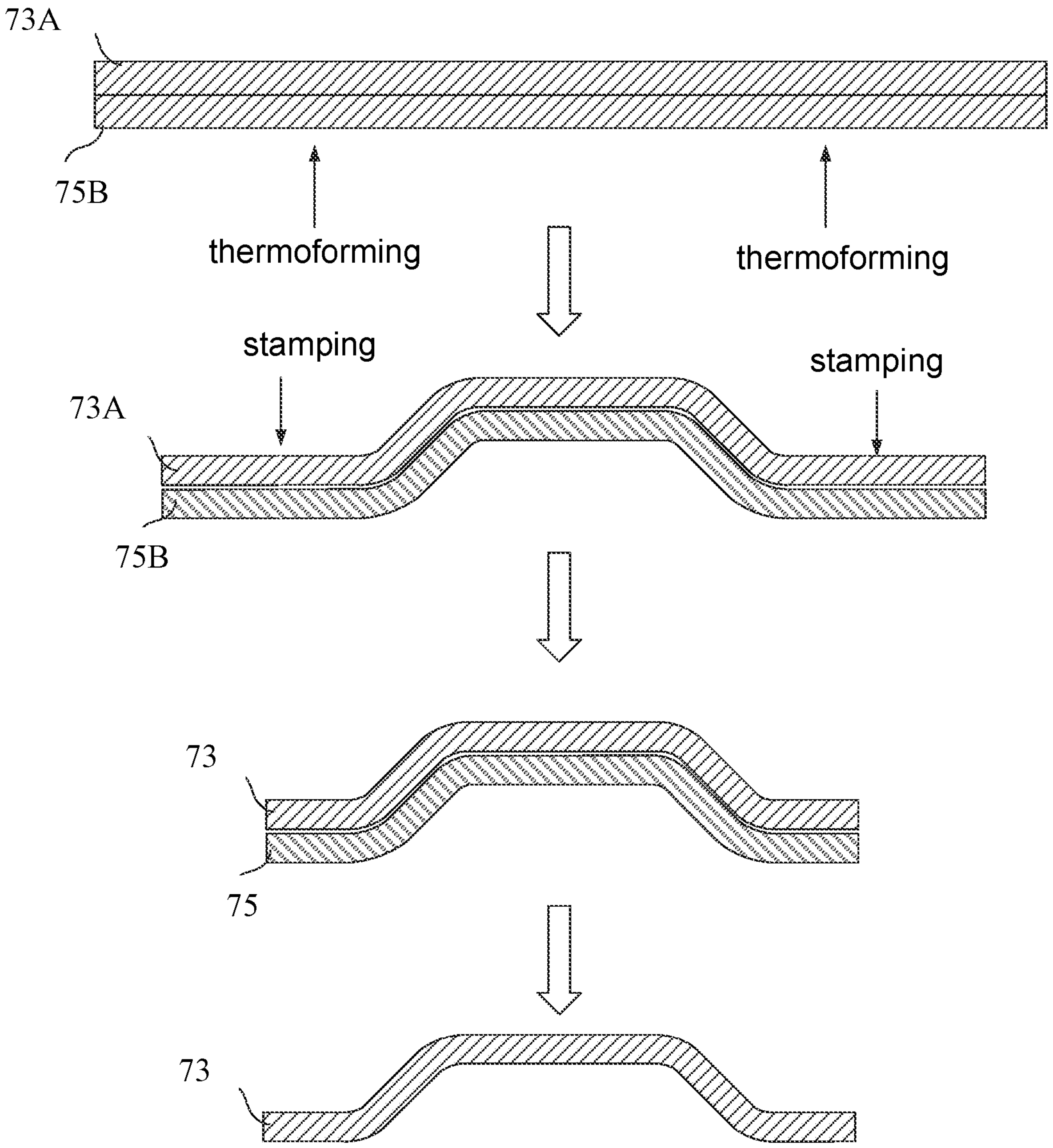
FIG. 45 is a schematic diagram illustrating a process for preparing a gauze assembly according to some embodiments of the present disclosure.

FIG. 42 is a schematic diagram illustrating a disassembled structure of a gauze assembly according to some embodiments of the present disclosure. FIG. 43 is a schematic diagram illustrating a cross-sectional structure of a gauze assembly in a fit state according to some embodiments of the present disclosure. FIG. 44 is a schematic diagram illustrating a process for preparing a gauze assembly according to some embodiments of the present disclosure. FIG. 45 is a schematic diagram illustrating a process for preparing a gauze assembly according to some embodiments of the present disclosure.

In some embodiments, a protective gauze 73 and an annular top cover 74 may form a whole using a lagging technology. The material of the annular top cover 74 may be ebonite, such as plastic, whose stiffness is greater than the protective gauze 73. For example, the protective gauze 73 may be first formed, then the protective gauze 73 may be put into a corresponding mold of the annular top cover 74, and then the annular top cover 74 may be formed, thereby making a first cover 741 and a second cover 742 clamp an annular supporting part 733. In some embodiments, a connection manner between the protective gauze 73 and the annular top cover 74 may be that the bonding layer may be arranged between the inner surface of the annular supporting portion 733 and the first cover 741 (applying adhesives, and forming a bonding layer after the adhesives concentrate), then the annular supporting portion 733 and the first cover 741 may be fixed. The bonding layer may be arranged between an outer surface of the annular supporting portion 733 and the second cover 742, thereby bonding the annular supporting portion 733 and the second cover 742.

In some embodiments, after the protective gauze 73 and the annular top cover 74 form a whole, the bonding layer may be arranged between the first cover 741 and an annular bearing platform 712, thereby bonding the two. The bonding layer may further be arranged between the outer surface of a vibration transmission plate 722 and the fitting portion 731, thereby binding the two.

The above various embodiments may be similar, that is, the inner surface of the annular supporting portion 733 may be wrapped with the second cover 742, and the annular supporting portion 733 further may curve and extend between the first cover 741 and the second cover 742.

By setting the annular top cover 74 to include the first cover 741 and the second cover 742, the first cover 741 and the second cover 742 may be made to form a whole in advance with the protective gauze 73, which is convenient for the later assembly with a loudspeaker housing 71, the clamping of the first cover 741 and the second cover 742 may make the fixation of the protective gauze 73 stable.

In some embodiments, if an opening 711 is blocked, for example, using silica gel to wrap the entire loudspeaker housing 71, the air in an accommodation bin 710 may further vibrate and make a sound. Specifically, it may cause a great fixed frequency resonance peak between 20-20000 Hz when the loudspeaker assembly 70 is working, which may lead to a severe leakage and may produce wind noise, thereby reducing the sound effect of a bone conduction loudspeaker 72.

By using the protective gauze 73 with a mesh structure instead of blocking the opening 711, this embodiment may enable air communication between the air inside and outside the accommodation bin 710, which may effectively reduce the resonance peak and effectively reduce the phenomenon of sound leakage. The protective gauze 73 of the present disclosure has a plurality of meshes, and the plurality of meshes may be distributed in some positions of the protective gauze 73, or may be located throughout the protective gauze 73, including the fitting portion 731, the cylindrical holding portion 732, and the annular supporting portion 733. However, as the mesh structure is dense and fine, the meshes are not shown in FIG. 37-FIG. 43.

Further, in some embodiments, a count of meshes of the protective gauze 73 may be 250-600, and a thickness of the protective gauze 73 may be 0.01 mm-0.3 mm, which may effectively reduce the sound leakage, and may ensure the strength of the protective gauze 73. In some embodiments, the count of meshes of the protective gauze 73 may be 300-500. In some embodiments, the count of meshes of the protective gauze 73 may be 380-480. In some embodiments, the count of meshes of the protective gauze 73 may be 400-430. In some embodiments, the thickness of the protective gauze 73 may be 0.05 mm-0.25 mm. In some embodiments, the thickness of the protective gauze 73 may be 0.1 mm-0.2 mm. In some embodiments, the thickness of the protective gauze 73 may be 0.125 mm-0.15 mm.

In some embodiments, the material of the protective gauze 73 may be at least one of PC (polycarbonate), PET (polyethylene terephthalate), and nylon.

The protective gauze 73 of some embodiments of the present disclosure may be made by a thermoforming, which may make the protective gauze 73 form a structure that includes the fitting portion 731, the cylindrical holding portion 732, and the annular supporting portion 733. Specifically, the following examples may be used to improve a yield and a structural stability of the protective gauze 73.

The embodiment of the mesh assembly in the present disclosure may be applied to the loudspeaker assembly embodiment of the present disclosure. As shown in FIG. 42, this embodiment may include the protective gauze 73 and an auxiliary lining 75 fitted with each other.

As shown in FIG. 42 to FIG. 44, in some embodiments, the protective gauze 73 and the auxiliary lining 75 may be formed through thermoforming, so that the protective gauze 73 after thermoforming may include the fitting portion 731, the cylindrical holding portion 732, and the annular supporting portion 733. The fitting portion 731 may be used to block one end of the cylindrical holding portion 732, and annular supporting portion 733 may connect the other end of the cylindrical holding portion 732, and may extend towards the outer side of the cylindrical holding portion 732. The hardness of the auxiliary lining 75 may be greater than that of the protective gauze 73, and may be conformal with the protective gauze 73, thereby supporting the shape of the protective gauze 73 after thermoforming. The material of the auxiliary lining 75 may be plastic.

As the hardness of the auxiliary lining 75 is greater than the hardness of the protective gauze 73, when the protective gauze 73 and the auxiliary lining 75 are thermoformed together, the auxiliary lining 75 and the protective gauze 73 may deform to a corresponding shape together. At this time, the two may be conformal. The auxiliary lining 75 may support the protective gauze 73 to keep the corresponding shape. During assembly, the protective gauze 73 may be assembled to the speaker housing 71.

The protective gauze 73 may be formed using the above solution of the embodiment to form, there may be two specific preparation methods as follows:

As shown in FIG. 44, the first preparation method includes the following operations:

In 410, preparing an original gauze 73A and an original lining 75B and fit the two of them;

in 420, stamping the original gauze 73A and the original lining 75B that fitted with each other to obtain a protective gauze 73 and an auxiliary lining 75 with preset sizes;

in 430, fitting the protective gauze 73 with the auxiliary lining 75, performing thermoforming on them, the auxiliary lining 75 and the protective gauze 73 may be conformal, so that the auxiliary lining 75 may support the protective gauze 73 to maintain its shape after thermoforming. The protective gauze 73 after thermoforming includes the fitting portion 731, the cylindrical holding portion 732, and the annular supporting portion 733. The fitting portion 731 may be used to block one end of the cylindrical holding portion 732, the annular supporting portion 733 may be connected with the other end of the cylindrical holding portion 732, and may extend toward the outer side of the cylindrical holding portion 732;

in 440, removing the auxiliary lining 75, and obtaining the protective gauze 73.

As shown in FIG. 45, the second preparation method includes the following operations:

In 510, preparing the original gauze 73A and the original lining 75B;

in 520, thermoforming the original gauze 73A and the original lining 75B that fits with each other, so that they may be conformal with each other, and the original lining 75B may support the original gauze 73A to maintain its shape after thermoforming;

in 530, stamping the original gauze 73A and the original lining 75B after thermoforming, and obtaining the conformal protection gauze 73 and auxiliary lining 75. The protective gauze 73 includes the fitting portion 731, the cylindrical holding portion 732, and the annular supporting portion 733. The fitting portion 731 may be used to block one end of the cylindrical holding portion 732, the annular supporting portion 733 may be connected with the other end of the cylindrical holding portion 732, and may extend toward the outer side of the cylindrical holding portion 732;

in 540, removing the auxiliary lining 75, and obtaining the protective gauze 73.

In this embodiment, the thermoforming may be performed by using the auxiliary lining 75 to assist the protective gauze 73. As the hardness of the auxiliary lining 75 is greater than the hardness of the protective gauze 73, after the thermoforming, the auxiliary lining 75 may support the protective gauze 73 to maintain the shape after thermoforming, and then obtain the protective gauze 73 with a stable shape and structure, thereby improving the yield and a structural stability of the protective gauze, and facilitate the subsequent assembly to the corresponding loudspeaker housing 71. Further, as the protective gauze 73 may effectively maintain the shape after thermoforming, which may be compatible with the structure and shape of the bone conduction loudspeaker 72, and may effectively fit to the outer surface of the vibration transmission plate 722. The stable mesh structure of the protective gauze 73 may enable the air inside and outside the accommodation bin 710 to communicate, thereby reducing the sound caused by vibration of air inside the accommodation bin 710, attenuating the sound generated from the air vibration other than the mechanical vibrations of the vibration transmission plate 722. In this way, a phenomenon of sound leakage may be reduced. Compared with an enclosed accommodation bin 710, the protective gauze 73 may reduce the sound leakage of the loudspeaker assembly 70. That is, the gauze assembly of this embodiment may improve the structural stability of the protective gauze 73 and help improve the hearing aid effect of the apparatus 10.

Figure 46:
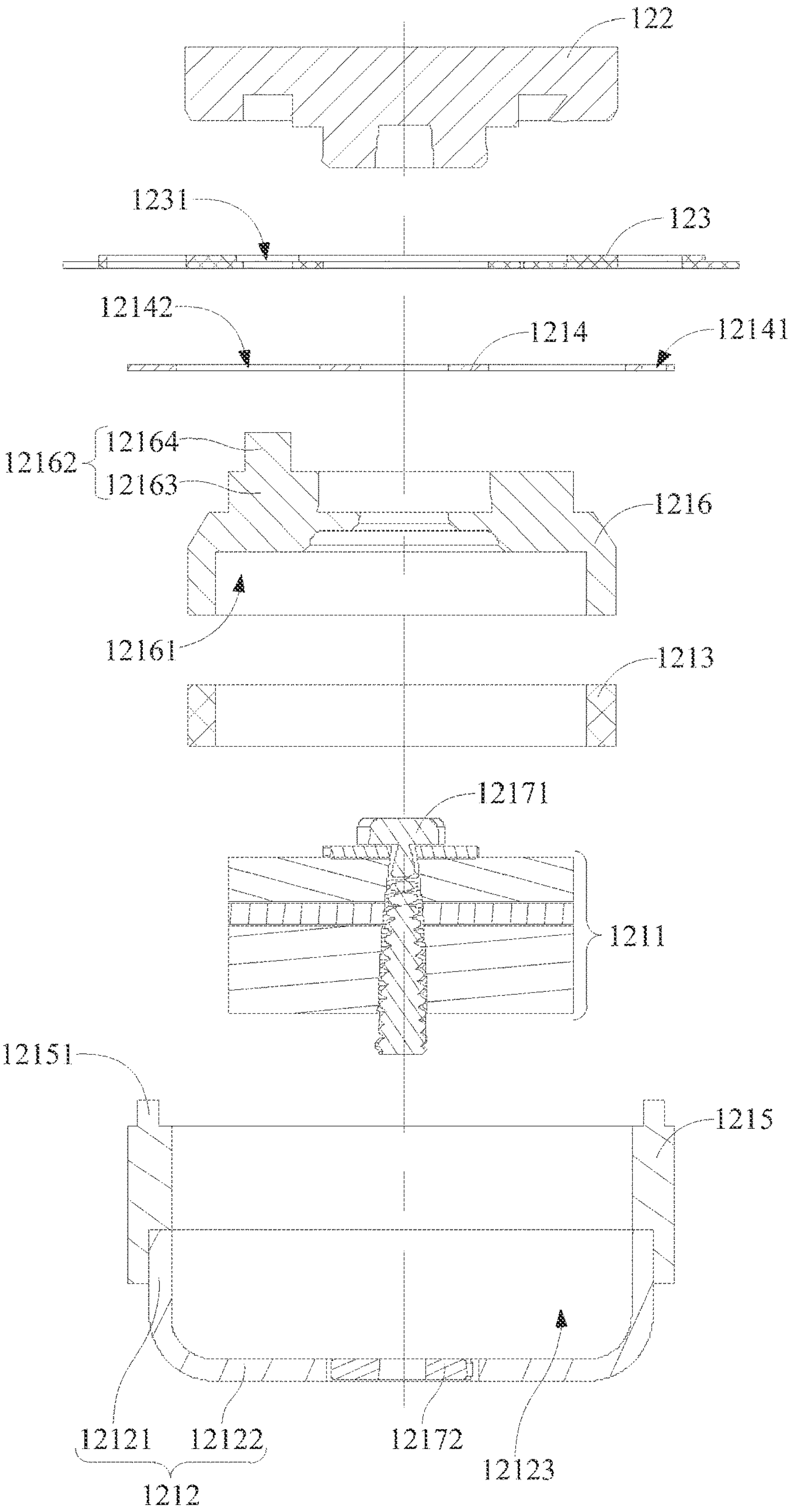
FIG. 46 is a schematic diagram illustrating a disassembled structure of a vibration assembly according to some embodiments of the present disclosure.
Figure 47:
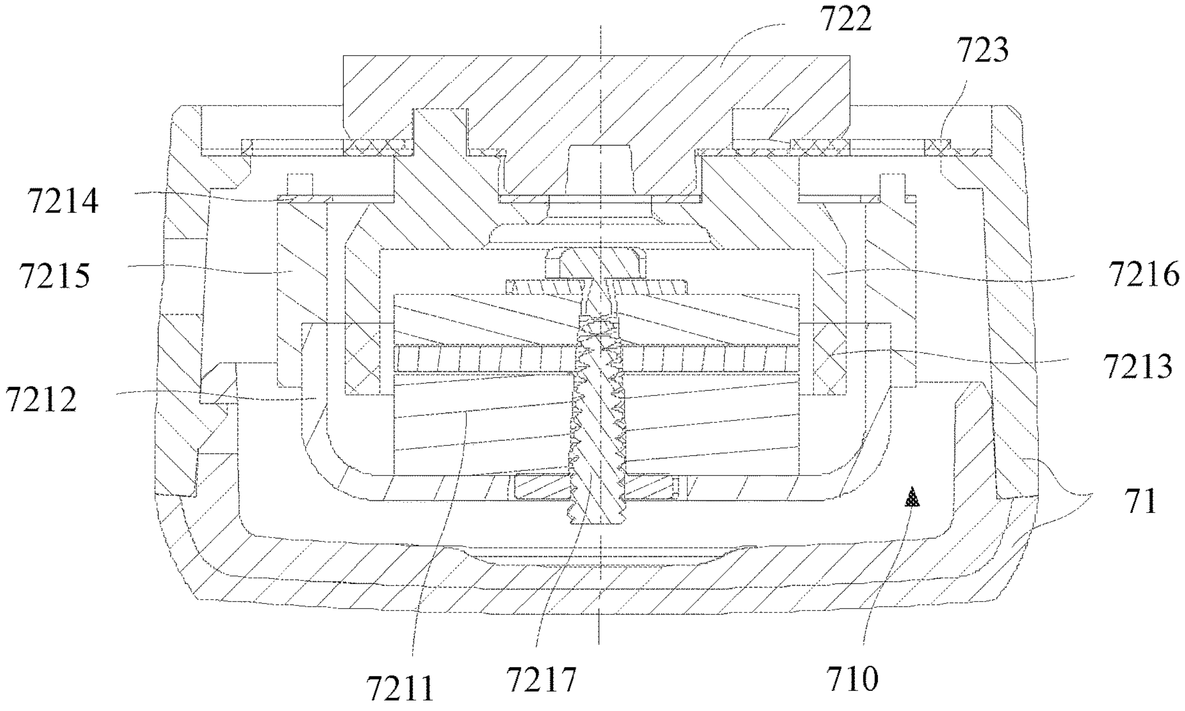
FIG. 47 is a schematic diagram illustrating a cross-sectional structure of a vibration assembly after the vibration assembly is assembled according to some embodiments of the present disclosure.

FIG. 46 is a schematic diagram illustrating a disassembled structure of a vibration assembly according to some embodiments of the present disclosure. FIG. 47 is a schematic diagram illustrating a cross-sectional structure of a vibration assembly after the vibration assembly is assembled according to some embodiments of the present disclosure.

As shown in FIG. 46 and FIG. 47, in some embodiments, a vibration assembly 721 may include a magnet group 7211, a magnetic conducting cover 7212, a coil 7213, a vibration sheet 7214, an outer bracket 7215, and an inner bracket 7216. The magnet group 7211 may have a magnetic direction to form a relatively stable magnetic field. The magnet group 7211 may be a single magnet, or the combination of a plurality of magnets (such as the magnet group 7211 shown in FIG. 46 with three layers of magnets). The magnetic conducting cover 7212 may be mainly used to adjust the magnetic field generated by the magnet group 7211, so as to increase the utilization rate of the above magnetic field. The coil 7213 may be located in the magnetic field formed by the magnetic group 7211 and the magnetic conducting cover 7212, etc., and generates an ampere force under the incentive action of an electrical signal (such as an audio signal), which in turn drives a mechanical vibration of the vibration sheet 7214. The outer bracket 7215 and the inner bracket 7216 may cooperate with each other to support the above structural parts.

In some embodiments, the magnetic conducting cover 7212 may include a side portion of a cover body 72121 and a bottom portion of the cover body 72122, the bottom portion of the cover body 72122 may be connected with one end of the side portion of the cover body 72121 to form a cylindrical groove 72123. The magnet group 7211 may be arranged in the cylindrical groove 72123, and may be fixedly connected with the magnetic conducting cover 7212 through one or any combinations of connection methods of bonding, clamping, threading etc. For example, the vibration assembly 721 may further include a fixing portion 7217. The fixing portion 7217 may be used to fix the magnet group 7211 at the bottom portion of the cover body 72122. In some embodiments, the fixing portion 7217 may include a bolt 72171 and a nut 72172. The nut 72172 may be embedded in the bottom portion of the cover body 72122, and may be relatively fixed with the magnetic conducting cover 7212 in a radial direction of the cylindrical groove 72123. The bolt 72171 may pass through the magnet group 7211 in turn and through the bottom portion of the cover body 72122. The bolt 72171 and the nut 72172 may cooperate to make the magnet group 7211 and the magnetic conducting cover 7212 relatively fixed with each other. In this way, as the nut 72172 is embedded in the bottom portion of the cover body 72122, the size of the vibration assembly 721 in the axial direction of the cylindrical groove 72123 may be compressed, which is conducive to controlling the overall size of the bone conduction loudspeaker 72. In some embodiments, with the permission of the above overall size, the nut 72172 may further be arranged on the side of the bottom portion of the cover body 72122 deviate from the cylindrical groove 72123, which may further achieve the relative fixing between the magnet group 7211 and the magnetic conducting cover 7212.

In some embodiments, when the fixing portion 7217 fixedly connects the magnet group 7211 and the magnetic conducting cover 7212, adhesives may be further arranged between the magnet group 7211 and the magnetic conducting cover 7212 (not shown in FIG. 46 and FIG. 47), so that a gap between the two may be filled, thereby avoiding the noise generated by a relative movement of the magnet group 7211 and the magnetic conducting cover 7212 under the mechanical vibration.

In some embodiments, when the magnet group 7211 and the magnetic conducting cover 7212 are relatively fixed, a gap may be formed between the two in the radial direction of the cylindrical groove 72123 (not shown in FIG. 47). The gap may be mainly used to accommodate the coil 7213 after the assembly is assembled. Therefore, in the radial direction of the cylindrical groove 72123, the size of the gap between the magnet group 7211 and the magnetic conducting cover 7212 may be as uniform as possible to increase the uniformity of the distribution of the above magnetic field, thereby increasing the stability of the ampere force generated by the coil 7213 under the action of the magnetic field.

In some embodiments, the coil 7213 may be fixed with the inner bracket 7216, and may be sleeved in the peripheral of the magnet group 7211. After the assembly of the vibration assembly 721 is completed, the coil 7213 may be extended into the gap formed by the magnetic group 7211 and the magnetic conducting cover 7212 in the radial direction of the cylindrical groove 72123, so that the coil 7213 may be located in the magnetic field formed by the magnet group 7211 and the magnetic conducting cover 7212, and then produce the ampere force under the incentive action of the electrical signal. It should be noted that, to increase the stability of the ampere force generated by the coil 7213 under the action of the magnetic field, in the radial direction of the cylindrical groove 72123, the distances between the coil 7213 and the magnet group 7211 or the magnetic conducting cover 7212 may be as equal as possible. That is, in the process of pre-processing and post-assembly of the vibration assembly 721, the co-axiality of the magnetic group 7211, the magnetic conducting cover 7212, and the coil 7213 etc. should be ensured as much as possible.

In some embodiments, one end of the inner bracket 7216 (specifically, the end towards the magnet group 7211) may form a cover groove 72161. The coil 7213 may be fixed at one end of the inner bracket 7216 and may surround the cover groove 72161, one end of the inner bracket 7216 may be covered on the magnet group 7211, so that the magnet group 7211 may be partly extended into the cover groove 72161, and the coil 7213 may be sleeved in the outer peripheral of the magnet group 7211. In this way, while an acoustic output requirement of the vibration assembly 721 is satisfied, the size of the vibration assembly 721 in the axial direction of the cylindrical groove 72123 may be compressed, which is conducive to controlling the overall size of the bone conduction loudspeaker 72.

In some embodiments, the vibration sheet 7214 may be connected with the outer bracket 7215 and the inner bracket 7216, and may be used to limit the relative movement of the outer bracket 7215 and the inner bracket 7216 along the radial direction of the cylindrical groove 72123, so that the assembly of the vibration assembly 721 may be achieved.

In some embodiments, the outer bracket 7215 may be a cylinder, and one end of the outer bracket 7215 may be fixed at the other end of the side portion of the cover body 72121 deviates from the bottom portion of the cover body 72122. The other end of the outer bracket 7215 deviates from the magnetic conducting cover 7212 may be connected with the other end of the inner bracket 7216 deviates from the magnetic group 7211 through the vibration sheet 7214.

In relevant technologies, the outer bracket 7215 and the magnetic conducting cover 7212 may generally connected through one or any combinations of bonding, clamping, threading, etc. Such connection may easily lead to the assembly error between the outer bracket 7215 and the magnetic conducting cover 7212, and reduce the co-axiality between the coil 7213 and the magnetic group 7211 as well as the magnetic conducting cover 7212. Further, the stability of the ampere force generated by the coil 7213 under the action of the magnetic field may be reduced. That is, the stability of the mechanical vibration generated by the vibration sheet 7241 driven by the coil 7213 may be weaken, thereby affecting the sound quality of the vibration assembly 721.

Different from the relevant technologies: In the present disclosure, the outer bracket 7215 may be fixed at the other end of the side portion of the cover body 72121 deviates from the bottom portion of the cover body 72122 through an injection molding, which means the outer bracket 7215 and the magnetic conducting cover 7212 may be an integrated metal insert injection molding part. This configuration may effectively reduce the assembly error between the outer bracket 7215 and the magnetic conducting cover 7212, and ensure the co-axiality between the coil 7213, the magnetic group 7211, and the magnetic conducting cover 7212, and improve the sound quality of the vibration assembly 721.

In some embodiments, the other end of the outer bracket 7215 deviates from the magnetic conducting cover 7212 may be protruded and provided with a first protruding column 72151, and the other end of the inner bracket 7216 deviates from the magnetic group 7211 may be protruded and provided with a second protruding column 72162. Correspondingly, the vibration sheet 7214 may be opened with a first through-hole 72141 and a second through-hole 72142 at intervals. The first protruding column 72151 may be movably penetrated through the first through-hole 72141, and the second protruding column 72162 may be movably penetrated through the second through-hole 72142 to limit a relative movement of the outer bracket 7215 and the inner bracket 7216 along a the radial direction of the cylindrical groove 72123, and allow the inner bracket 1215 and the vibration sheet 7214 to move relative to the outer bracket 7215 in an axial direction of the cylindrical groove 72123, so that the mechanical vibration generated by the vibration assembly 721 may be transmitted out.

Combined with the description of FIG. 37 to FIG. 41, in some embodiments, the vibration transmission plate 722 may be connected with the vibration assembly 721, and may be exposed at the opening 711 to transmit the above mechanical vibration through the user's head to its auditory nerves so that the user may hear the sound. Exemplarily, the vibration transmission plate 722 may be arranged on the other end of the inner bracket 7216 deviates from the magnet group 7211, and hold against the vibration sheet 7214, so that the inner bracket 7216 and the vibration sheet 7214 may drive the vibration transmission plate 722 to vibrate. In some embodiments, the bone conduction loudspeaker 72 may further include an elastic damping sheet 723. An outer edge of the elastic damping sheet 723 may be fixedly connected to the loudspeaker housing 71. Combined with the description of the protective gauze 73 of FIG. 37 to FIG. 41, the outer edge of the elastic damping sheet 723 may be between the loudspeaker housing 71 and the protective gauze 73. That is, the outer edge of the elastic damping sheet 723 may be fixed on the loudspeaker housing 71, and the protective gauze 73 may be fixed on the elastic damping sheet 723. In some embodiments, the elastic damping sheet 723 may be arranged between the vibration transmission plate 722 and the other end of the inner bracket 7216 deviates from the magnet group 7211 to slow down the vibration of the inner bracket 7216 in the axis direction of the cylindrical groove 72123, thereby increasing the steadiness of the vibration transmission plate 722.

In some embodiments, the second protruding column 72162 may include an integrated first column section 72163 and the second column section 72164. The first column section 72163 may be closer to one end of the inner bracket 7216 compared to the second column section 72164, and may be on the cross-section perpendicular to the axis direction of the cylindrical groove 72123. The cross-sectional area of the second column section 72164 may be less than that of the first column section 72163. In this way, the first column section 72163 may be penetrated through the second through-hole 12142, and the second column section 72164 may be inserted in a vibration plate 122 to facilitate the inner bracket 7216 to drive the vibration plate 122 to vibrate. Further, the elastic damping sheet 723 may be opened with a third trough-hole 1231. The elastic damping sheet 723 may be sleeved on the second column section 72164 through the third trough-hole 1231, and support on the first column section 72163.

Figure 48:
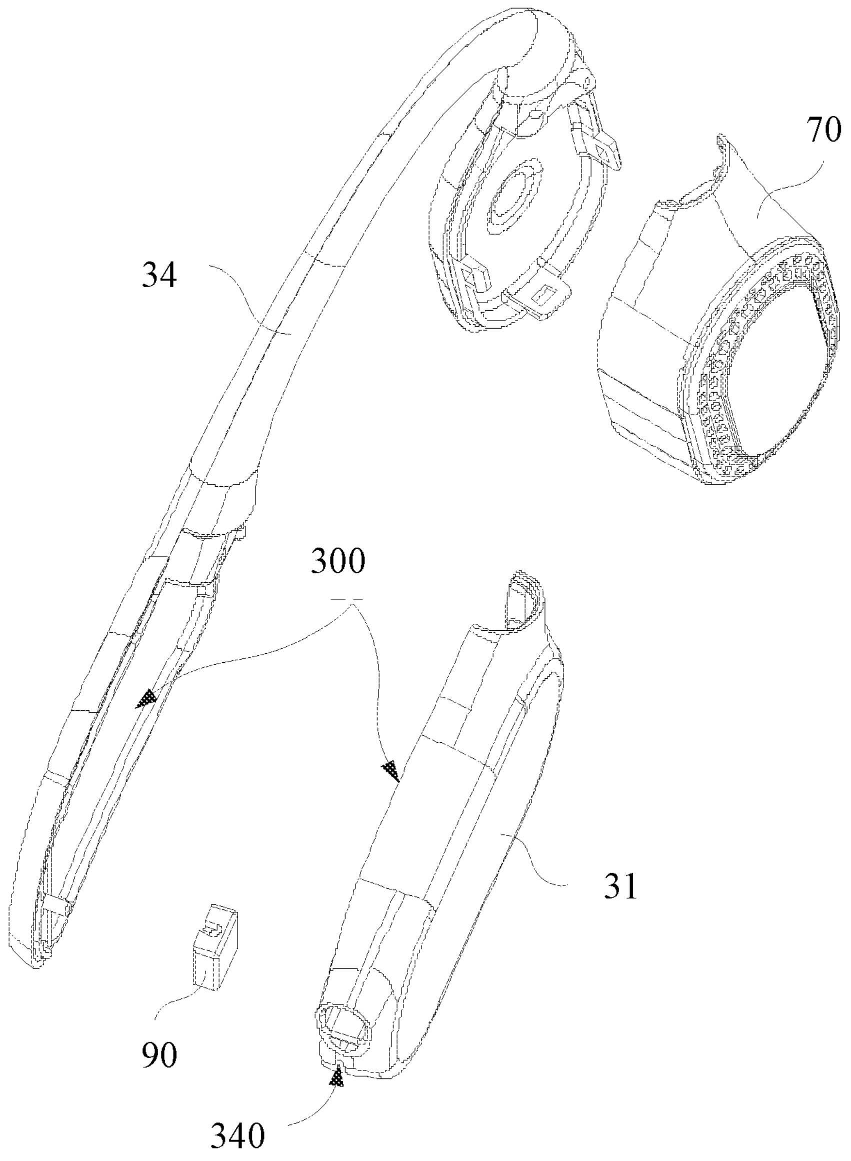
FIG. 48 is a schematic diagram illustrating a disassembled structure of an ear-hook assembly according to some embodiments of the present disclosure.
Figure 49:
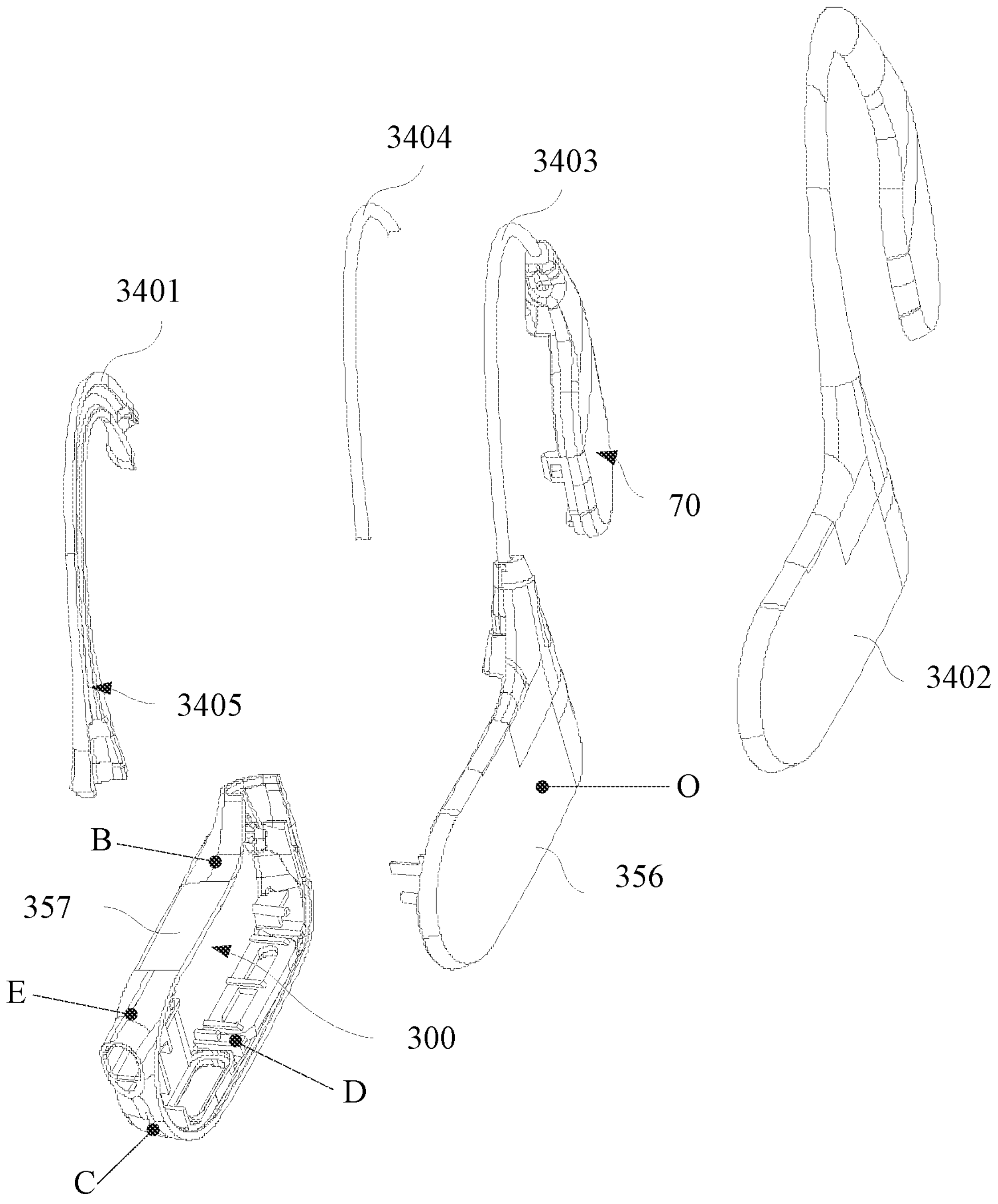
FIG. 49 is a schematic diagram illustrating a disassembled structure of a connection assembly and an ear-hook housing according to some embodiments of the present disclosure.
Figure 50:
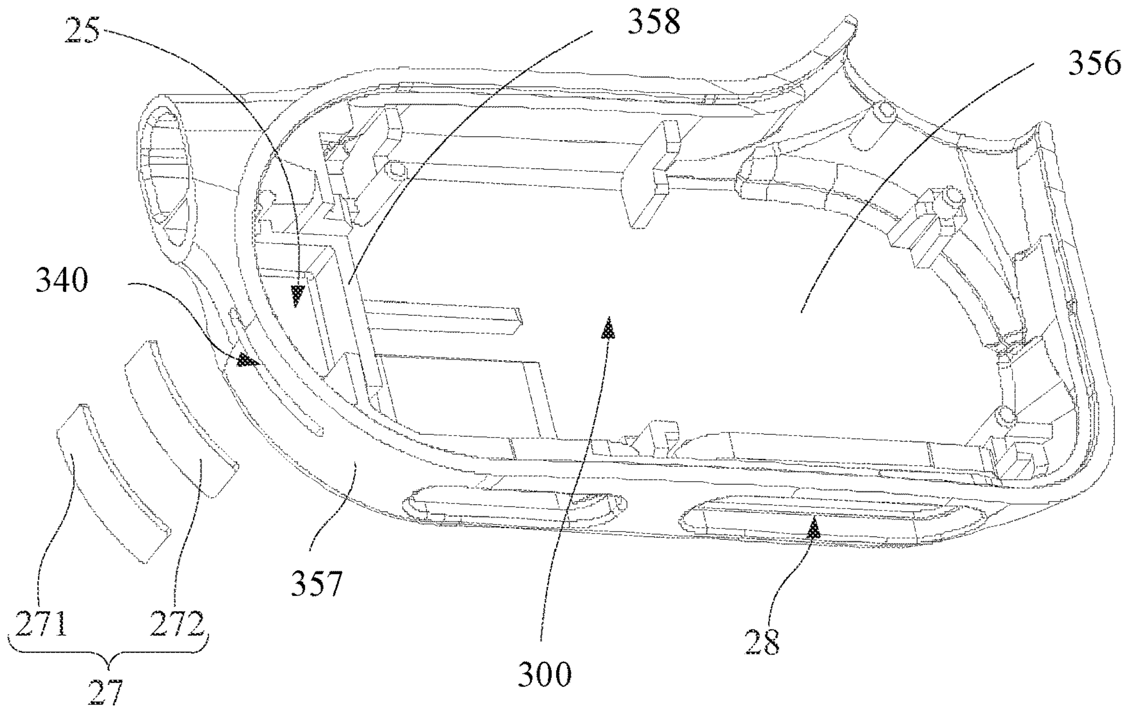
FIG. 50 is a structural schematic diagram illustrating a second ear-hook housing according to some embodiments of the present disclosure.
Figure 51:
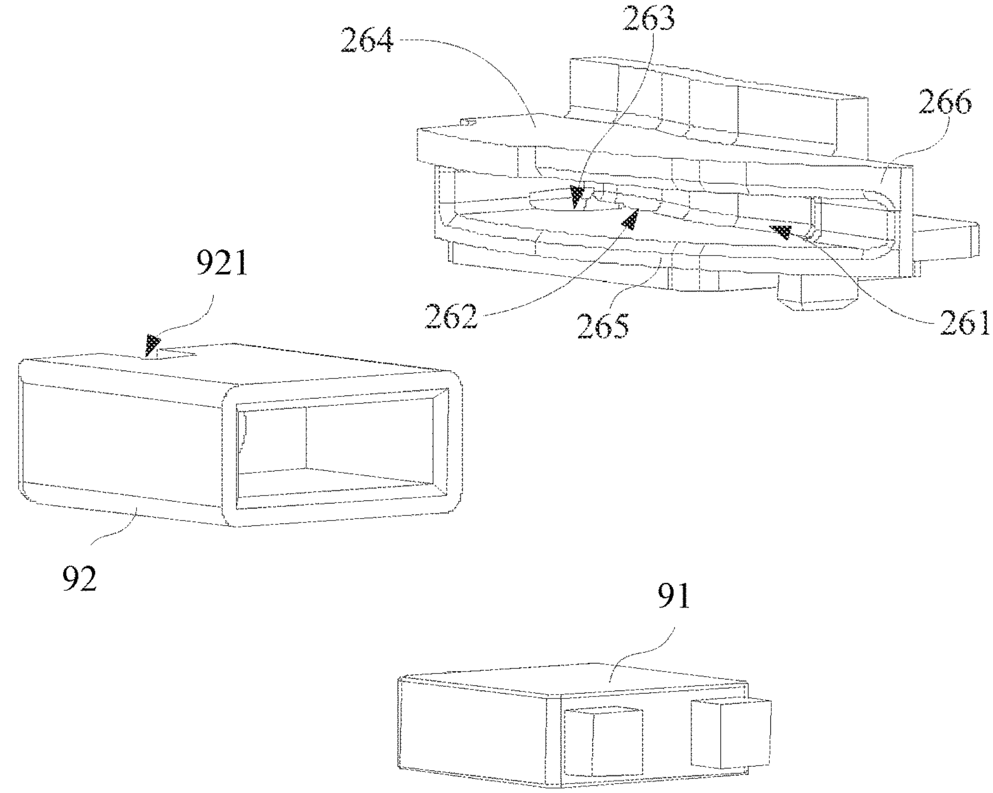
FIG. 51 is a schematic diagram illustrating a disassembled structure of a mid-channel assembly and a sound pickup assembly according to some embodiments of the present disclosure.

FIG. 48 is a schematic diagram illustrating a disassembled structure of an ear-hook assembly according to some embodiments of the present disclosure. FIG. 49 is a schematic diagram illustrating a disassembled structure of a connection assembly and an ear-hook housing according to some embodiments of the present disclosure. FIG. 50 is a structural schematic diagram illustrating a second ear-hook housing according to some embodiments of the present disclosure. FIG. 51 is a schematic diagram illustrating a disassembled structure of a mid-channel assembly and a sound pickup assembly according to some embodiments of the present disclosure.

As shown in FIG. 48, in some embodiments, an ear-hook assembly 30 may form an accommodating space 300 for accommodating a battery assembly 50 or a control circuit assembly 60. The ear-hook assembly 30 may further form a communication hole 340 which communicates the accommodating space 300 and the outside world. Further, a sound pickup assembly 90 may be arranged within the accommodating space 300, and may be adjacent to the communication hole 340 to enable the sound pickup assembly 90 to collect sound through the communication hole 340. Based on the above detailed description, the count of the ear-hook assemblies 30 may be two, and the count of the sound pickup assemblies 90 may further be two correspondently. At this time, the two sound pickup assemblies 90 may be in one-to-one correspondence with the accommodating spaces 300, that is, each sound pickup assembly 90 may be arranged in a corresponding accommodating space 300 and near the communication hole 340, so that the two sound pickup assemblies 90 may collect sound through the corresponding communication hole 340.

In some embodiments, the ear-hook assembly 30 may include a connection member 34 and an ear-hook housing 31 of the connection member 34. One end of the connection member 34 may be connected with the ear-hook housing 31, and the other end of the connection member 34 may be connected with the loudspeaker assembly 70. Further, each ear-hook housing 31 may form an accommodating space 300 and the communication hole 340 that connects the accommodating space 300 and the outside world. Based on the above description, the loudspeaker assembly 70 may drive the air to vibrate in the process of making sound, that is, a sound leakage appears. For this reason, the communication hole 340 may be opened on the side of the ear-hook housing 31 away from the loudspeaker assembly 70, so that the "sound leakage" of the loudspeaker assembly 70 may not be collected by the sound pickup assembly 90, thereby reducing the interference of the loudspeaker assembly 70 to the sound pickup assembly 90. Moreover, the sound pickup assembly 90 may be arranged on the side away from the loudspeaker assembly 70 within the accommodating space 300, and may also reduce the transmission of the mechanical vibration generated by the loudspeaker assembly 70 to the sound pickup assembly 90, thereby reducing the "wind noise" of the sound pickup assembly 90.

As shown in FIG. 49, in some embodiments, the connection member 34 may include a first elastic covering layer 3401, a second elastic covering layer 3402 and an elastic metal filament 3403, and a wire 3404 may be worn within the connection member 34. One end of the elastic metal filament 3403 may be connected with the ear-hook housing 31 (specifically, a first ear-hook housing 33), and the other end of the elastic metal filament 3403 may be used to connect the loudspeaker assembly 70. Combining FIG. 49 and FIG. 36, one end of the wire 3404 may be electrically connected with the battery assembly 50 arranged in the ear-hook assembly 30 or the control circuit assembly 60, etc. The other end of the wire 3404 may be electrically connected with the loudspeaker assembly 70 corresponding to the ear-hook assembly 30. The first elastic covering layer 3401 and the second elastic covering layer 3402 may be formed by two-color injection molding, and may wrap the elastic metal filament 3403 and the wire 3404. At this time, the elastic metal filament 3403 may be curved and has a certain stiffness/strength to form a basic form of the ear-hook assembly 30, which is convenient for a user to wear the apparatus 10. The first elastic covering layer 3401 and the second elastic covering layer 3402 may have a certain softness and appearance quality to improve the comfort and appearance of the apparatus 10 in wearing. In some embodiments, a splicing stitch of the first elastic covering layer 3401 and the second elastic covering layer 3402 may divide the surface of the connection member 34 into an inner side face and an outer side face opposite with each other. The exposed surface of the first elastic covering layer 3401 may be used as the inner side face of the connection member 34, and the exposed face of the second elastic covering layer 3402 may be used as the outer side face of the connection member 34. It should be noted that when the apparatus 10 is worn, most of the inner side face of the connection member 34 may be in contact with the user's ear and a part of head near the ear, while most of the outer side face of the connection member 34 may not be in contact with the user's ear and a part of head near the ear.

In some embodiments, when preparing the connection member 34, an auxiliary metal wire may generally be used. The auxiliary metal wire and the elastic metal filament 3403 may be arranged in parallel. The two may have roughly the same shape, length, curvature radius and other structural parameters. At this time, the relevant technologies generally use injection molding to form an elastic covering layer on the surface of the auxiliary metal wire and the elastic metal filament 3403 first, then draw out the auxiliary metal wire, and thread the wire 3404 in the elastic covering layer (that is the original location of the auxiliary metal wire) to obtain the connection member 34. However, in the above process of injection molding, as the auxiliary metal wire and the elastic metal filament 3403 have a certain length and curvature radius, the two (especially the area between them) may deviate from an original position under the crush of an injection molding material, which may cause nonuniformity of the wall thickness of the elastic covering layer, and affect the molding quality of the connection member 34. Especially when the designed wall thickness of the elastic covering layer is relatively thin, in the long-term use of the apparatus 10, the connection device 34 may even have a “broken skin” phenomenon, which seriously affects the user’s experience.

In some embodiments, the elastic covering layer of the relevant technologies may be divided into two layers, that is, the first elastic covering layer 3401 and the second elastic covering layer 3402, which may be formed by two injection moldings. A through-groove 3405 may be formed on one side of one of the elastic covering layer (e.g., the first elastic covering layer 3401). The through-groove 3405 may extend along an extension direction of the first elastic covering layer, and may be used to place the elastic metal filament 3403 and the auxiliary metal wire (which may be replaced with the wire 3404 later). Further, the second elastic covering layer 3402 may be formed on one side of the first elastic covering layer 3401 (that is, the side of the through-groove 3405) in the injection molding method, and may cover the elastic metal filament 3403 and the auxiliary metal wire, so that after the first elastic covering layer 3401 and the second elastic covering layer 3402 are fixed, the auxiliary metal wire may be pulled out to form a wiring channel arranged in parallel with the elastic metal filament 3403 and communicates with the accommodating space 300 (not shown in FIG. 47). The wiring channel may be used to thread the wire 3404.

In short, some embodiments of the present disclosure may obtain the first elastic covering layer 3401 with the through-groove 3405 through the first injection molding method, and then place the elastic metal filament 3403 and the auxiliary metal wire in the through-groove 3405, and then use the second injection molding method to form a second elastic covering layer 3402 on one side of the first elastic covering layer 3401 where the through-groove 3405 locates to wrap the elastic metal filament 3403 and the auxiliary metal wire. Finally, pull the auxiliary metal wire out to form the wiring channel, and thread the wire 3404 in the wiring channel (that is, the original location of the auxiliary metal wire) to obtain the connection member 34. Obviously, as the through-groove 3405 may have a certain depth, the first elastic covering layer 3401 may partly wrap the elastic metal filament 3403 and the auxiliary metal wire to limit the location, and further enable the elastic metal filament 3403 and the auxiliary metal wire to withstand the impact of the injection molding material, which is conducive to solving a technical problem that the elastic metal filament 3403 and the auxiliary metal wire may deviate from the initial position. For example, the depth of the through-groove 3405 may be equal to the radius of the larger of the elastic metal filament 3403 and the auxiliary metal wire. In some embodiments, the count of through-grooves 3405 may be two, and the two through-grooves 3405 may be arranged in parallel and used to place the elastic metal filament 3403 and the auxiliary metal wire, so that the wiring channel (that is, the position where the wire 3404 is located) and the elastic metal filament 3403 may be separated from each other, and the elastic metal filament 3403 and the auxiliary metal wire (or the wire 3404 arranged later) may not interfere with each other. In some other embodiments, the count of the through-groove 235 may be one, and the elastic metal filament 3403 and the auxiliary metal wire may be co-placed in the through-groove 3405, so that the elastic metal filament 3403 may be exposed in the wiring channel, thereby simplifying the structure of the connection member 34.

In some embodiments, one of the first elastic covering layer 3401 and the second elastic cover 3402 may be formed first, on which the through-groove 3405 may be formed, then the other one may be formed on the first one. The structure shown in FIG. 14 is just an exemplary description of the embodiment, and it is not limited as the only way of the embodiment. For example, the second elastic covering layer 3402 in FIG. 47 may be formed first, and a through groove 3405 may be formed on the second elastic covering layer 3402, and then the first elastic covering layer 3401 may be formed. That is, the second elastic covering layer 3402 shown in FIG. 47 may be used as the first elastic covering layer, and the first elastic covering layer 3401 shown in FIG. 47 may be used as the second elastic covering layer.

In some embodiments, the ear-hook housing 31 may be fixed at one end of the elastic metal filament 3403 by injection molding. The second elastic covering layer 3402 may further cover at least part of the outer surface of the ear-hook housing 31. The first elastic covering layer 3401 may be blocked between the ear-hook housing 31 and the loudspeaker assembly 70. For example, the ear-hook housing 31 may include a first ear-hook housing 33 and a second ear-hook housing 35, and the two may cooperate to form the accommodating space 300. The first ear-hook housing 33 may be fixedly connected to one end of the connection member 34 (specifically may be the elastic metal filament 3403) through injection molding. At this time, the second elastic covering part 3402 may be wrapped on the outer surface of the first ear-hook housing 33, and the first elastic covering layer 3401 may be blocked between the second ear-hook housing 35 and the loudspeaker assembly 70.

Based on the above detailed description, the forming process of ear-hook assembly 30 may be: 1) the loudspeaker assembly 70 and the first ear-hook housing 33 may be respectively formed at two ends of the elastic metal filament 3403; 2) the first elastic covering layer 3401 with the through-groove 3405 may be obtained through the first injection molding; 3) the semi-finished product in operation 2) and the auxiliary metal wire may be assembled; 4) a second elastic covering layer 3402 may be formed on the side of the first elastic covering layer 3401 where the through-groove 3405 locates through the second injection molding to wrap the elastic metal filament 3403 and the auxiliary metal wire, and wrap the outer surface of the first ear-hook housing 33; 5) the auxiliary metal wire of the semi-product of operation 4) may be pulled out to form a wiring channel, and then a wire 3404 may be threaded in the wiring channel; 6) the second ear-hook housing 35 may be fixed with the first ear-hook housing 33 in operation 5) through one or any combinations of methods of bonding, clamping, threading, etc.

As shown in FIG. 48, in some embodiments, an accommodating groove 25 for accommodating the sound pickup assembly 90 may be further formed in the accommodating space 300. For example, the second ear-hook housing 35 may include a bottom wall 356 and a sidewall 357 looped on the bottom wall 356. The first ear-hook housing 33 may be covered on the sidewall 357 and opposite to the bottom wall 356 to form the accommodating space 300. At this time, the through-hole 340 may be opened on the side wall 357. Specifically, as shown in FIG. 47, the through-hole 340 may be opened at a C position on the second ear-hook housing 35. Based on the above description, the through-hole 340 may be opened on the side of the sidewall 357 away from the connection member 34 to reduce the interference of the loudspeaker assembly 70 to the sound pickup assembly 90 as much as possible. Furthermore, a protruding edge 358 may be arranged on the side of the bottom wall 356 facing the first ear-hook housing 33, the protruding edge 358 may not only enclose an accommodating groove 25, but further may play a role in limiting the position of the sound pickup assembly 90. In some embodiments, the through-hole 340 may further be opened at other positions, such as the O position on the first ear-hook housing 33 shown in FIG. 49, etc., or the through-hole 340 may be opened at positions B, D, E on ethe second ear-hook housing 35 shown in FIG. 49, etc.

In some embodiments, if the sound pickup assembly 90 directly communicates with the outside world through a through-hole 340, the sound path between the sound pickup assembly 90 and the outside world may be short. When the apparatus 10 is in a complex environment (e.g., when the air flow is stronger), the sound pickup assembly 90 may collect much noise, which may even cause the phenomenon of "wind noise". To this end, as shown in FIG. 48 and FIG. 49, in the present disclosure, a channel 26 may be configured between the sound pickup assembly 90 and the through-hole 340 to extend the sound path of the sound pickup assembly 90, thereby improving the sound collecting effect of the sound pickup assembly 90.

In some embodiments, the channel 26 may be arranged within the accommodating space 300, and may be provided with a sound inlet 261, a sound path 262 and a sound outlet 263. The sound inlet 261 and the sound outlet 263 may be spaced apart and may communicate with the sound path 262, respectively. For example, the shortest distance from the sound inlet 261 through the sound path 262 to the sound outlet 263 may be greater than or equal to 4 mm to extend the sound path of the sound pickup assembly 90. Further, the sound inlet 261 may be in communication with the communication hole 340, and the sound outlet 263 may be adjacent to the sound pickup assembly 90, so that the sound may transmit through the communication hole 340, the sound inlet 261, the sound path 262, and the sound outlet 263 and then transmit to the sound pickup assembly 90. At this time, the channel 26 may be covered on the protruding edge 358, that is, the channel 26 may cover the accommodating groove 25, and may be used to press the sound pickup assembly 90 within the accommodating groove 25. The sound inlet 261 may face the sidewall 357 and be in communication with the through-hole 340. The sound outlet 263 may be in communication with the sound pickup assembly 90. In this way, the channel 26 not only extends the sound path of the sound pickup assembly 90, but also realizes the fixation of the sound pickup assembly 90, that is, the channel 26 may be used for two purposes.

In some embodiments, the through-hole 340 may be configured like a slit, and the sound inlet 261 may be configured like a slit correspondently to increase the contact area between the sound path of the sound pickup assembly 90 and the outside world, thereby improving the sound collection effect of the pickup assembly 90. Based on the above description, if contact area between the sound path of the sound pickup assembly 90 and the outside world is too large, on the one hand, the phenomenon of "wind noise" may occur, and on the other hand, the waterproof and dustproof performances of the ear-hook assembly 30 may be greatly reduced. To this end, in the present disclosure, a windproof mesh cover 27 may be configured on the sound path of the sound pickup assembly 90. For example, the windproof mesh cover 27 may connect between channel 26 and ear-hooker housing 31, and separate the through-hole 340 and the sound inlet 261 to improve the windproof and noise reduction performances of the sound pickup assembly 90, and improve waterproof and dustproof performance of the ear-hook assembly 30. The windproof mesh cover 27 may include a laminated iron mesh 271 and gauze 272, and the gauze 272 may be closer to the channel 26 than the iron mesh 271. It should be noted that the structural strength of the iron mesh 271 may be greater than that of the gauze 272, and the count of meshes of the gauze 272 is greater than that of the iron mesh 271. The cooperation between the two may better satisfy the requirement on the structural strength of the windproof mesh cover 27, the sound collection requirement of the sound pickup assembly 90, and requirement of waterproof and dustproof of the ear-hook assembly 30.

As shown in FIG. 49, in some embodiments, the channel 26 may include a channel top wall 264, a channel bottom wall 265, and a channel side wall 266 that encloses a channel. The channel top wall 264 and the channel bottom wall 265 may be arranged opposite to each other, and the channel side wall 266 may be connected between channel top wall 264 and the channel bottom wall 265. Further, the sound inlet 261 may be opened on the channel side wall 266, and the sound outlet 263 may penetrate the channel bottom wall 265. At this time, the channel bottom wall 265 may further be used to press the sound pickup assembly 90. For example, the channel top wall 264 and the channel bottom wall 265 may be arranged in parallel and apart from each other, so that the sound path 262 may be set flat to adapt to the flat structure of the ear-hook housing 31. The height of the sound path 262 from the channel top wall 264 to the channel bottom wall 265 may be 0.45-0.75 mm. For example, the height of the sound path 262 from the channel top wall 264 to the channel bottom wall 265 may be 0.65 mm.

In some embodiments, the sound pickup assembly 90 may include a sound pickup element 91 and a protective cover 92, wherein the protective cover 92 may be sleeved in the outer peripheral of the sound pickup assembly 91. Further, the protective cover 92 may be provided with a groove 921 facing the channel bottom wall 265, and at least part of the sound pickup element 91 may be exposed at the groove 921. In this way, when the channel 26 presses the pickup assembly 90 within the accommodating groove 25, the protective cover 92 may be connected and tightly matched with the protruding edge 358, and the groove 921 may communicate with the sound outlet 263. At this time, the protective cover 92 may be made of silicone. In the above assembly process, the protective cover 92 may have elastic deformation to improve the fixing effect of the protruding edge 358 on the sound pickup assembly 90, and improve the tightness of the sound path between the sound pickup assembly 90 and the channel 26, thereby improving the sound collection effect of the sound pickup assembly 90. In addition, the protective cover 92 and the sound pickup element 91 may be closely matched. The sound pickup portion of the sound pickup element 91 (specifically may be a vibration diaphragm) may be exposed at the groove 921, so that when the sound is transmitted to the groove 921, it may be unlikely to leak to the back side of the sound pickup element 91 from between the protective cover 92 and the sound pickup assembly 91, which may better maintain the pickup effect of the sound pickup assembly 91.

Based on the above detailed description, the count of the ear-hook assemblies 30 may be two. At this time the counts of the sound pickup assemblies 90 and the channels 26 may be two correspondently. Specifically, there may be a sound pickup assembly 90 and a channel 26 in the accommodating space 300 of each ear-hook assembly 30 to improve the pickup effect of each sound pickup assembly 90. Further, the count of loudspeaker assemblies 70 may be two as well, and each ear-hook assembly 30 may connect the loudspeaker assembly 70. In this way, when the user wears the apparatus 10, the two loudspeaker assemblies 70 may be located on two sides of the user's head to form a three-dimensional sound, thereby improving the acoustic expression of the apparatus 10.

In some embodiments, the two loudspeaker assemblies 70 are likely to be electrically connected with the same main board (such as the main circuit board 61 mentioned later), and the main board may adjust the two loudspeaker assemblies 70 through a set of volume control buttons (such as the volume button 62 mentioned later). At this time, the volumes of the two loudspeaker assemblies 70 may increase simultaneously, or decrease simultaneously under the adjustment of the volume control buttons. In this way, although for users with normal hearing, the adjustment and control of the loudspeaker assembly 70 as well as the structure of the whole machine may be simplified, for users with abnormal hearing, they may hear sounds with different volumes on different sides, which affects the user's experience. To solve the problem, in the present disclosure, a group of volume buttons 62 may be respectively arranged on two ear-hook assemblies 30 to adjust the corresponding loudspeaker assembly 70. That is, the two loudspeaker assemblies 70 may be respectively adjusted by two corresponding groups of buttons 62, which may help the user to adjust the two loudspeaker assemblies 70 adaptively according to the actual use requirements.

Figure 52:
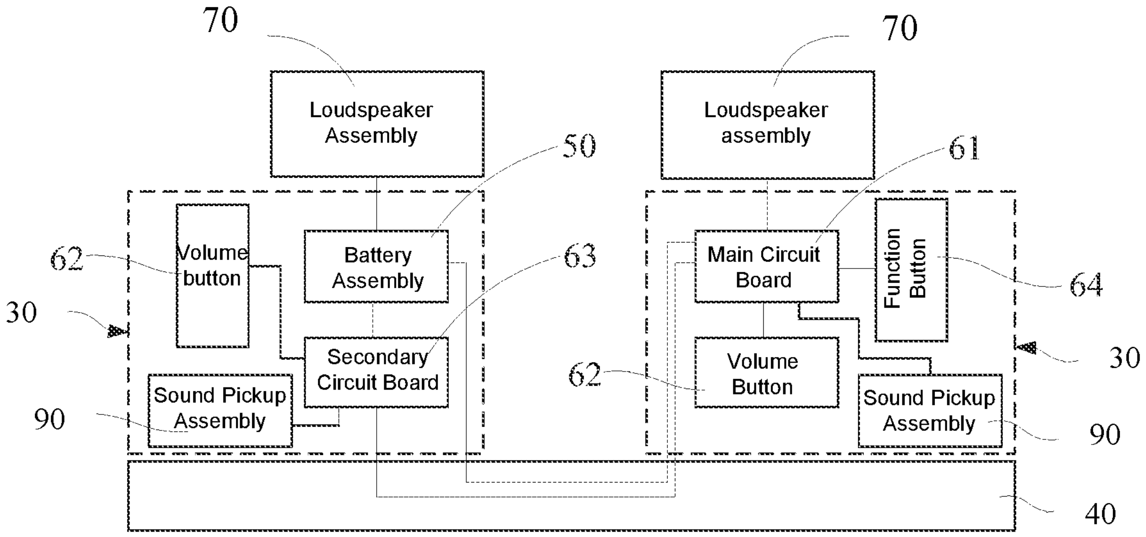
FIG. 52 is a schematic diagram illustrating a circuit structure of a control circuit assembly according to some embodiments of the present disclosure.

FIG. 52 is a schematic diagram illustrating a circuit structure of a control circuit assembly according to some embodiments of the present disclosure.

As shown in FIG. 52, in some embodiments, a control circuit assembly 60 may include a main circuit board 61 and two groups of volume keys 62. A battery assembly 50 may be within an accommodating space 300 of one of ear-hook housings 31, and the main circuit board 61 may be placed within the accommodating space 300 of another ear-hook housing 31 to facilitate a balanced distribution of weight of an apparatus 10. Further, two independent audio processing chips (not shown in FIG. 52) may be integrated on the main circuit board 61, which independently controls the audio gains of the two speaker assemblies 70. The audio processing chips may be, for example, audio processing DSP chips.

In some embodiments, as shown in FIG. 52, each ear-hook housing 31 (specifically may be a second housing 242) may form a volume buttonhole 28 communicates with the accommodating space 300. Each group of volume buttons 62 may correspond to a volume buttonhole 28 of an ear-hook housings 31, and may expose through the volume buttonhole 28, so that a user may control the corresponding audio processing chip on the main circuit board 61 by pressing the volume button 62, and further adjust the audio gain of the corresponding loudspeaker assembly 70.

In some embodiments, the control circuit assembly 60 may further include a secondary circuit board 63, which is arranged within the accommodating space 300 of the ear-hook housing 31. That is, the secondary circuit board 63 and the battery assembly 50 may be arranged within the same accommodating space 300 of the ear-hook housing 31. At this time, the secondary circuit board 63 may cover the corresponding volume buttonhole 28 and connect with the volume button 62, so as to withstand the pressure of the user to the volume button 62. Moreover, the secondary circuit board 63 may be coupled with the main circuit board 61, so that the main circuit board 61 may process the pressing operations of the volume button 62 coupled with the secondary circuit board 63.

Based on the above detailed description, for the apparatus 10, in some embodiments, one end of a rear-hook assembly 40 may be arranged with an ear-hook assembly 30 and a loudspeaker assembly 70, a sound pickup assembly 90, a channel 26, a battery assembly 50, a secondary circuit board 63, and a group of volume buttons 62, correspondently. The other end of the rear-hook assembly 40 may be arranged with an ear-hook assembly 30 and a loudspeaker assembly 70, a sound pickup assembly 90, a channel 26, a main circuit board 61, and a group of volume buttons 62. The electrical devices arranged at the two ends of the rear-hook assembly 40 may be electrically connected by wires lay within the rear-hook assembly 40 to realize the transmission of control instructions and electrical powers.

In some embodiments, as the main circuit board 61 is generally less than the battery assembly 50 in terms of volume, a function button 64 may be arranged on the side of the main circuit board 61. The function button 64 may replace the corresponding volume button 62, or may further coexist with the volume button 62, and realize the functions of play/pause, AI awakening, power on/power off, etc. to expand the interaction ability of the apparatus 10.

Figure 53:
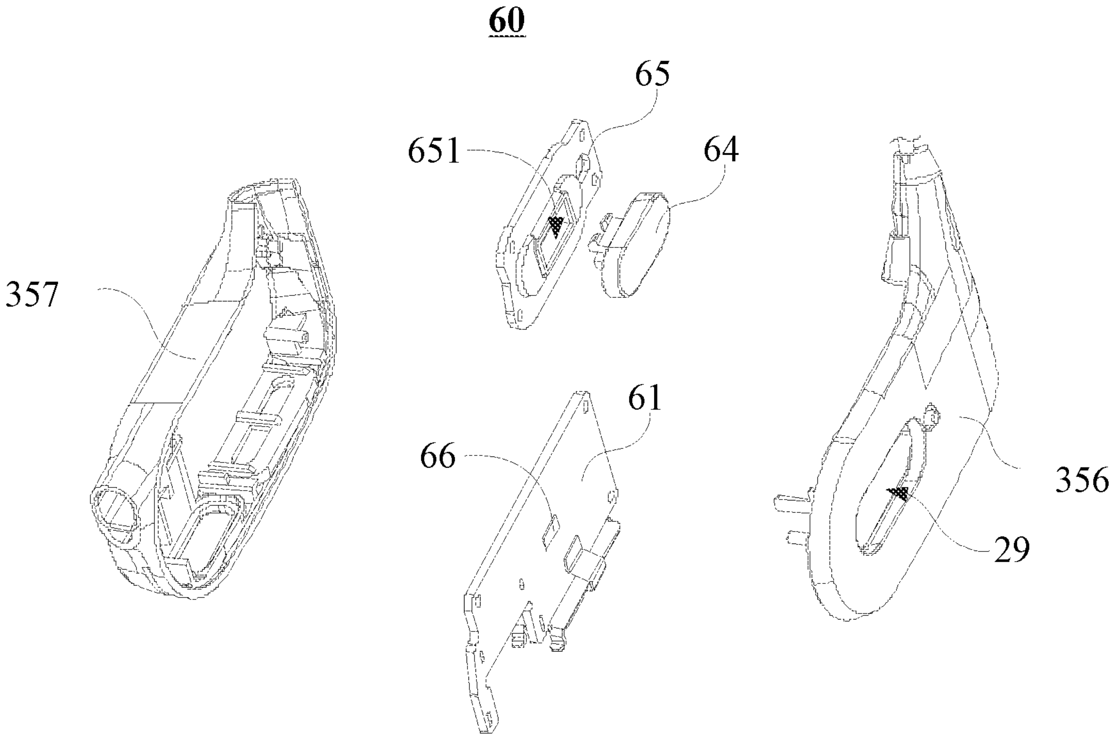
FIG. 53 is a schematic diagram illustrating a disassembled structure of an ear-hook housing according to some embodiments of the present disclosure.

FIG. 53 is a schematic diagram illustrating a disassembled structure of an ear-hook housing according to some embodiments of the present disclosure.

In some embodiments, as shown in FIG. 53, a control circuit assembly 60 may further include a function button 64 and a waterproof lining plate 65. A main circuit board 61 may be provided with a function switch 66. A sliding hole 29 may be opened on an ear-hook housing 31 (specifically may be a first ear-hook housing 33) which accommodates the main circuit board 61, and the sliding hole 29 may communicate with an accommodating space 300. The function button 64 may be slidably arranged within the sliding hole 29, and may toggle the function switch 66. Further, the waterproof lining plate 65 may be arranged within the accommodating space 300 of the ear-hook housing 31, where the main circuit board 61 locates, and may be fixedly connected with the ear-hook housing 31, where the main circuit board 61 locates, so as to form a waterproof block between the main circuit board 61 and the ear-hook housing 31. The waterproof lining plate 65 may be provided with a lining plate hole 651, which may be arranged corresponding to the sliding hole 29. For example, they may be coaxial and equal in size. At this time, the function key 64 may slide through in the sliding hole 29 and the lining plate hole 651, so that the function button 64 may be easy to toggle.

Figure 54:
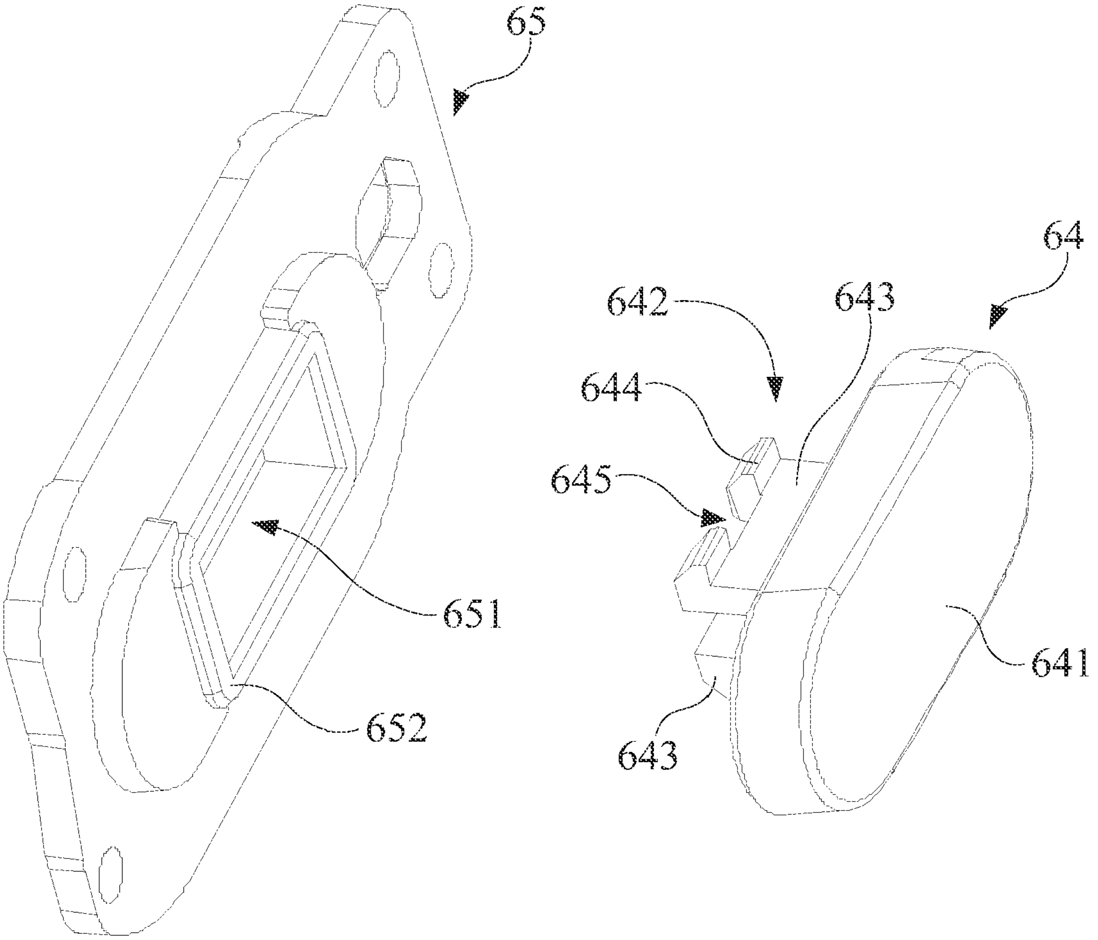
FIG. 54 is a schematic diagram illustrating a disassembled structure of a function button and a waterproof liner according to some embodiments of the present disclosure.
Figure 55:
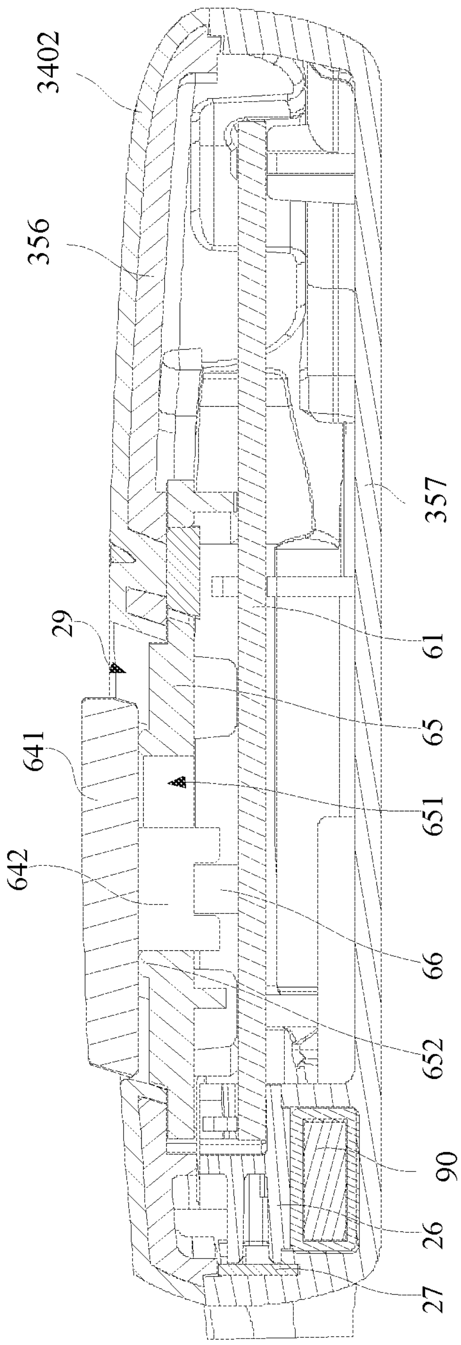
FIG. 55 is a schematic diagram illustrating a cross-sectional structure of an ear-hook assembly along a toggle direction of a function button according to some embodiments of the present disclosure.

FIG. 54 is a schematic diagram illustrating a disassembled structure of a function key and a waterproof lining plate according to some embodiments of the present disclosure. FIG. 55 is a schematic diagram illustrating a cross-sectional structure of an ear-hook assembly along a toggle direction of a function key according to some embodiments of the present disclosure.

As shown in FIG. 54 and FIG. 55, in some embodiments, a function button 64 may include a sliding portion 641 and a connection portion 642 that integrated connected with each other. The connection portion 642 may be arranged on one side of the sliding portion 641 and may extend toward the direction deviates from the sliding portion 641. The sliding portion 641 may deviate from the other side of the connection portion 642 and be exposed at a sliding hole 29. Further, the connection portion 642 may include two connecting plates 643 arranged in opposite in the sliding portion 641.

One side of each connecting plate 643 away from the sliding portion 641 may be arranged with a buckle 644 that extends away from each other, so that the connection portion 642 may be connected with one side of a waterproof lining plate 65 away from the sliding portion 641. At this time, one side of one of the connection plates 643 away from the sliding portion 641 may be opened with a switch accommodating area 645. The switch accommodating area 645 may be used to accommodate a function switch 66, which enables the function button 64 to toggle the function switch 66. In this way, on the one hand, the function button 64 may be buckled with the function switch 66 to facilitate the user to toggle the function switch 66 through the function button 64; on the other hand, the function button 64 may further be buckled with an ear-hook housing 31 and the waterproof lining plate 65 to avoid the function button 64 falling off from the ear-hook housing 31 and improve the waterproof and dust-proof performance of the ear-hook housing 31 at the function button 64.

In some embodiments, the side of the waterproof lining plate 65 facing the sliding portion 641 may be arranged with a protrusion 652 surrounding a lining plate hole 651, that is, the protrusion 652 may be arranged in a circle along the circumference of the lining plate hole 651. In this way, when the function button 64 buckles with the ear-hook housing 31 and the waterproof lining plate 65, the protrusion 652 may connect to one side of the sliding portion 641, the connection portion 642 may pass through the sliding hole 29 and the lining plate hole 651, and may be able to move within the sliding hole 29 and the lining plate hole 651, so that the function switch 66 may be toggled. At this time, through a reasonable design of the structures of the function button 64 and the waterproof lining plate 65, as well as the cooperation with the ear-hook housing 31, when the connection portion 642 is moving within lining plate hole 651, the protrusion 652 may be always connected to the one side of the sliding portion 641 to ensure the waterproof and dustproof performances of the ear-hook housing 31 at the function button 64.

In some embodiments, the function button 64, the waterproof lining plate 65 and the housing (specifically include a first ear-hook housing 33 and a second ear-hook housing 35) may cooperate to form a button waterproof assembly.

Figure 56:
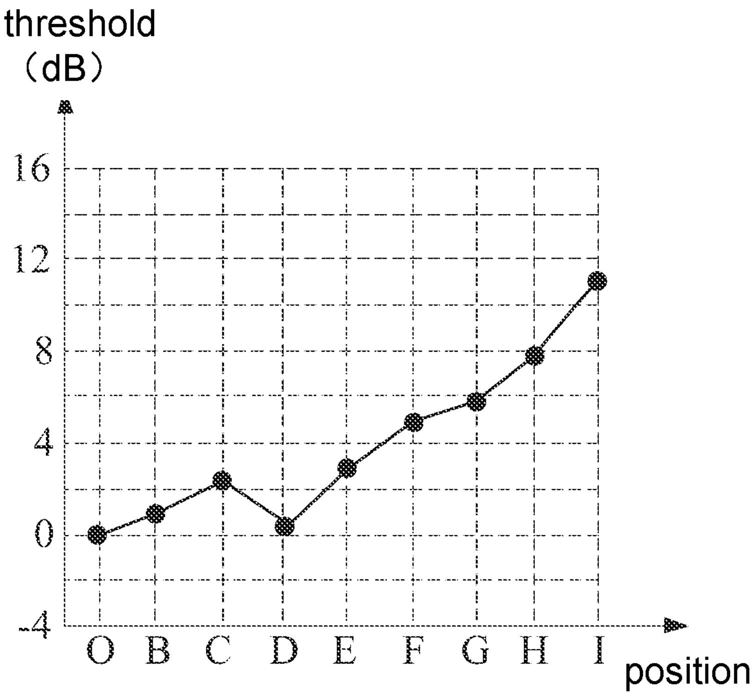
FIG. 56 is a schematic diagram illustrating a relationship between a wind noise threshold and a position of a sound pickup assembly in an apparatus according to some embodiments of the present disclosure.

FIG. 56 is a schematic diagram illustrating a relationship between a wind noise threshold and a position of a sound pickup assembly in an apparatus according to some embodiments of the present disclosure.

As shown in FIG. 56, in some embodiments, FIG. 56 is a schematic diagram illustrating a relationship between a wind noise threshold and a position of a sound pickup assembly of an acoustic apparatus according to some embodiments of the present disclosure. It should be noted that: horizontal coordinates in FIG. 56 may indicate a relative position of the sound pickup assembly on the acoustic output apparatus, and vertical coordinates may indicate the wind noise threshold of the sound pickup assembly (its unit is dB).

Based on the above description, a sound pickup assembly 90 may be mainly used to collect the user's voice, the environmental sound of the user's environment, etc. For the hearing impaired, the sound collection effect of the sound pickup assembly 90 may affect the sharpness and stability of the sound received through the apparatus 10 by the hearing impaired. Theoretically, the sound pickup assembly 90 may be arranged at any position on the apparatus 10. In some embodiments, the closer the sound pickup assembly 90 is to the loudspeaker assembly 70, the more likely the sound pickup assembly 90 may be affected by the loudspeaker assembly 70, and the easier the sound pickup assembly 90 is to cause a "howling" due to the acoustic coupling of the two. Therefore, combining FIG. 36 and FIG. 49, the present disclosure has performed a plurality of tests on the relationship between the wind noise threshold of the sound pickup assembly 90 and its relative position on the apparatus 10. A corresponding test result is shown in FIG. 56. The larger the wind noise threshold is, the lower the probability of the phenomenon of the wind noise may happen to the sound pickup assembly 90, and the smaller the influence of the loudspeaker assembly 70 may cause to the sound pickup assembly 90.

In some embodiments, as shown in FIG. 49, the sound pickup assembly 90 may be arranged on an ear-hook assembly 30. As shown in FIG. 36, the sound pickup assembly 90 may further be arranged on a rear-hook assembly 40. For the ear-hook assembly 30, combined with FIG. 13, as the ear-hook assembly 30 is more deviating from the loudspeaker assembly 70 compared to a connection member 34, the sound pickup assembly 90 may correspond to a first ear-hook housing 33 and a second ear-hook housing 35. Combined with FIG. 49 and FIG. 36, a relative position O may correspond to the first ear-hook housing 33, and the relative positions B, C, D, E may correspond to the second ear-hook housing 35. Specifically, when the apparatus 10 is worn, the relative position O may be located on an outer side of the ear-hook assembly 30 deviates from the user's head, and the relative positions B and E may be located above the ear-hook assembly 30, and the relative position E may be more deviated from the loudspeaker assembly 70 compared to the relative position B. The relative position D may be below the ear-hook assembly 30, and the relative position C may be located at the rear of the ear-hook assembly 30 deviate from the loudspeaker assembly 70. Further, for the rear-hook assembly 40, the relative positions F, G, H, and I may deviate from the loudspeaker assembly 70 in sequence. The relative position I may correspond to a middle position of the rear-hook assembly 40.

As shown in FIG. 56, in some embodiments, the wind noise threshold at the relative position O may be used as a reference, that is, the howling threshold at the relative position O may be defined as 0. The wind noise thresholds of the relative positions B, C, D, E, F, G, H, and I may be greater than 0, which shows that arranging the sound pickup assembly 90 at these positions may be conducive to relief the above "howling" phenomenon. Further, the wind noise thresholds of the relative positions F, G, H, and I may be significantly higher than that of the relative positions B, C, D, and E, which shows that arranging the sound pickup assembly 90 on the rear-hook assembly 40 may be conducive to relief the above "howling" phenomenon. It is worth noting that: For the ear-hook assembly 30, the wind noise threshold of the relative positions C and E may further be significantly higher than that of the relative positions B and D. It means that the more the position of the sound pickup assembly 90 deviated from the loudspeaker assembly 70 is on the ear-hook assembly 30, the more conducive the sound pickup assembly 90 may be to relief the "howling" phenomenon mentioned above. For the relative position E, the ear-hook assembly 30 and the rear-hook assembly 40 may have a structural interference. Therefore, it may be preferable to arrange the sound pickup assembly 90 at the C position on the ear-hook assembly 30.

The beneficial effects that the embodiments of the present disclosure may bring include, but not limited to: (1) The present disclosure provides an apparatus. As the production process of the rear-hook assembly adopts an extrusion molding process, the one-time produced semi-products including an integrated elastic covering body and the wire may have long sizes, and a threaded channel extends roughly along the axis direction of the covering body may be formed inside the covering body. Then the above semi-finished product may be cut into sections with corresponding lengths for subsequent processes such as putting the elastic metal filaments in the threaded channel, this may effectively improve the production efficiency of the rear-hook assembly, thereby increasing the production capacity and the efficiency of the product. (2) The present disclosure opens two groups of notches through at least one insertion portion along a length direction. One group of notches may connect and cooperate with the ear-hook assembly to restrict the relative movement of the ear-hook assembly and the rear-hook assembly to enhance the structural stability of the bone conduction headphone, and the other group of notches 441 may be used for mold positioning, and the insertion portion 44 may be accurately fixed on a certain position on the mold, so that the process of producing rear-hook assembly on the model may be accurately performed. The process may effectively improve the yield due to the improved accuracy of the positioning of the insertion portion on the mold. (3) The present disclosure provides an apparatus where the ear-hook housing and the rear-hook assembly may be adjusted by the user's plugging force, so that the headphone may adopt to different sizes of heads of the users; and under the action of the positioning mechanism, after the user adjusts the insertion depth of the rear-hook assembly relative to the ear-hook housing to a certain use state, the use state may be maintained, thereby satisfying the user's use needs. (4) The present disclosure further provides a connection assembly, and a plurality of conformal lines may be conformally arranged on a base body, so that the conformal lines may be close to the base body to reduce the space between a plurality of groups of lines, elastic metal filaments, and other structural parts in relevant technologies, thereby making the connection assembly compact in structure. (5) The present disclosure divides the elastic covering layer into two parts, that is, a first elastic cover layer and a second elastic covering layer, which may be formed through two injection moldings; and further form a through-groove on the side of the first elastic cover layer. The through-groove may extend along an extending direction of the first elastic covering layer, and may be used to place the elastic metal filament and an auxiliary metal wire. Further, the second elastic covering layer may be formed on the side of the first elastic covering layer where the through-groove locates through injection molding, and may cover the elastic metal filament and the auxiliary metal wire. In this process, as the through-groove has a certain depth, the first elastic covering may partially wrap the elastic metal filament and the auxiliary metal wire, so as to limit positions, and then enables the elastic metal filament and the auxiliary metal wire to be able to resist the impact of injection materials, which is conducive to solving the technical problems of the elastic metal filament and the auxiliary metal wire deviating from an initial positions, so that the wall thickness of the elastic covering layer in the ear-hook assembly may be uniform.

The basic concepts have been described above, apparently, to those skilled in the art, the detailed disclosure is only taken as an example, and does not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, a number illustrating elements and the count of attributes may be used. It should be understood that such numbers describing the embodiments, in some examples, may use "about", "approximately", "generally", or the like, to modify. Unless otherwise stated, "about", "approximately", or "generally" may indicate that the number is allowed to vary by ±20%. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

For each patent, patent application, patent application publication, and other materials referenced by this specification, such as articles, books, instructions, publications, documentation, etc., hereby incorporated herein by reference. Except for the application history documentation of the present specification or conflict, there is also an except for documents (currently or after the present specification) in the most wide range of documents (currently or later). It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An apparatus, comprising:

two ear-hook assemblies, configured to be hung outside of two ears of a user respectively; and a rear-hook assembly in a curved shape, configured to connect the two ear-hook assemblies and wrap around a rear side of the head of the user, the rear-hook assembly including an elastic metal filament, wires, and an elastic covering body covering the elastic metal filament and the wires, wherein the elastic covering body and the wires are an extruded integral structural member, the elastic covering body further forms a threaded channel, the elastic metal filament is threaded in the threaded channel, and a diameter of the threaded channel in a natural state is less than a diameter of the elastic metal filament, so that the elastic metal filament is fixed with the elastic covering body after being inserted into the threaded channel.

2. The apparatus of claim 1, wherein a count of the wires is at least two strands, each strand of the wires includes a metal wire and an insulation layer covering the metal wire, and the insulation layer is configured to realize electrical insulation between metal wires.

3. The apparatus of claim 1, further comprising two core modules, wherein one end of each ear-hook assembly is connected to one of the two core modules, and two ends of the rear-hook assembly are respectively connected to the other end of each ear-hook assembly away from a core module of the two core modules.

4. The apparatus of claim 3, wherein a core module of the two core modules includes a core housing and a core, one end of the core housing includes an opening, and the core is within the core housing.

5. The apparatus of claim 4, wherein an ear-hook assembly of the two ear-hook assemblies includes an ear-hook housing, the ear-hook housing includes an accommodation bin, a bending transition portion, and an earphone fixing portion, the accommodation bin is connected to the rear-hook assembly and is configured to accommodate a battery assembly or a control circuit assembly, and the earphone fixing portion is arranged on an opening end of the core housing to form a chamber structure for accommodating the core, and the bending transition portion is arranged in a bending shape and is connected to the accommodation bin and the earphone fixing portion to be hung outside an ear of the user.

6. The apparatus of claim 5, wherein an elastic modulus of the core housing is greater than that of the ear-hook housing, the earphone fixing portion is provided with a reinforcing structure, and a ratio of a difference between a stiffness of a skin contact area of the core housing and a stiffness of the earphone fixing portion to the stiffness of the skin contact area of the core housing is less than or equal to 10%; and the reinforcing structure is configured to increase the stiffness of the earphone fixing portion to reduce a difference between the stiffness of the earphone fixing portion and the stiffness of the core housing.

7. The apparatus of claim 5, wherein the core module further includes a cover plate, the cover plate is arranged on the opening end of the core housing to form the chamber structure for accommodating the core, the earphone fixing portion is arranged on a side of the cover plate away from the core housing, wherein an elastic modulus of the core housing is greater than that of the ear-hook housing, and an elastic modulus of the cover plate is greater than that of the ear-hook housing.

8. The apparatus of claim 5, wherein the ear-hook assembly further includes a decoration member, the decoration member includes a decoration bracket, the ear-hook housing is at least provided with a first groove on the bending transition portion, and the decoration bracket is embedded and fixed in the first groove of the bending transition portion to form a wiring channel, the wiring channel allows the wires to extend from the core module to the accommodation bin through the wiring channel.

9. The apparatus of claim 1, wherein the rear-hook assembly further includes inserting portions arranged at two ends of the elastic metal filament, the inserting portions are configured to connect and match with the ear-hook assembly, at least one inserting portion is provided with two groups of notches at intervals in a length direction, one group of notches is configured to clamp and match with the ear-hook assembly, and the other group of notches is configured to mold position.

10. The apparatus of claim 9, wherein each group of notches includes two notches arranged opposite to each other, and the two notches extend from edges of the at least one inserting portion to a central axis, wherein the edges are on two sides of the central axis.

11. The apparatus of claim 9, wherein the ear-hook assembly includes a first ear-hook housing and a second ear-hook housing, the first ear-hook housing and the second ear-hook housing are cooperatively connected to form an accommodating space for accommodating the battery assembly or the control circuit assembly, one side of the first ear-hook housing is provided with a plug-in hole connecting the accommodating space, the at least one inserting portion is inserted into the plug-in hole, and a snap portion protruding from the first ear-hook housing is embedded in a notch at one end away from the at least one inserting portion.

12. The apparatus of claim 11, wherein splicing edges of the first ear-hook housing and the second ear-hook housing fit with each other, the first ear-hook housing is spaced to form a first slot and a second slot with a same opening direction, the second ear-hook housing is protruding provided with a first block and a second block with a same extending direction, the first block and the second block are respectively embedded into the first slot and the second slot along a same direction to limit a relative movement of the first ear-hook housing and the second ear-hook housing in different directions.

13. The apparatus of claim 12, wherein the first slot and the second slot are respectively located on two sides of the first ear-hook housing along the length direction, an opening direction of the first slot faces the accommodating space, and an opening direction of the second slot deviates from the accommodating space; and the first block and the second block are respectively located on two sides of the second ear-hook housing along the length direction, an extending direction of the first block deviates from the accommodating space, and an extending direction of the second block faces the accommodating space.

14. The apparatus of claim 13, wherein a splicing edge of the first ear-hook housing is provided with a first blocking portion, a splicing edge of the second ear-hook housing is provided with a second blocking portion, and the first blocking portion and the second blocking portion fit with each other to limit a relative movement of the first ear-hook housing and the second ear-hook housing in the length direction.

15. The apparatus of claim 1, wherein an ear-hook assembly of the two ear-hook assemblies includes an ear-hook housing in a curved shape to be hung outside an ear of the user, the ear-hook housing is a chamber structure provided with a mounting port, and the rear-hook assembly is partially inserted into the ear-hook housing through the mounting port.

16. The apparatus of claim 15, wherein the rear-hook assembly is capable of adjusting an insertion depth relative to the ear-hook housing with an action of a plugging force of the user, a positioning mechanism is arranged between the ear-hook housing and the rear-hook assembly and is configured to keep the rear-hook assembly and the ear-hook housing relatively fixed without the action of the plugging force of the user.

17. The apparatus of claim 16, wherein the rear-hook assembly further includes a plug-in column arranged at an end of the elastic metal filament that is in a bending shape and partially inserted into the ear-hook housing through the mounting port, and the positioning mechanism is arranged between the ear-hook housing and an inserting portion of the plug-in column relative to the ear-hook housing.

18. The apparatus of claim 17, wherein the positioning mechanism includes a positioning depression and a positioning protrusion, and one of the positioning depression and the positioning protrusion is capable of successively engaging with the other of the positioning depression and the positioning protrusion with changes of an insertion depth of the plug-in column relative to the ear-hook housing; and the positioning protrusion is arranged to disengage from the positioning depression after the plugging force of the user is greater than a preset threshold, thereby adjusting the insertion depth.

19. The apparatus of claim 17, wherein a blocking mechanism is further arranged between the ear-hook housing and the plug-in column, and the blocking mechanism is configured to define a maximum value or minimum value of the insertion depth of the plug-in column relative to the ear-hook housing.

20. The apparatus of claim 17, wherein the plug-in column is provided with a wiring groove, and the rear-hook assembly further includes a conductor embedded in the wiring groove, and the conductor extends a certain length from an end of the plug-in column that is inserted into the ear-hook housing; and the ear-hook housing is further provided with a guiding mechanism, the guiding mechanism is configured to guide a part of the conductor that extends from the plug-in column during a process of inserting the plug-in column into and pulling the plug-in column out the ear-hook housing.

* * * * *